United States Patent
Tsusaka et al.

(10) Patent No.: US 11,886,186 B2
(45) Date of Patent: Jan. 30, 2024

(54) MOBILE ROBOT AND CONTROL METHOD OF MOBILE ROBOT

(71) Applicant: Panasonic Intellectual Property Management Co., Ltd., Osaka (JP)

(72) Inventors: Yuko Tsusaka, Osaka (JP); Mikiya Nakata, Nara (JP); Hiroki Takeuchi, Osaka (JP); Tadahiro Taniguchi, Kyoto (JP); Yoshinobu Hagiwara, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 770 days.

(21) Appl. No.: 16/256,333

(22) Filed: Jan. 24, 2019

(65) Prior Publication Data

US 2019/0235490 A1 Aug. 1, 2019

(30) Foreign Application Priority Data

Jan. 31, 2018 (JP) .................................. 2018-015677

(51) Int. Cl.
*G05D 1/00* (2006.01)
*G05D 1/02* (2020.01)
(Continued)

(52) U.S. Cl.
CPC ....... *G05D 1/0033* (2013.01); *G01C 21/3415* (2013.01); *G01C 21/362* (2013.01);
(Continued)

(58) Field of Classification Search
CPC .. G05D 1/0033; G05D 1/0044; G05D 1/0212; G05D 1/0016; G05D 1/0223;
(Continued)

(56) References Cited

U.S. PATENT DOCUMENTS 10,496,262 B1 * 12/2019 Ebrahimi Afrouzi ........................ B25J 11/0085
2014/0116469 A1 * 5/2014 Kim .................... A47L 11/4061
15/319

(Continued)

FOREIGN PATENT DOCUMENTS

JP 2006141836 A * 6/2006
JP 2006-277121 10/2006

(Continued)

OTHER PUBLICATIONS

Masahiro Tomono, "Mobile Robot Perception: Mapping and Localization", "System/Control/Information" Journal of the Institute of Systems, Control and Information Engineers, vol. 60, No. 12, pp. 509-514, 2016 (cited in specification and with full English translation.

(Continued)

*Primary Examiner* — Maceeh Anwari
(74) *Attorney, Agent, or Firm* — Wenderoth, Lind & Ponack, L.L.P.

(57) ABSTRACT

A terminal apparatus includes a camera, a display that displays a display screen including a mobile robot that autonomously travels, and a control circuit. The control circuit acquires a first planned route of the mobile robot, displays, on the display, a screen having the first planned route superimposed on a camera image taken by the camera, detects a contact point on the display on which the screen is displayed, generates a second planned route of the mobile robot that travels through the contact point, and transmits the second planned route to the mobile robot.

12 Claims, 44 Drawing Sheets

(51) Int. Cl.
 G01C 21/36 (2006.01)
 G01C 21/34 (2006.01)
(52) U.S. Cl.
 CPC ..... *G01C 21/3614* (2013.01); *G01C 21/3676* (2013.01); *G05D 1/0016* (2013.01); *G05D 1/0044* (2013.01); *G05D 1/0212* (2013.01); *G05D 1/0219* (2013.01); *G05D 1/0223* (2013.01); *G05D 2201/0203* (2013.01); *G05D 2201/0215* (2013.01)
(58) Field of Classification Search
 CPC ......... G05D 1/0219; G05D 2201/0215; G05D 2201/0203; G01C 21/3614; G01C 21/362; G01C 21/3676; G01C 21/3415; B25J 9/1697; B25J 9/1689; B25J 9/1664
 USPC .......................................................... 701/2
 See application file for complete search history.

(56) References Cited

U.S. PATENT DOCUMENTS

2017/0201617 A1* 7/2017 So ..................... G08C 17/02
2018/0373242 A1* 12/2018 Han ................... A47L 9/2826

FOREIGN PATENT DOCUMENTS

| JP | 2007-226322 | | 9/2007 |
|---|---|---|---|
| JP | 2007226322 | * | 9/2007 |
| JP | 2014-228448 | | 12/2014 |
| JP | 2015-087268 | | 5/2015 |
| JP | 2017-197015 | | 11/2017 |
| KR | 10-2016-0120841 | | 10/2016 |

OTHER PUBLICATIONS

Office Action dated Jun. 15, 2021 in Japanese Patent Application No. 2018-015677 with English machine translation.
Office Action dated Nov. 9, 2021 in Japanese Patent Application No. 2018-015677 with English Machine Translation.
Notification of Reasons for Refusal and Search Report dated Feb. 15, 2023 in corresponding Chinese Patent Application No. 201910095184.7, with partial English translation.
Notification of Reasons for Refusal dated Apr. 4, 2023 in corresponding Japanese Patent Application No. 2022-001702, with English translation.
Japanese Notification of Reasons for Refusal dated Aug. 29, 2023 in corresponding Japanese Patent Application No. 2022-001702, with English machine translation.

* cited by examiner

Fig.4

| FILE ID | FILE NAME |
|---|---|
| 1000 | C://user/user1/rulo/image1000.jpeg |
| 1001 | C://user/user1/rulo/image1001.jpeg |

Fig.5

| TIME | POSITION (x,y,Θ) |
|---|---|
| t0 | (x0,y0,Θ0) |
| t1 | (x1,y1,Θ1) |
| ... | ... |
| ... | ... |
| tn | (xn,yn,Θn) |

Fig.6

| TIME | POSITION (x,y,Θ) |
|---|---|
| t0 | (x0,y0,Θ0) |
| t1 | (x1,y1,Θ1) |
| ... | ... |
| ... | ... |
| tn | (xn,yn,Θn) |

Fig.10A

| FILE ID | FILE NAME |
|---|---|
| 1000 | C://user/user1/rulo/image1000.jpeg |
| 1001 | C://user/user1/rulo/image1001.jpeg |

Fig.10B

| TIME | POSITION (x,y,Θ) |
|---|---|
| t0 | (x0,y0,Θ0) |
| t1 | (x1,y1,Θ1) |
| ... | ... |
| ... | ... |
| tn | (xn,yn,Θn) |

Fig.10C

| TIME | POSITION (x,y,Θ) |
|---|---|
| t0 | (x0,y0,Θ0) |
| t1 | (x1,y1,Θ1) |
| ... | ... |
| ... | ... |
| tn | (xn,yn,Θn) |

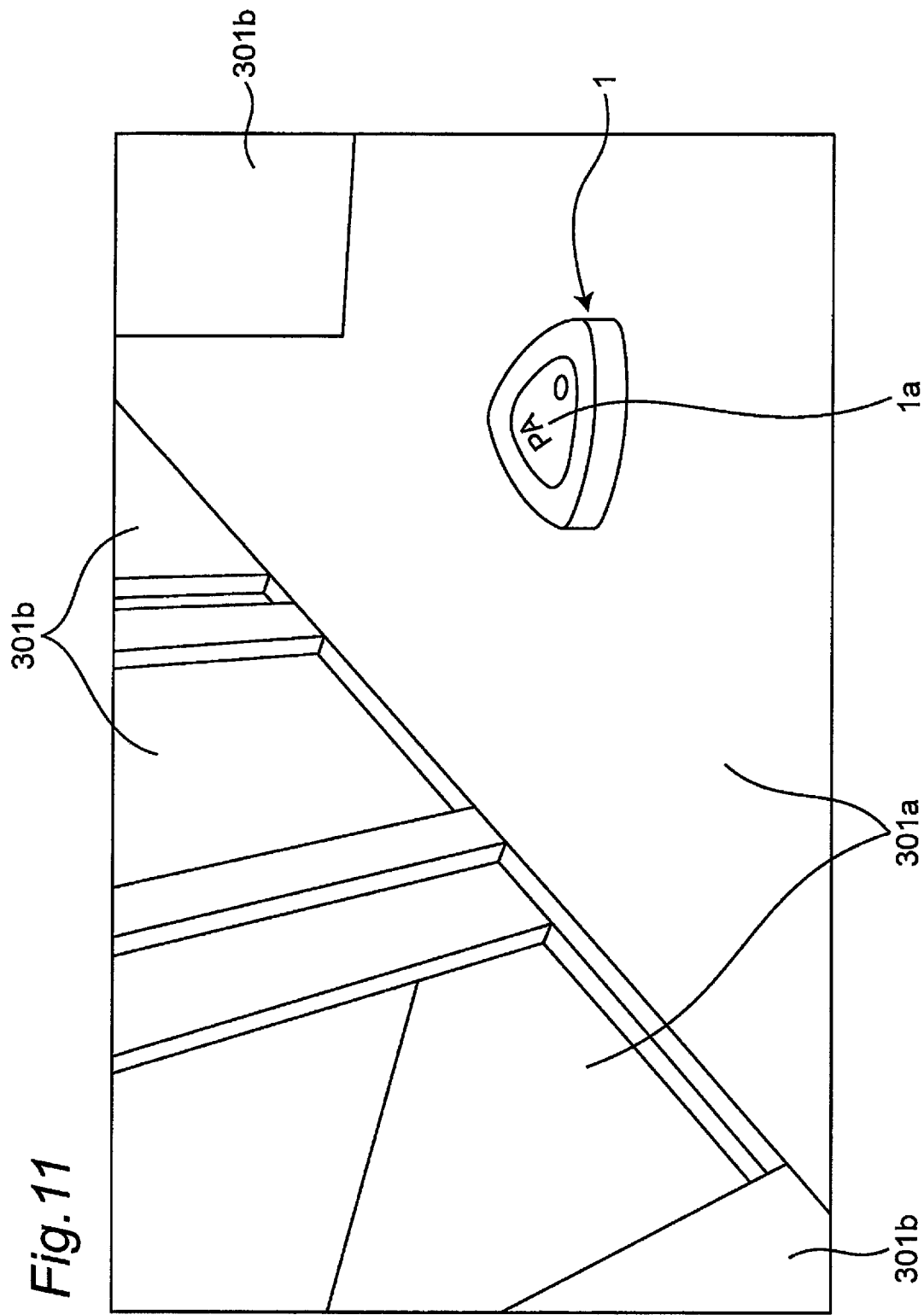

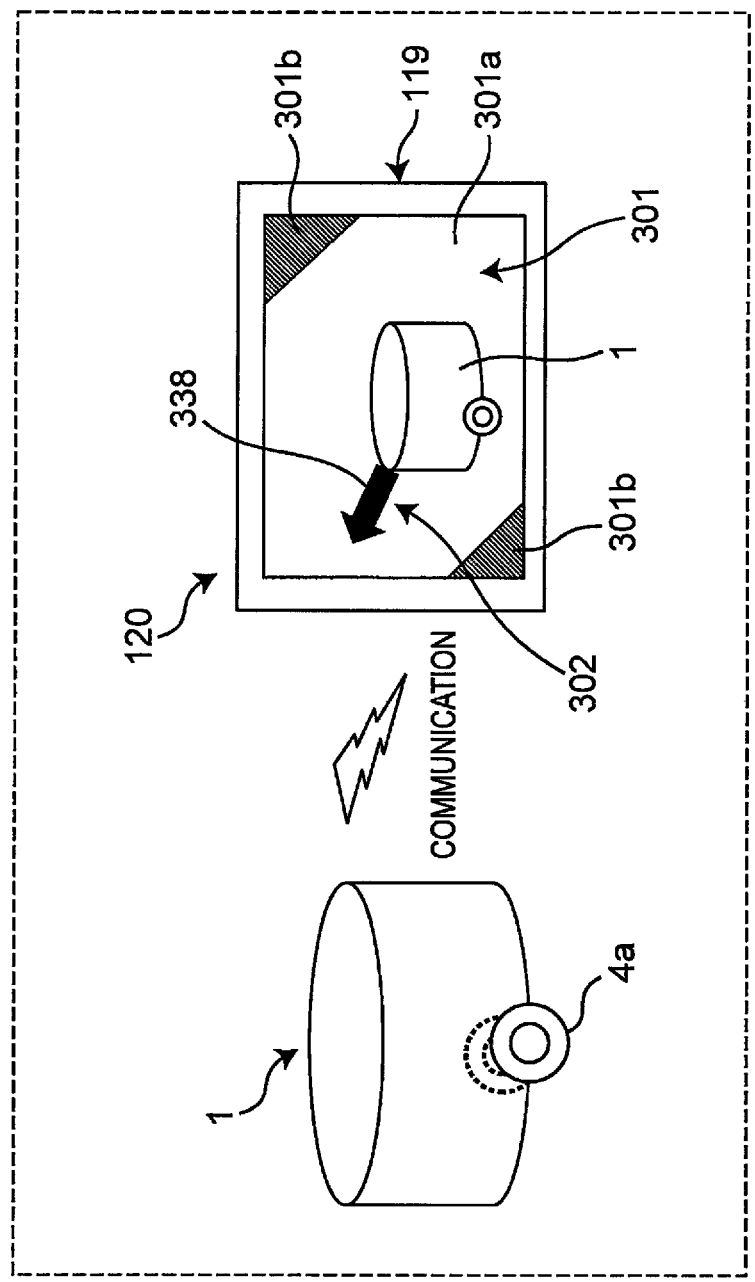

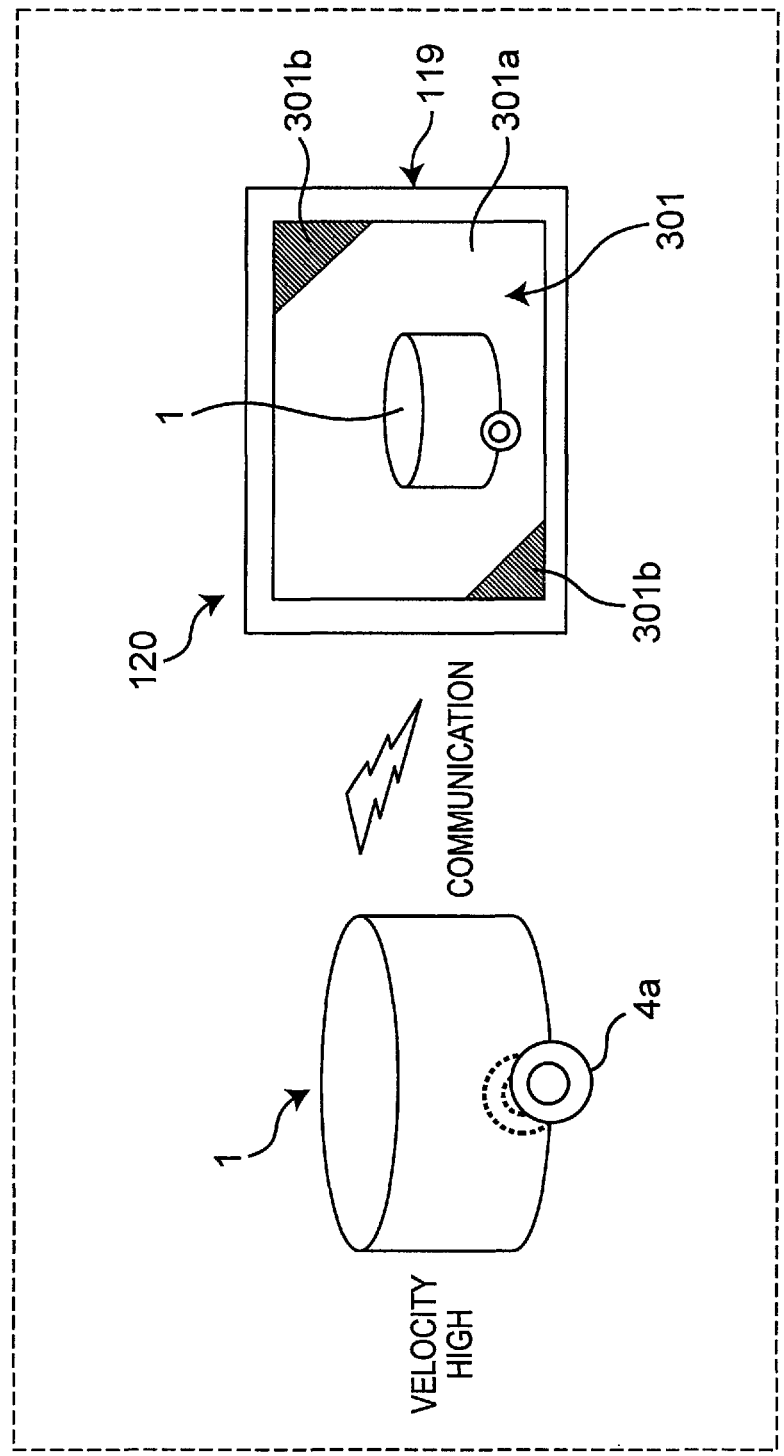

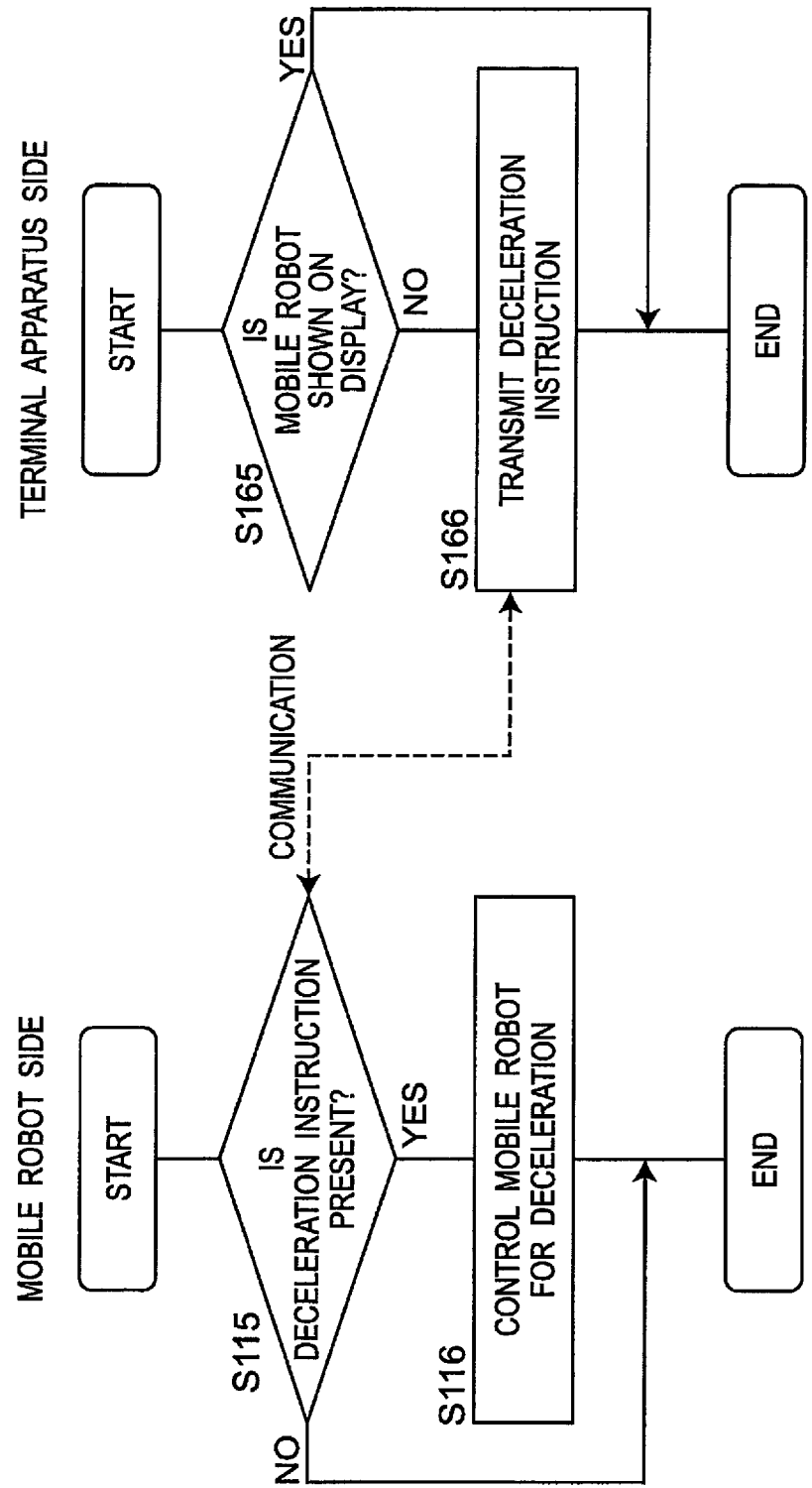

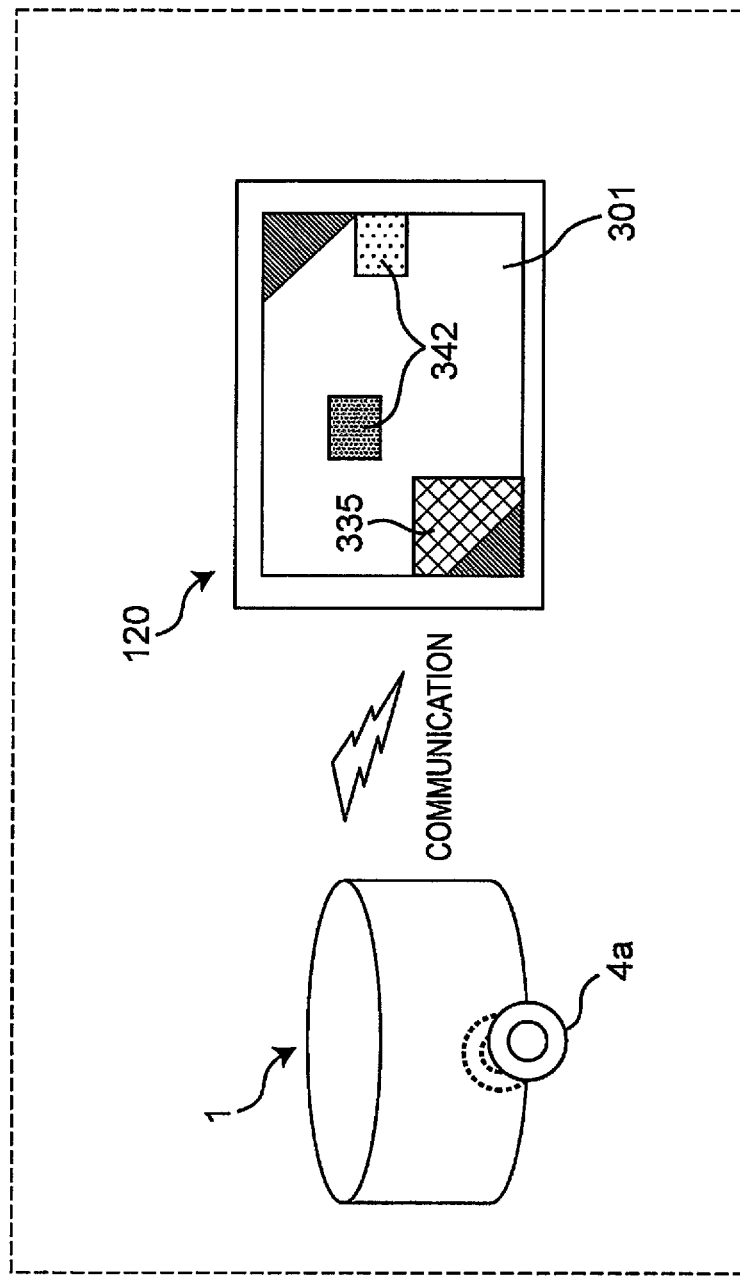

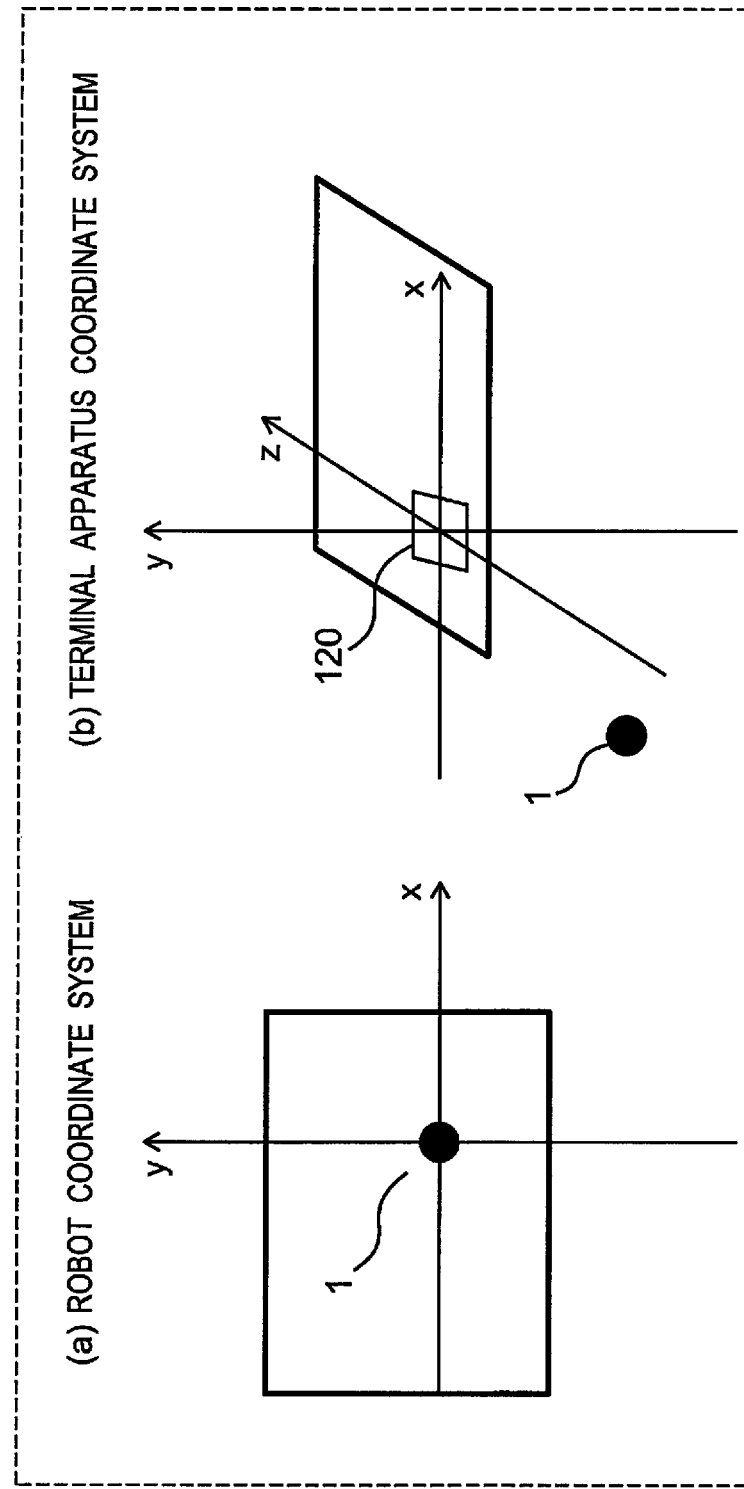

MOBILE ROBOT AND CONTROL METHOD OF MOBILE ROBOT

DESCRIPTION OF THE RELATED ART

The present disclosure relates to a mobile robot and a control method of the mobile robot.

DESCRIPTION OF THE RELATED ART

Patent Document 1 discloses a travel route creation apparatus that generates a travel route in accordance with a travel area. Specifically, the travel route creation apparatus generates a travel route using information on an area where a mobile robot is unable to travel.

PRIOR ART DOCUMENT

Patent Document

[Patent Document 1] Japanese Unexamined Patent Application No. 2006-277121

Non-Patent Document

[Non-Patent Document 1] Masahiro Tomono, "Mobile Robot Perception: Mapping and Localization", "System/Control/Information" Journal of the Institute of Systems, Control and Information Engineers, vol. 60, No. 12, pp. 509-514, 2016

SUMMARY

Patent Document 1 discloses a technique for displaying a generated planned route on a display unit, but the technique is inconvenient for a change of the planned route because the change of the planned route is enabled only within a predetermined range in which a response to an inquiry is allowed and a direction of the planned route cannot be freely changed.

The present disclosure provides a mobile robot with high convenience that allows a user to easily grasp and change a planned route of the mobile robot with a terminal apparatus in his or her hand, and a control method of the mobile robot.

According to one aspect of the present disclosure, a control method of a mobile robot using a terminal apparatus, the terminal apparatus including a camera, a display that displays a display screen including the mobile robot that autonomously travels, and a first control circuit, the mobile robot including a second control circuit, the control method comprising performing control to:
cause the first control circuit to
(a1) acquire a first planned route of the mobile robot,
(a2) display, on the display, a first screen having the first planned route superimposed on a camera image taken by the camera, and
(a3a) detect a contact point on the display on which the first screen is displayed and transmit a position of the contact point to the second control circuit; and,
cause the second control circuit to
(a3b) generate a second planned route of the mobile robot that travels through the contact point received from the first control circuit, and
(a4) transmit the second planned route generated to the first control circuit.

These general and specific aspects may be implemented by a system, a method, and a computer program, and any combination of the system, the method, and the computer program.

The above-described aspects of the present disclosure make it possible to provide a mobile robot with high convenience that allows the user to easily grasp and change the planned route of the mobile robot with the terminal apparatus in his or her hand, and a control method of the mobile robot.

BRIEF DESCRIPTION OF THE DRAWINGS

FIG. 4 is a diagram showing an example of map information recorded in a database of the mobile robot;

FIG. 5 is a diagram showing an example of planned route information recorded in the database of the mobile robot;

FIG. 6 is a diagram showing an example of self-position information on the mobile robot recorded in the database of the mobile robot;

FIG. 10A is a diagram showing an example of map information recorded in a database of the terminal apparatus of FIG. 2;

FIG. 10B is a diagram showing an example of planned route information recorded in the database of the terminal apparatus of FIG. 2;

FIG. 10C is a diagram showing an example of self-position information on the mobile robot recorded in the database of the terminal apparatus of FIG. 2;

FIG. 11 is a diagram showing an example of a travel space where the cleaner as an example of the mobile robot travels in a room;

FIG. 12 is a diagram for describing a case where a first operation (1) is performed in the control system of the mobile robot;

FIG. 24A is a diagram showing a case where a velocity of the mobile robot is set to a high velocity for cleaning operation when the mobile robot is shown on the display of the terminal apparatus;

FIG. 25 is a flowchart of a fourth operation (4) to be performed in the control system of the mobile robot;

FIG. 26B is a diagram for describing a case where a value detected by a dust detection sensor mounted on the cleaner, an obstacle, and whether the cleaner has been stuck are displayed on the display in a state during cleaning;

FIG. 29 is a diagram for describing coordinate conversion between a robot coordinate system and a terminal apparatus coordinate system to be performed by a coordinate converter;

DETAILED EMBODIMENTS

Figure 1:
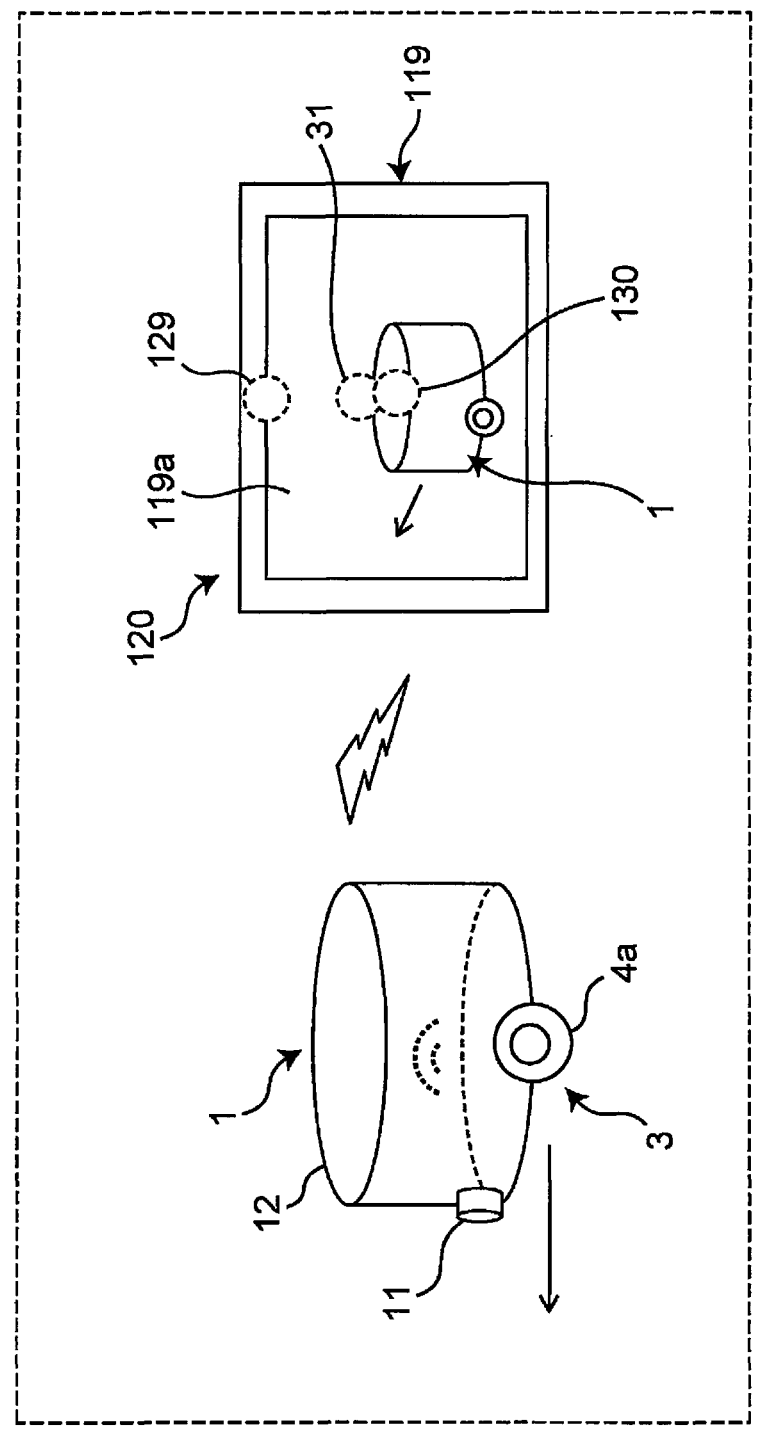
FIG. 1 is a configuration diagram of a control system of a mobile robot showing a mobile robot and a terminal apparatus according to a first embodiment.

Hereinafter, an embodiment according to the present disclosure will be described in detail with reference to the drawings.

Before describing the embodiments of the present disclosure in detail with reference to the drawings, various aspects of the present disclosure will be described.

According to a first aspect of the present disclosure, a control method of a mobile robot using a terminal apparatus, the terminal apparatus including a camera, a display that displays a display screen including the mobile robot that autonomously travels, and a first control circuit, the mobile robot including a second control circuit, the control method comprising performing control to:
cause the first control circuit to
(a1) acquire a first planned route of the mobile robot,
(a2) display, on the display, a first screen having the first planned route superimposed on a camera image taken by the camera, and
(a3a) detect a contact point on the display on which the first screen is displayed and transmit a position of the contact point to the second control circuit; and,
cause the second control circuit to
(a3b) generate a second planned route of the mobile robot that travels through the contact point received from the first control circuit, and
(a4) transmit the second planned route generated to the first control circuit.

The above-described aspect of the present disclosure makes it possible to provide a mobile robot with high convenience that allows the user to easily grasp and change the planned route of the mobile robot with the terminal apparatus in his or her hand, and a control method of the mobile robot.

According to a second aspect of the present disclosure, the control method of a mobile robot according to the first aspect, further comprising performing control to cause the first control circuit to superimpose a figure indicating a travel direction of the mobile robot and a planned travel area of the mobile robot on the first screen as the first or second planned route.

The aspect produces an effect that allows a user to easily grasp the planned route and the planned travel area of the mobile robot with the terminal apparatus in his or her hand.

According to a third aspect of the present disclosure, the control method of a mobile robot according to the first aspect, wherein the mobile robot is a cleaner, the cleaner including a cleaner main body having a suction port on a bottom surface, a suction unit disposed in the cleaner main body, a drive unit that is disposed in the cleaner main body and drives travel of the cleaner, and the second control circuit, the control method further comprising performing control to:

cause the second control circuit to control the suction unit and the drive unit to perform cleaning while traveling and transmit information on an area where cleaning is completed by the cleaner to the first control circuit; and cause the first control circuit to further superimpose, after the first control circuit receives the information on the area where the cleaning is completed from the second control circuit, the area where the cleaning is completed by the cleaner on the first screen.

The aspect produces an effect that allows the user to easily grasp the cleaning-completed area of the mobile robot with the terminal apparatus in his or her hand.

According to a fourth aspect of the present disclosure, the control method of a mobile robot according to the first aspect, further comprising performing control to:

cause the first control circuit to (a3a) detect, when detecting the contact point on the display on which the first screen is displayed, a swipe motion including a plurality of contact points as the contact point, and transmit positions of the plurality of contact points to the second control circuit; and cause the second control circuit to (a3b) generate, when generating the second planned route of the mobile robot that travels through the plurality of contact points received from the first control circuit, the second planned route having a travel direction extending from a first contact point toward a last contact point of the plurality of contact points included in the swipe motion.

The aspect produces an effect that allows the user to easily and intuitively change the planned route of the mobile robot with the terminal apparatus in his or her hand, which increases convenience.

According to a fifth aspect of the present disclosure, the control method of a mobile robot according to the first aspect, further comprising performing control to:

cause the first control circuit to (a3a) detect, when detecting the contact point on the display on which the first screen is displayed, a swipe motion including a plurality of contact points as the contact point, and transmit positions of the plurality of contact points to the second control circuit; and cause the second control circuit to (a3b) generate, when generating the second planned route of the mobile robot that travels through the plurality of contact points received from the first control circuit, the second planned route having a travel direction extending from a position of the mobile robot toward a last contact point of the plurality of contact points included in the swipe motion.

The aspect produces an effect that allows the user to easily and intuitively change the planned route of the mobile robot with the terminal apparatus in his or her hand, which increases convenience.

According to a sixth aspect of the present disclosure, the control method of a mobile robot according to the fourth aspect, further comprising performing control to:

cause the first control circuit to (a3a) detect, when detecting the contact point on the display on which the first screen is displayed, the swipe motion that continues for a time equal to or greater than a first threshold, and transmit the positions of the plurality of contact points to the second control circuit; and cause the second control circuit to (a3b) generate, when generating the second planned route of the mobile robot that travels through the plurality of contact points received from the first control circuit, the second planned route having a travel direction extending from a contact point detected a predetermined time before an end of the swipe motion toward the last contact point of the plurality of contact points included in the swipe motion.

The aspect produces an effect that allows the user to easily and intuitively change the planned route of the mobile robot with the terminal apparatus in his or her hand, which increases convenience.

According to a seventh aspect of the present disclosure, the control method of a mobile robot according to the first aspect, further comprising performing control to cause, when the first control circuit detects a swipe motion including a plurality of contact points as the contact point in the (a3a), the second control circuit to generate the second planned route for changing an orientation of the mobile robot based on a line segment passing through each of the plurality of contact points included in the swipe motion.

The aspect produces an effect that allows the user to easily and intuitively change the planned route of the mobile robot with the terminal apparatus in his or her hand, which increases convenience.

According to an eighth aspect of the present disclosure, the control method of a mobile robot according to the first aspect, further comprising performing control to cause, when the first control circuit detects a swipe motion including a plurality of contact points as the contact point in the (a3a), the second control circuit to generate, when the swipe motion is a straight motion on the screen, the second planned route having a travel direction extending from a position of the mobile robot toward a last contact point of the plurality of contact points included in the swipe motion, and generate, when the swipe motion is a curved motion on the screen, the second planned route curved to change an orientation of the mobile robot based on a line segment passing through each of the plurality of contact points included in the swipe motion.

The aspect produces an effect that allows the user to easily and intuitively change the planned route of the mobile robot with the terminal apparatus in his or her hand, which increases convenience.

According to a ninth aspect of the present disclosure, the control method of a mobile robot according to the first aspect, further comprising performing control to cause the second control circuit to generate the second planned route that does not overlap the first planned route on the first screen at a time when the first control circuit detects the contact point.

The aspect produces an effect that allows the user to easily and intuitively change the planned route of the mobile robot with the terminal apparatus in his or her hand, which increases convenience.

According to a tenth aspect of the present disclosure, the control method of a mobile robot according to the third aspect, wherein the mobile robot includes the second control circuit, the control method further comprising performing control to cause the first control circuit to (a5) transmit, when the first control circuit determines that the camera image does not include the cleaner, a first command for making a velocity of the cleaner lower than a velocity for cleaning operation to the second control circuit.

The aspect produces an effect that allows the user to easily take an image of the mobile robot with the terminal apparatus.

According to an 11th aspect of the present disclosure, the control method of a mobile robot according to the tenth aspect, further comprising performing control to cause the first control circuit to (a6) transmit, when the first control circuit determines that the camera image taken by the camera after the (a5) includes the mobile robot, cancellation of the first command to the second control circuit to return the velocity of the cleaner to the velocity for cleaning operation.

The aspect produces an effect that allows the user to easily return, to an original velocity, the velocity of the mobile robot decelerated to allow the user to easily take an image of the mobile robot with the terminal apparatus.

According to a 12th aspect of the present disclosure, the control method of a mobile robot according to the tenth aspect, wherein the mobile robot further includes a first sensor that acquires a position of the mobile robot, the control method further comprising performing control to cause:

(a7) the first control circuit to acquire, when the first control circuit determines that the camera image does not include the cleaner, a position of the cleaner main body detected by the first sensor from the second control circuit; and (a8) the first control circuit to display, on the display, a second screen having a direction in which the cleaner main body is present superimposed on the camera image.

The aspect produces an effect that allows the user to confirm a direction of the mobile robot to easily take an image of the mobile robot with the terminal apparatus.

According to a 13th aspect of the present disclosure, the control method of a mobile robot according to the 12th aspect, further comprising performing control to cause the first control circuit to remove, when the first control circuit determines that the camera image includes the cleaner after the (a8), display of the direction in which the cleaner main body is present, the direction being superimposed on the camera image.

The aspect produces an effect that, after the user confirms the direction of the mobile robot to easily take an image of the mobile robot with the terminal apparatus, allows the user to easily remove the display of the direction.

According to a 14th aspect of the present disclosure, a control method of a mobile robot using a terminal apparatus, the terminal apparatus including a camera, a display that displays a display screen including a mobile robot that autonomously travels, and a first control circuit, the cleaner including a cleaner main body having a suction port on a bottom surface, a suction unit disposed in the cleaner main body, a drive unit that is disposed in the cleaner main body and drives travel of the cleaner, and a second control circuit, the control method comprising performing control to cause the first control circuit to:

(b1) receive at least one of cleaning states of the cleaner including a state before cleaning, a state during cleaning, and a state after cleaning from the second control circuit;

(b2) receive at least one of a first planned route of the cleaner, an amount of dust sucked by the suction unit, and an area where cleaning is completed by the cleaner, from the second control circuit; and (b3) display, when the state before cleaning is received, a first screen having the first planned route superimposed on the display, display, when the state during cleaning is received, a third screen having a camera image taken by the camera and the amount of dust sucked by the suction unit on the display, and display, when the state after cleaning is received, a fourth screen having the camera image and the area where cleaning is completed by the cleaner on the display.

The aspect produces an effect that allows the user to easily confirm a state of the mobile robot with the terminal apparatus.

According to a 15th aspect of the present disclosure, a control system of a mobile robot comprising:

a terminal apparatus; and a mobile robot that is controlled with the terminal apparatus, the terminal apparatus including a camera, a display that displays a display screen including the mobile robot that autonomously travels, and a first control circuit, the mobile robot including a second control circuit, the first control circuit including (a1) a communication unit that acquires a first planned route of the mobile robot, (a2) a presentation unit that displays, on the display, a first screen having the first planned route superimposed on a camera image taken by the camera, and (a3) an input detection unit that detects a contact point on the display on which the first screen is displayed, the second control circuit including an information generator that generates a second planned route of the mobile robot that travels through the contact point detected by the input detection unit, and (a4) a communication unit that transmits the second planned route to the mobile robot.

The above-described aspect of the present disclosure makes it possible to provide a mobile robot with high convenience that allows the user to easily grasp and change the planned route of the mobile robot with the terminal apparatus in his or her hand, and a control method of the mobile robot.

First Embodiment

Hereinafter, an embodiment of the present disclosure will be described with reference to the drawings.

Figure 2:
FIG. 2 is a block diagram of an overall configuration of the control system of the mobile robot of FIG. 1.

FIG. 1 and FIG. 2 show a control system of a mobile robot that implements a control method of a mobile robot 1 of the first embodiment. The control system includes the mobile robot 1 and a terminal apparatus 120. A user can control travel of the mobile robot 1 with the terminal apparatus 120. Examples of the mobile robot 1 include a robot cleaner and a transfer robot. Examples of the terminal apparatus 120 include a personal computer (PC), a tablet, and a smartphone. As shown in FIG. 2, the mobile robot 1 and the terminal apparatus 120 transmit and receive information by wire or radio.

The terminal apparatus 120 includes a camera 129 and a display 119 including an input detector 119*b* (to be described later). An example of the camera 129 is an RGB camera. The terminal apparatus 120 may include the camera 129 on a front surface where the display 119 is disposed or may include the camera 129 on a back surface. An example of the display 119 is a touch panel. The touch panel is an electronic component composed of a combination of a display apparatus of a liquid crystal panel and a contact point detector corresponding to a touchpad as an example of the input detector 119*b*. The input detector 119*b* is capable of detecting a contact point(s) on the display 119. The display 119 is a known touch panel and detects the contact point in a manner including a method using a resistive film, a method using capacitance, and a method using an ultrasonic surface acoustic wave. The terminal apparatus 120 displays, on the display 119, a screen 119*a* including an image of the mobile robot 1 taken by the camera 129.

The screen 119*a* is an image having information on the mobile robot 1 superimposed on a camera image taken by the camera 129. In other words, the screen 119*a* includes the camera image and the information on the mobile robot 1. The screen 119*a* is also referred to as a first screen. Further, an example of information on the mobile robot 1 will be described later. The screen 119*a* displayed on the display 119 is a screen corresponding to so-called augmented reality (AR).

The user can take an image of the mobile robot 1 with the camera 129, for example, by changing a position or orientation of the terminal apparatus 120. In other words, the user changes a shooting range of the camera 129 by changing the position or orientation of the terminal apparatus 120 and then takes an image of the mobile robot 1 with the camera 129. Further, the user can change a travel route of the mobile robot 1 by making contact with the touch panel of the display 119. The contact with the touch panel made by the user can be interpreted as a user's operation. Components of each of the mobile robot 1 and the terminal apparatus 120 will be described later.

(Functional Block Diagram of Mobile Robot 1)

Figure 3A:
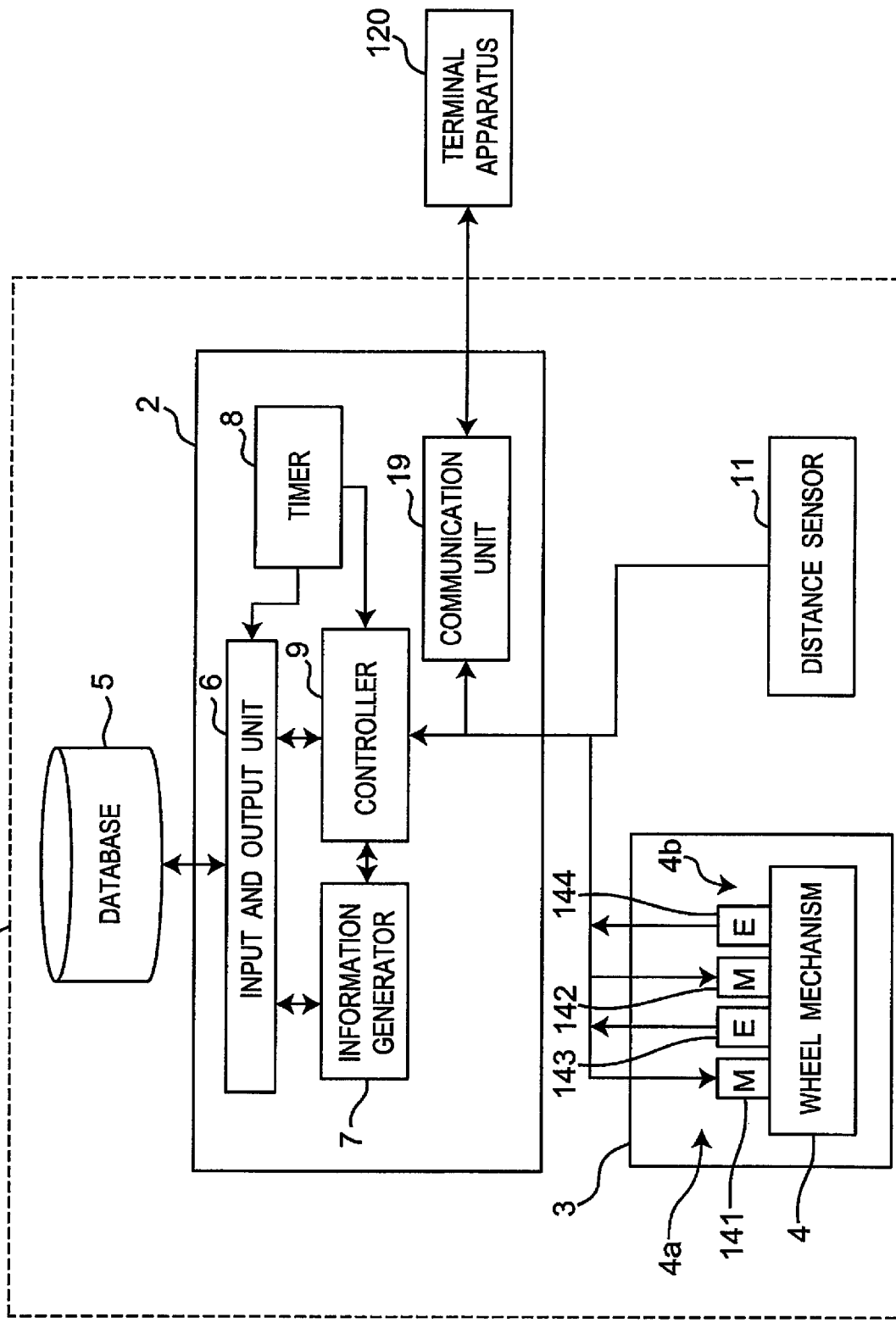
FIG. 3A is a block diagram of the mobile robot of FIG. 2.

FIG. 3A shows a functional block diagram of the mobile robot 1. The mobile robot 1 includes at least a control circuit 2, a drive unit 3, a database 5, and a distance sensor 11 in a robot main body 12.

The robot main body 12 corresponds to a casing of the mobile robot 1. Note that the database 5 is not necessarily disposed in the robot main body 12, and the database 5 may be partially or entirely located outside the robot main body 12. In such a configuration, the mobile robot 1 accesses the database 5 located outside the robot main body 12 via a communication unit 19.

(Control Circuit 2)

The control circuit 2 includes an input and output unit 6, an information generator 7, a timer 8, a controller 9, and the communication unit 19. Hereinafter, a control circuit 121 of the terminal apparatus 120 (to be described later) is also referred to as a first control circuit, and the control circuit 2 of the mobile robot 1 is also referred to as a second control circuit.

The input and output unit 6 is connected to the database 5, the information generator 7, the timer 8, and the controller 9. The controller 9 is connected to the information generator 7, the timer 8, the communication unit 19, the drive unit 3, and the distance sensor 11.

The input and output unit 6 receives information from the database 5 or outputs information to the database 5. That is, the input and output unit 6 acquires information recorded in the database 5 or records information in the database 5. The information to be recorded in the database 5 will be described in detail in the description of the database 5.

Under control by the controller 9, the information generator 7 generates map information of a planned travel route (herein, simply referred to as a "planned route") for travel of the mobile robot 1 and records the map information thus generated in the database 5.

The timer 8 counts a time from 0 or counts a time corresponding to the world time and inputs information on the time thus counted to both the input and output unit 6 and the controller 9. This allows the input and output unit 6 to record the map information together with the time acquired from the timer 8 in the database 5. This further allows the controller 9 to perform a control operation based on the time acquired from the timer 8.

The controller 9 controls an operation of the information generator 7, the drive unit 3, or the communication unit 19 based on a measured value from the distance sensor 11, the map information generated by the information generator 7, or the information acquired by the database 5, the communication unit 19, the input and output unit 6, or the drive unit 3.

Figure 3B:
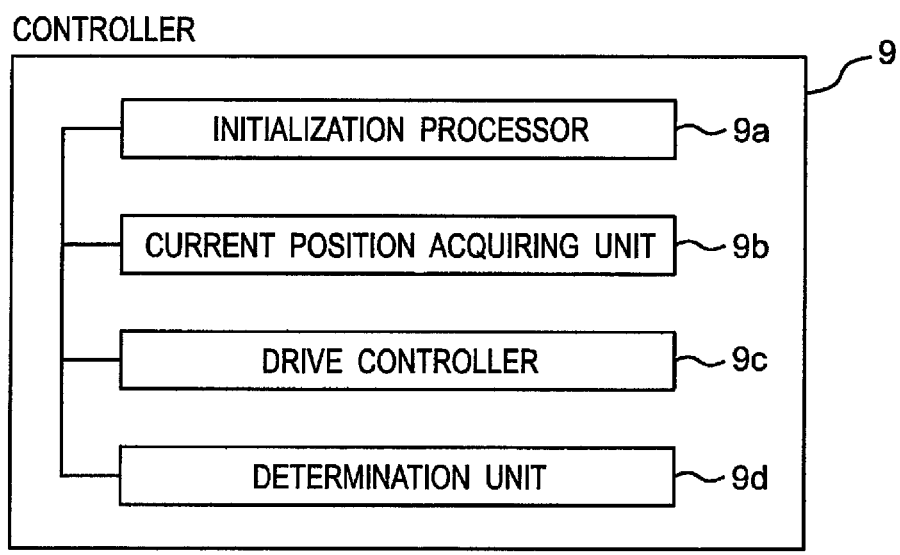
FIG. 3B is a block diagram of a controller of the mobile robot of FIG. 2.

The controller 9 shown in FIG. 3B includes an initialization processor 9*a*, a current position acquiring unit 9*b*, a drive controller 9*c*, and a determination unit 9*d*.

The initialization processor 9*a* performs processing with a current position of the mobile robot 1 taken as an origin of coordinates of the mobile robot 1.

The current position acquiring unit 9*b* acquires the current position of the mobile robot 1 based on the measured value of the distance sensor 11 of the mobile robot 1.

The drive controller 9*c* controls the drive unit 3 to cause the mobile robot 1 to travel along the planned route. Further, when receiving deceleration command information, the drive controller 9*c* controls the drive unit 3 based on the deceleration command information to decelerate the mobile robot 1.

The determination unit 9*d* determines, based on the current position of the mobile robot 1 acquired by the current position acquiring unit 9*b*, (a) whether the mobile robot 1 has started traveling along the planned route, (b) whether the mobile robot 1 is travelling along the planned route, and (c) the mobile robot 1 has reached a final desired position of the planned route. The drive controller 9*c* controls the drive unit 3 based on a determination result of the determination unit 9*d*.

The communication unit 19 communicates with a communication unit 128 (to be described later) of the terminal apparatus 120 for transmission and reception of information between the terminal apparatus 120 and the mobile robot 1. A specific example of the communication unit 19 is a communication circuit for controlling an antenna. More specifically, the antenna is disposed on the robot main body 12, and the communication circuit communicates via the antenna.

(Drive Unit 3)

The drive unit 3 includes a wheel mechanism 4 including a plurality of wheels 4*a*, 4*b*, motors 141, 142, and encoders 143, 144. The drive unit 3 is a known drive mechanism including the above-described wheel mechanism 4, motors 141, 142, and encoders 143, 144. The drive unit 3 causes the mobile robot 1 to travel under the control by the controller 9. Specifically, the drive unit 3 receives a drive signal from the controller 9 and drives the mobile robot 1 based on the drive signal.

As shown in FIG. 1, the plurality of wheels 4*a*, 4*b* are arranged on both sides of the robot main body 12. The plurality of motors 141, 142 drive the plurality of wheels 4*a*, 4*b*, respectively. The plurality of encoders 143, 144 detect rotation angles of the plurality of motors 141, 142, respectively. Rotation angle information detected by the plurality of encoders 143, 144 is input to the controller 9 and used for drive control of the plurality of motors 141, 142 by the controller 9.

For example, the plurality of wheels 4a, 4b are at least partially fixed to a shaft and rotate together with the shaft. The rotation of the motors 141, 142 applies power via the shaft from the motors 141, 142 to at least a part of the plurality of wheels 4a, 4b as rotation power, thereby allowing the robot main body 12 to be driven.

The drive unit 3 may further include a wheel angle changing motor. The wheel angle changing motor simultaneously changes angles of respective rotation axes of the wheels 4a, 4b with respect to a travel direction of the robot main body 12, thereby allowing the robot main body 12 to turn to left or right in addition to linear motion. Alternatively, the change in the travel direction of the robot main body 12 may be achieved by making rotation velocities or rotation directions of the plurality of motors 141, 142 different from each other.

The drive unit 3 changes, based on the drive signal of the controller 9, the rotation velocities, the rotation directions, or the angles of the rotation axes of the wheels 4a, 4b of the wheel mechanism 4 and magnitude of the power applied to the wheels 4a, 4b to control the travel of the robot main body 12.

(Database 5)

FIG. 4 to FIG. 6 show examples of information recorded in the database 5 of the mobile robot 1. As shown in FIG. 4 to FIG. 6, the information recorded in the database 5 includes the map information (including the planned route information) and self-position information on the mobile robot 1.

The map information shown in FIG. 4 includes a file ID and a file name. The database 5 may have map information for each space where the mobile robot 1 travels. An example of the space in a home environment is a room. Examples of the room include a living space, a dining room, and a bedroom.

Figure 7:
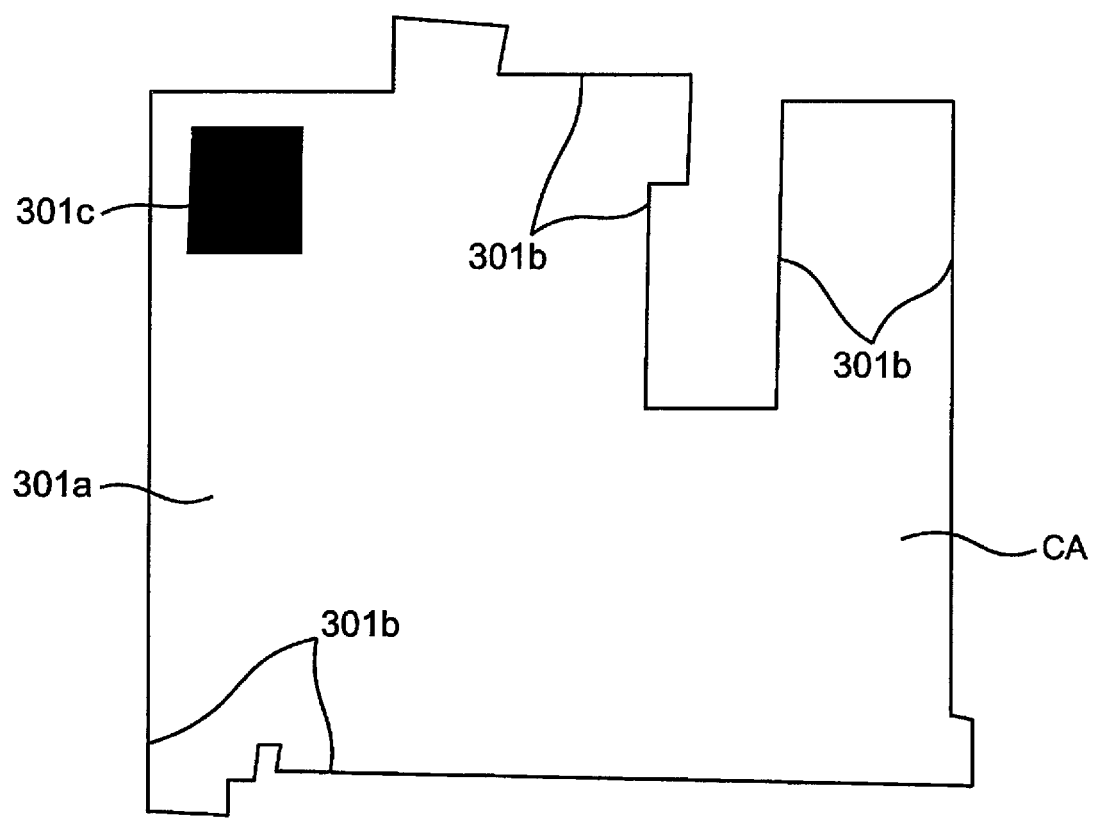
FIG. 7 is a diagram showing a specific example of the map information.

FIG. 7 shows a specific example of the map information. A black rectangle 301c in the map information of FIG. 7 represents an obstacle, which is an area where the mobile robot 1 is unable to travel. The map information in FIG. 7 is a two-dimensional map for a space where the mobile robot 1 travels. Here, the two-dimensional map is a map representing a space viewed from above. For example, when the mobile robot 1 is a cleaner 10, the map information is a map representing a floor 301a that is surrounded by a wall 301b and where the mobile robot 1 travels. Note that the map information may be three-dimensional map information.

The map information may be preliminarily prepared for each space and recorded in the database 5. Alternatively, the information generator 7 may generate the map information based on the measured values of the distance sensor 11 that is measured while the mobile robot 1 travels in a space. Known methods can be used to generate the map information, and, for example, as Non-Patent Document 2, Masahiro Tomono, "Probabilistic Approaches to Localization and Mapping for Mobile Robots", Journal of The Robotics Society of Japan, Vol. 29 (2011) No. 5 pp. 423-426 is referred to.

Figure 8:
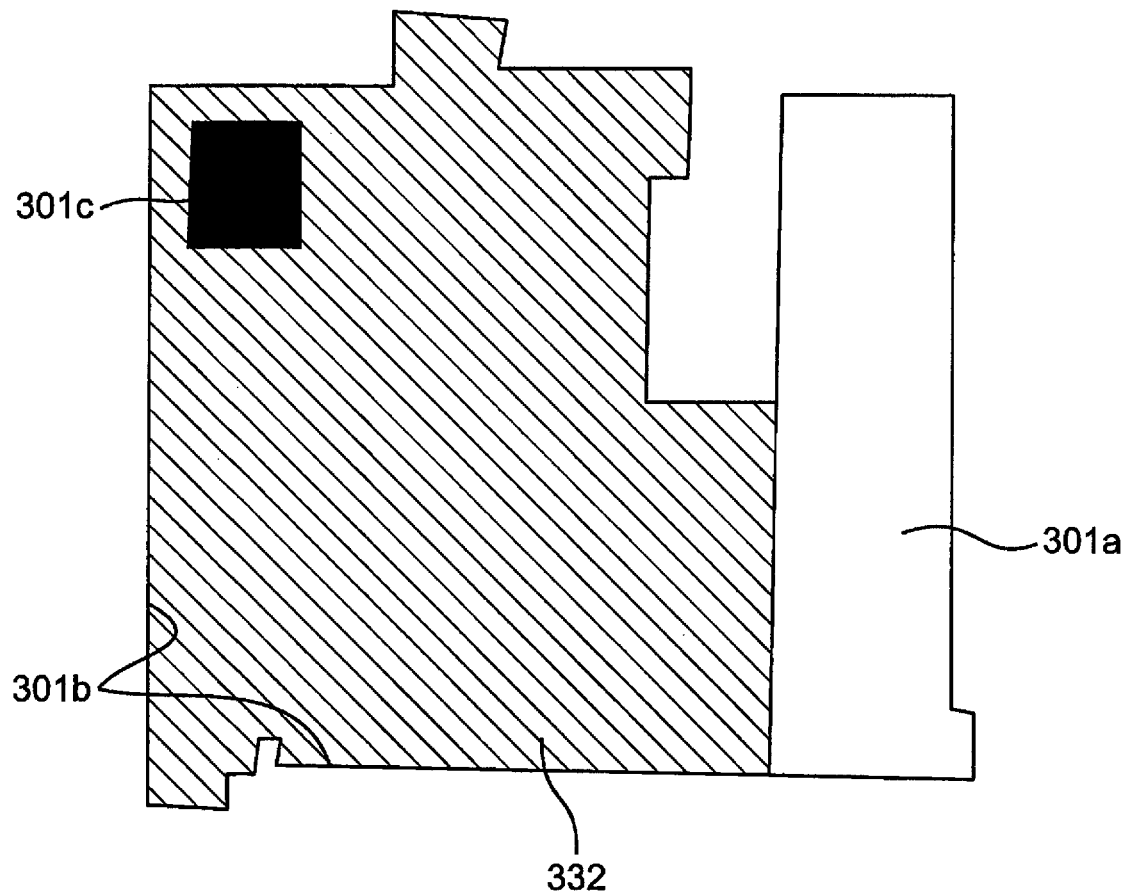
FIG. 8 is a diagram showing another specific example of the map information including an already-cleaned area when the mobile robot is a cleaner.

Further, when the mobile robot 1 is a cleaner, the map information may include, as shown in FIG. 8, map information in which an already-cleaned area is represented with oblique lines.

The planned route information shown in FIG. 5 includes position information (x, y, θ) on the mobile robot 1 at each time. Here, x and y denote a coordinate position of the mobile robot 1 as xy coordinates on the two-dimensional map, and θ denotes the travel direction of the mobile robot 1 on the two-dimensional map. The travel direction is a forward direction of the robot main body 12 when the mobile robot 1 travels forward and is a backward direction of the robot main body 12 when the mobile robot 1 travels backward.

The time included in the planned route information may be an elapsed time since the timer 8 starts counting or the time corresponding to the world time held by the timer 8. The time from t0 to tn includes a time later than the current time. That is, the planned route information includes a planned route along which the mobile robot 1 is to travel.

When the planned route information superimposed on the map information is displayed on the display 119, the planned route can be represented by a figure such as an arrow indicating the travel direction of the mobile robot 1. For example, the information generator 7 (to be described later) is capable of determining a planned travel area of the planned route information that is one example of the map information by the following method.

As a travel space of the mobile robot 1, an area CA to be cleaned of the floor is divided into a plurality of areas in advance. For example, the plurality of areas may be set on the floor by the user.

When contact with any position in at least one of the plurality of areas displayed on the display 119 is detected, the area including the position where the contact has been detected is recognized as an area to be cleaned. Here, examples of the contact include a tap and a click.

A planned travel area 344 (see FIG. 22 and FIG. 23) is generated such that cleaning starts from a predetermined cleaning start position in the area including the contact point. The planned travel area 344 is also referred to as a planned cleaning area. When an area including a point where a tap or a click is made corresponds to the already-cleaned area, the contact may be received as a second cleaning request, and a planned travel area including the tapped or clicked point may be generated.

The self-position information on a robot shown in FIG. 6 includes the position (x, y, θ) of the mobile robot 1 at each time. x, y, θ are the same as the symbols indicating the planned route information. A time included in the self-position information may be the elapsed time since the timer 8 starts counting or the time corresponding to the world time held by the timer 8. In other words, the information shown in FIG. 5 may include position information at a future time, whereas the information shown in FIG. 6 includes position information at a past time.

(Distance Sensor 11)

The distance sensor 11 is mounted on the robot main body 12 and measures a distance between the robot main body 12 and an object or an obstacle in a space as a measured value. For example, the distance sensor 11 is positioned at front of the robot main body 12. Examples of the obstacle include the wall 301b defining the space (see FIG. 7), a chair, and a table.

The distance sensor 11 is a known sensor that is capable of measuring the distance between the robot main body 12 and an object or an obstacle in a space as a measured value. Examples of the distance sensor 11 include an infrared sensor, a laser range finder, and an ultrasonic sensor. The controller 9 is capable of acquiring the current position of the mobile robot 1, as described later, based on measured values of the infrared sensor and the laser range finder.

(Functional Block Diagram of Terminal Apparatus 120)

Figure 9A:
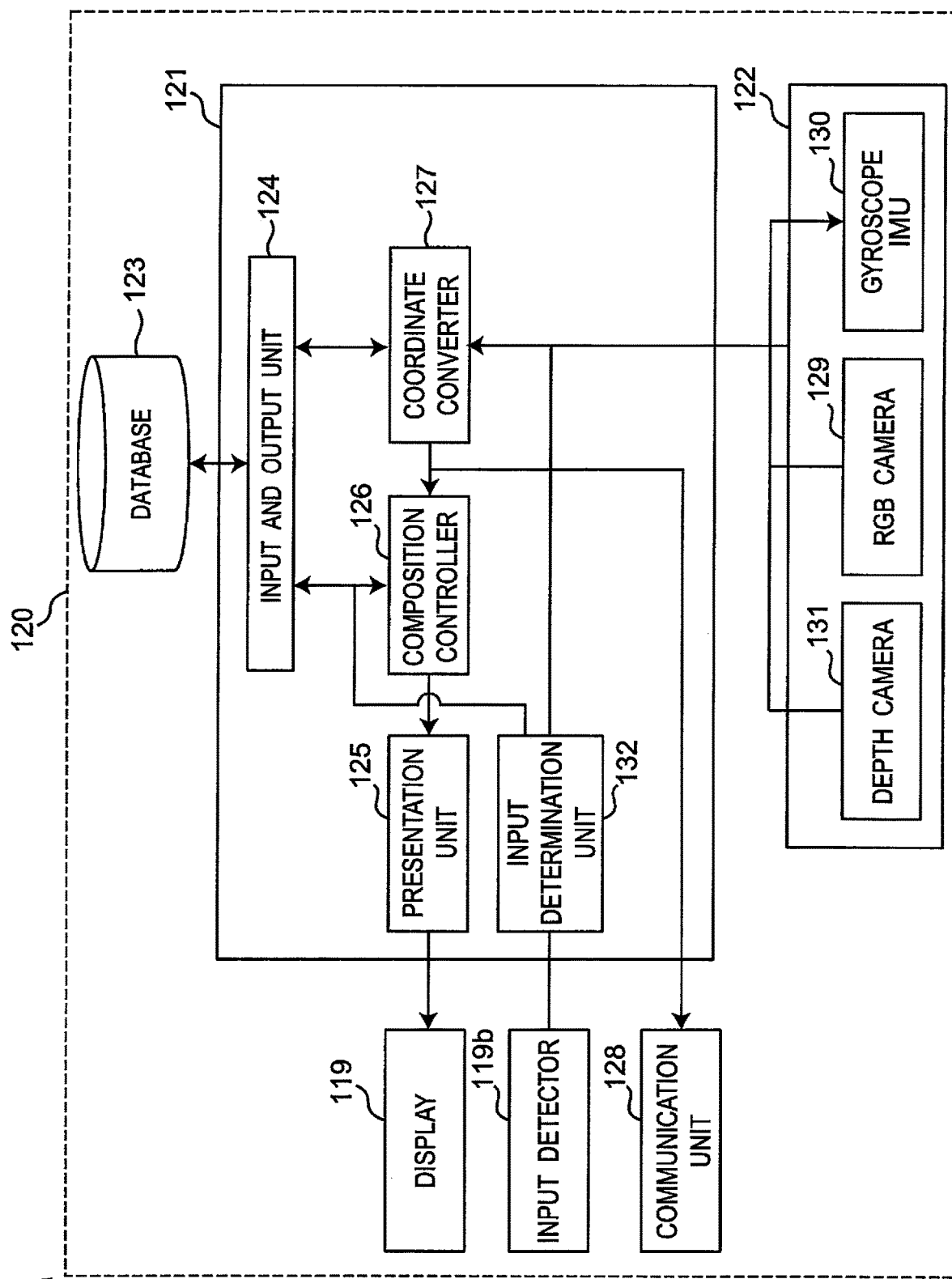
FIG. 9A is a block diagram of the terminal apparatus of FIG. 2.

FIG. 9A shows a functional block diagram of the terminal apparatus 120.

The terminal apparatus 120 includes the control circuit 121, a sensor 122, a database 123, the communication unit 128, and the display 119 including the input detector 119*b*.

(Control Circuit 121)

The control circuit 121 includes an input and output unit 124, a presentation unit 125, a composition controller 126, a coordinate converter 127, and an input determination unit 132. As described above, the control circuit 121 is also referred to as the first control circuit.

The input determination unit 132 is connected to the input detector 119*b* and receives information on the contact point detected by the input detector 119*b* to make an input determination.

The input and output unit 124 is connected to the database 123, the composition controller 126, and the coordinate converter 127. The sensor 122, the communication unit 128, and the input determination unit 132 are connected to the coordinate converter 127. The presentation unit 125 is connected to the composition controller 126. The display 119 is connected to the presentation unit 125.

The input and output unit 124 receives information from the database 123 or outputs information to the database 123. That is, the input and output unit 124 acquires information recorded in the database 123 or records information in the database 123. The information recorded in the database 123 will be described in detail in the description of the database 123.

The coordinate converter 127 performs coordinate conversion between a coordinate system of the mobile robot 1 and a coordinate system of the terminal apparatus 120. Specifically, the coordinate converter 127 coordinate-converts coordinate information included in the map information or the planned route information in the coordinate system of the mobile robot 1 to coordinate information in the coordinate system of the terminal apparatus 120. An instruction input to the terminal apparatus 120 in the coordinate system of the terminal apparatus 120 is converted to an instruction in the coordinate system of the mobile robot 1 and then transmitted to the mobile robot 1.

Figure 9B:
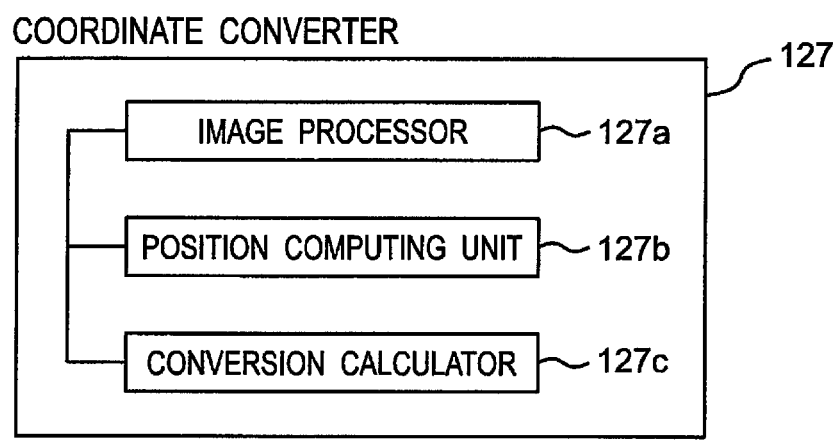
FIG. 9B is a block diagram of a coordinate converter of the terminal apparatus of FIG. 2.

An example of the coordinate converter 127 shown in FIG. 9B includes an image processor 127*a*, a position computing unit 127*b*, and a conversion calculator 127*c*.

The image processor 127*a* performs recognition processing on the camera image to recognize an identification mark 1*a* of the mobile robot 1 and an object and an obstacle in the environment. The image processor 127*a* performs pattern matching on the camera image for extraction processing of the identification mark 1*a*, computation processing of an inclination and size of the identification mark 1*a*, and extraction processing of the object and the obstacle in the environment surrounded by the wall. The computation processing and the extraction processing include processing on information used for determining whether the mobile robot 1 having the identification mark 1*a* is included in the camera image, and processing on other information.

The position computing unit 127*b* computes the position of the mobile robot 1 and the positions of the object and the obstacle in the environment based on a recognition result in the image processor 127*a*. For example, the identification mark 1*a* may be a logo of a manufacturing or sales company formed on an upper surface of the robot main body 12.

The conversion calculator 127*c* performs coordinate conversion on input information including the map information and the planned route information between the robot coordinate system and the terminal apparatus coordinate system. That is, the conversion calculator 127*c* detects input instruction information in the terminal apparatus coordinate system, and converts the instruction information thus detected to instruction information in the robot coordinate system. Examples of the input instruction information include information on the current position of the mobile robot 1, information on the travel space of the mobile robot 1, information on the planned route of the mobile robot 1, and information on a route along which the mobile robot 1 has already traveled, for example, the already-cleaned area.

The composition controller 126 generates a superimposed image by superimposing the instruction information coordinate-converted into the robot coordinate system by the coordinate converter 127 on the information in the coordinate system of the mobile robot 1.

Further, the conversion calculator 127*c* causes the coordinate converter 127 to coordinate-converts the information on the mobile robot 1 in the robot coordinate system including the current position of the mobile robot 1, the map information, and the planned route information into information in the terminal apparatus coordinate system. That is, the conversion calculator 127*c* converts the information on the mobile robot 1 in the robot coordinate system into information in the terminal apparatus coordinate system. The composition controller 126 generates a superimposed image by superimposing the information on the mobile robot 1 on the camera image taken by the terminal apparatus 120.

These superimposed images are transmitted from the communication unit 128 to the communication unit 19 of the mobile robot 1. Furthermore, the composition controller 126 receives, from the communication unit 128, the information in the coordinate system of the mobile robot 1 transmitted from the communication unit 19 of the mobile robot 1 and received by the communication unit 128. The composition controller 126 superimposes the information in the coordinate system of the mobile robot 1 received from the communication unit 128 on instruction information coordinate-converted into the coordinate system of the terminal apparatus 120 by the coordinate converter 127 and information in the coordinate system of the terminal apparatus 120. The superimposed information is output from the composition controller 126 to the presentation unit 125.

The presentation unit 125 displays the superimposed information output from the composition controller 126 on the display 119.

Figure 9C:
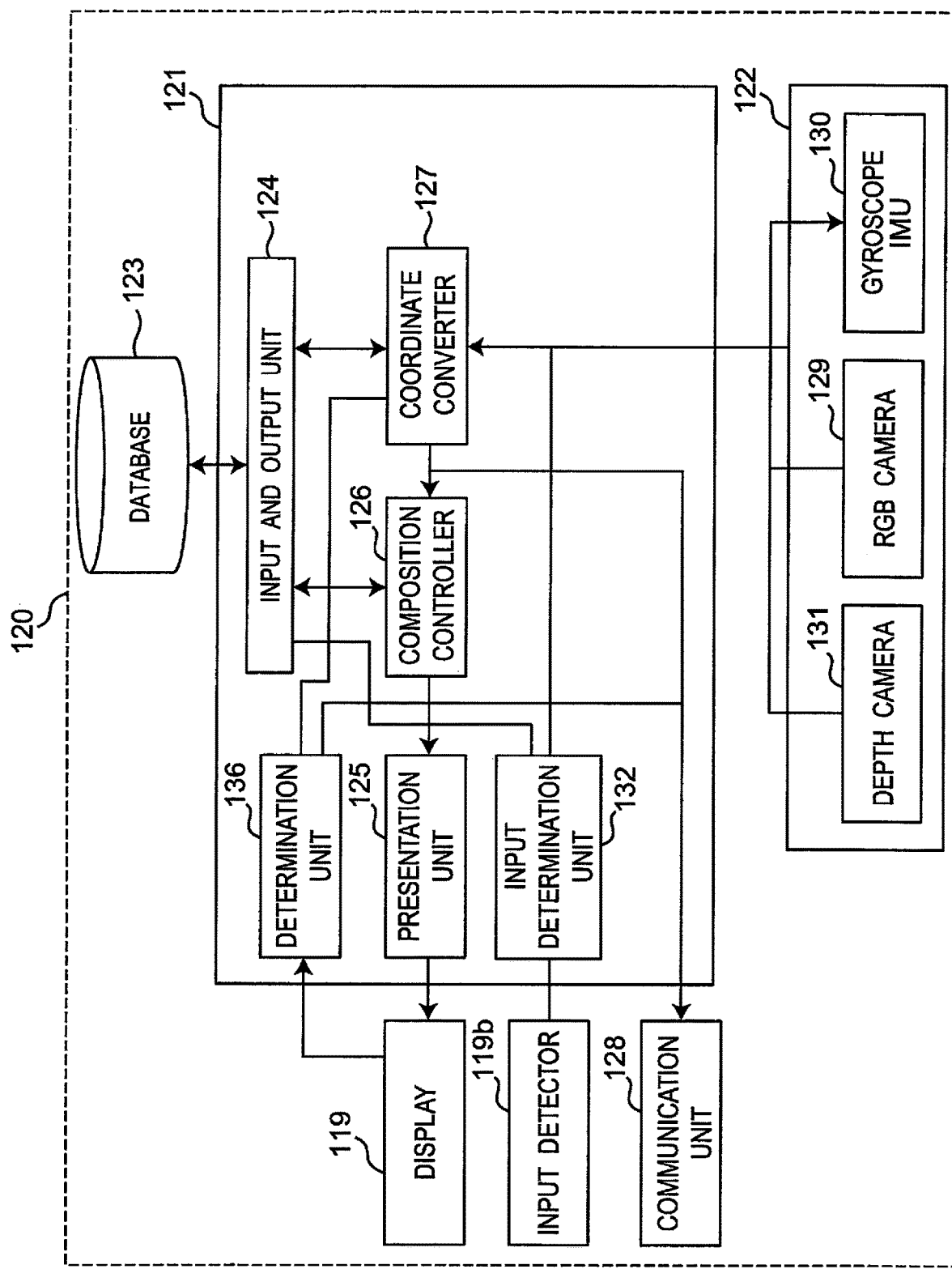
FIG. 9C is a block diagram of a terminal apparatus according to a modification of the first embodiment.

As shown in FIG. 9C, for a fourth operation (4) (to be described later), the control circuit 121 further includes a determination unit 136. The determination unit 136 is connected to the coordinate converter 127. The determination unit 136 determines whether the mobile robot 1 is shown on the display 119 of the terminal apparatus 120. As a specific example, the image processor 127*a* of the coordinate converter 127 performs pattern matching on the camera image capturing the mobile robot 1 taken by the user with the camera 129 to extract the identification mark 1*a* of the mobile robot 1. The determination unit 136 determines whether the identification mark 1*a* is included in the camera image based on a result of this extraction processing. Specifically, when the identification mark 1*a* is included in the camera image, the determination unit 136 determines that the mobile robot 1 is included in the camera image. Further, when the identification mark 1*a* is not included in the camera image, the determination unit 136 determines that the mobile robot 1 is not included in the camera image. The determination result of the determination unit 136 is input to the coordinate converter 127.

The input detector 119*b* is, as described above, the contact point detector corresponding to a touchpad incorporated into the touch panel of the display 119 or operation buttons or a key of the terminal apparatus 120, and a user's instruction is input as a contact point(s) via the input detector 119b. When a fingertip(s) of the user comes into contact with the touch panel, the input determination unit 132 detects the contact as a contact point(s) via the input detector 119b and determines that it is a touch, a click, or a swipe motion made by the user based on the contact point(s) thus detected. For example, on the screen 119a where the planned route of the mobile robot 1 is displayed, when the input detector 119b detects a contact point(s) where the fingertip(s) of the user comes into contact with a position in a direction different from a direction indicated by an arrow or a position away from a line, the arrow or the line indicating the planned route of the mobile robot 1, the input determination unit 132 determines that the contact point is different from the planned route and uses the contact point as information for generating another planned route including the contact point.

That is, at this time, on the screen where the route along which the mobile robot 1 has already traveled and the planned route along which the mobile robot 1 is to travel are displayed, the input determination unit 132 can determine whether the contact point(s) detected by the input detector 119b is in a direction different from the direction of the planned route of the mobile robot 1 or at a position away from the planned route.

(Sensor 122)

The sensor 122 includes a depth camera 131, a camera 129, and a gyroscope 130.

The camera 129 is triggered by the user to take the camera image, and the image thus taken can be displayed on the display 119. In particular, the camera 129 can be used for taking an image of the identification mark 1a given to the mobile robot 1 and estimating the position of the terminal apparatus 120 from the size and inclination of the identification mark 1a thus imaged.

The depth camera 131 is a camera capable of measuring a depth to a subject (in other words, a distance to the subject), and measures the distance from the mobile robot 1 to the terminal apparatus 120 as described later.

With an angle of the terminal apparatus 120 that has undergone calibration defined as a reference, the gyroscope 130 detects a rotation angle of the terminal apparatus 120 relative to the reference. Instead of estimating the position of the terminal apparatus 120 from the inclination of the identification mark 1a imaged by the camera 129 as described above, the gyroscope 130 may be used. The use of the gyroscope 130 achieves higher accuracy; thus, the gyroscope 130 may also be used for computing the inclination.

(Database 123)

Through the communication between the communication unit 128 of the terminal apparatus 120 and the communication unit 19 of the mobile robot 1, information the same as the information recorded in the database 5 of the mobile robot 1 is recorded in the database 123. That is, the information recorded in the database 123 includes the map information, the planned route information, and the self-position information on the mobile robot 1 as shown in FIG. 10A to FIG. 10C, as in FIG. 4 to FIG. 6. Furthermore, as the information recorded in the database 123, for example, a velocity of the mobile robot 1 in a state where the mobile robot 1 is not shown in the camera image displayed on the terminal apparatus 120 and information indicating a relationship between the state and the velocity of the mobile robot 1 are recorded. Further, information on the planned route generated when the user inputs a plurality of contact points on the touch panel is also recorded in the database 123.

(Communication Unit 128)

The communication unit 128 communicates with the communication unit 19 of the mobile robot 1 for transmission and reception of information. Specific examples of the communication unit 128 include an antenna and a communication circuit that controls the antenna.

Figure 28A:
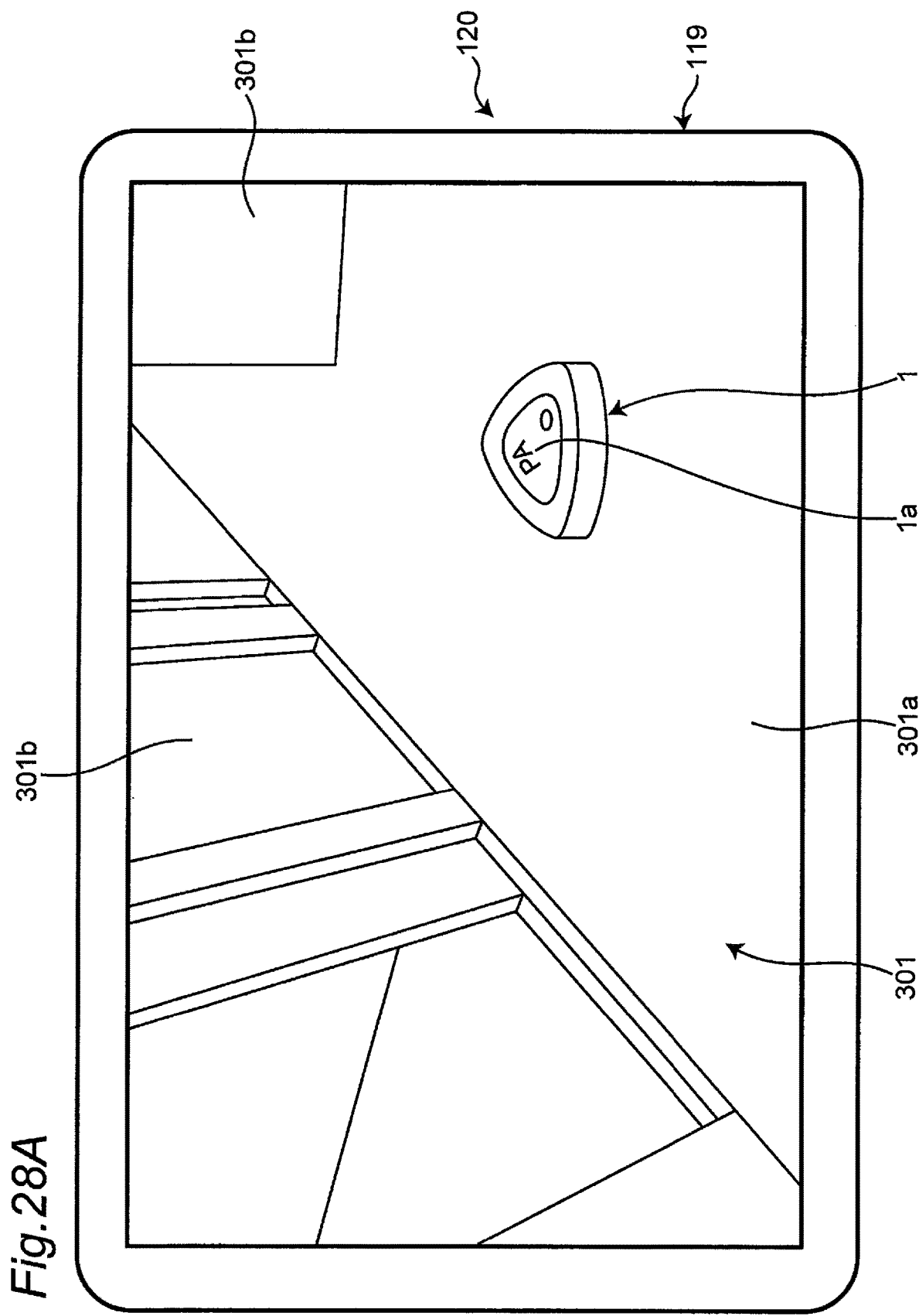
FIG. 28A is a diagram showing a display example of a gray-scale camera image taken by a camera, the camera image capturing a travel space of the mobile robot of FIG. 11.

The display 119 displays superimposed information input from the presentation unit 125. As described above, the display 119 is a touch panel including the input detector 119b. FIG. 11 shows an example of the travel space displayed on the display 119. Here, after the camera 129 takes an image of the travel space where the cleaner as an example of the mobile robot 1 travels in a room, the image of the travel space is displayed on the display 119 as shown in FIG. 28A.

(Operation of Mobile Robot in Control System)

The control system of the mobile robot 1 that controls the operation of the mobile robot 1 performs the following five operations including a first operation (1) to a fifth operation (5). These five operations including the first operation (1) to the fifth operation (5) may be separately performed, or may be desirably combined as appropriate. For example, the first operation (1) may serve as a basic operation, and one or more of the second operation (2) to the fifth operation (5) may be combined with the first operation (1) as appropriate. Before describing the flowchart shown in FIG. 13, the first operation to the fifth operation will be described.

First Operation (1):

As shown in FIG. 12, the mobile robot 1, the map information 301, and the planned route information 302 are displayed on the display 119 of the terminal apparatus 120.

More specifically, the map information 301 and the planned route information 302 superimposed on the image of mobile robot 1 taken by the camera 129 is displayed. In FIG. 12, for example, the floor 301a that is an area where the mobile robot 1 can travel is filled in with white, and an obstacle including the wall 301b is filled in with black. Further, an example of the planned route information 302 is an arrow indicating the travel direction.

Figure 14:
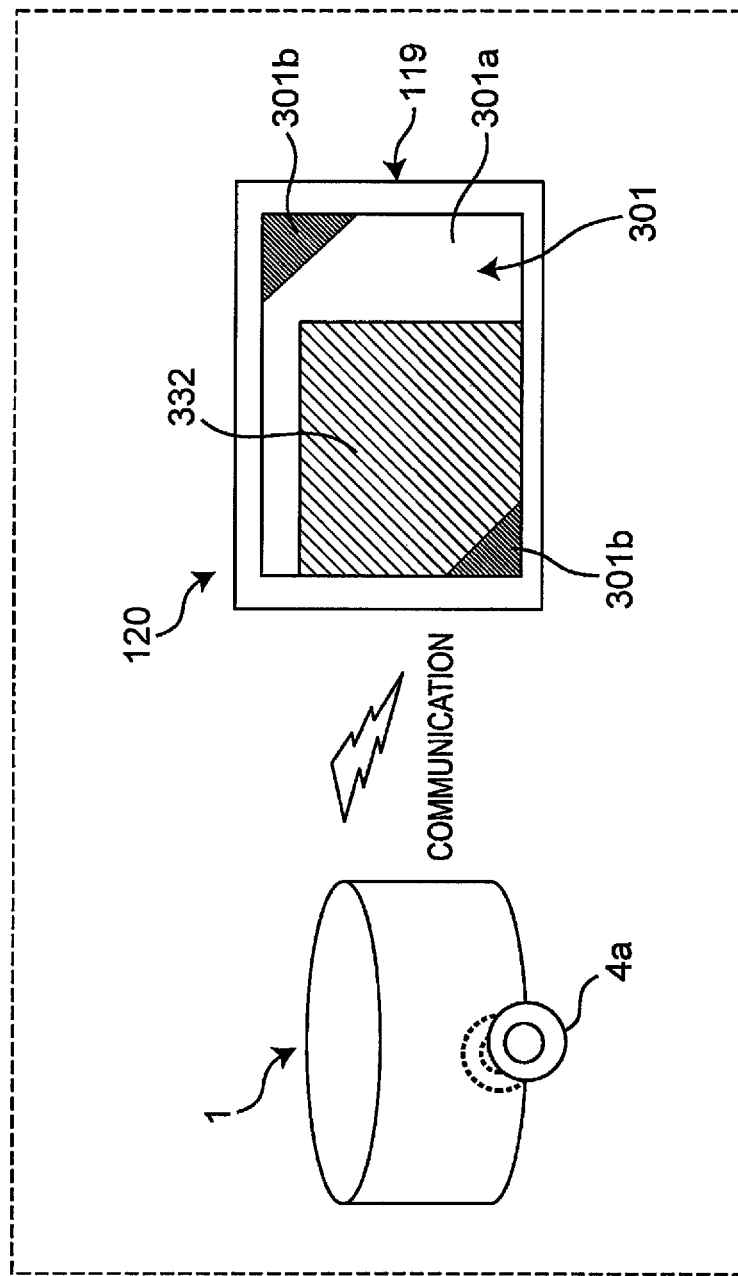
FIG. 14 is a diagram for describing a case where a second operation (2) is performed in the control system of the mobile robot.

Second Operation (2):

As shown in FIG. 14, a cleaning result is displayed on the display 119 of the terminal apparatus 120.

Specifically, information on an already-cleaned area is displayed on the map information of the terminal apparatus 120.

Figure 15:
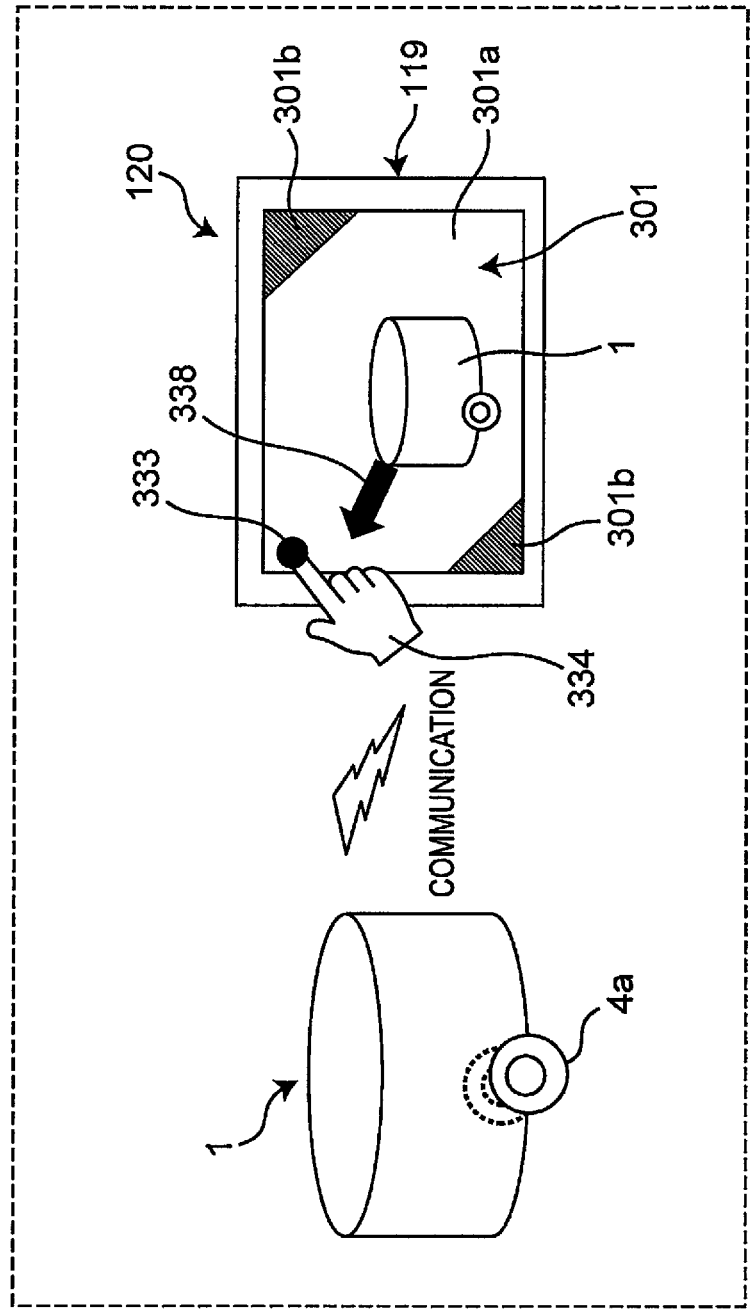
FIG. 15 is a diagram for describing a case where a third operation (3) is performed in the control system of the mobile robot.

Third Operation (3):

As shown in FIG. 15, when the mobile robot 1, the map information, and the planned route information are displayed on the display 119 of the terminal apparatus 120, an instruction from the user is received. Here, as the instruction from the user, the display 119 detects contact with a top of the display 119. The contact with the top of the display 119 is, in other words, contact with the screen 119a.

Figure 17:
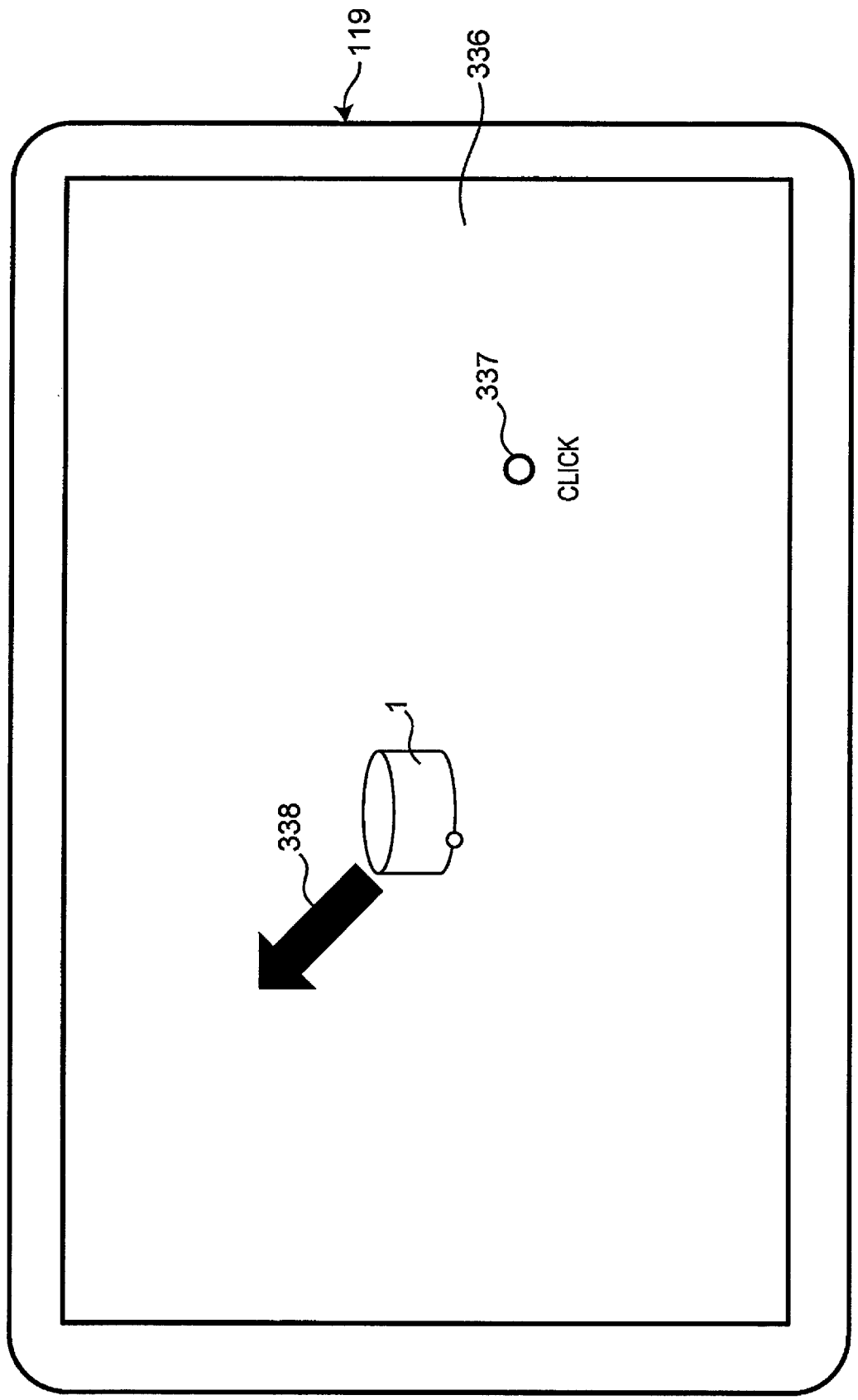
FIG. 17 is a diagram showing a case where a user touches or clicks on a desired position of the mobile robot on a map displayed on the display of the terminal apparatus.

Specifically, as shown in FIG. 17, the display 119 detects that the user has touched or clicked on a desired position 337 of the mobile robot 1 on a map 336 displayed on the display 119 of the terminal apparatus 120. As a result, when the input determination unit 132 determines, via the input detector 119b, that the desired position 337 has been input, the mobile robot 1 travels toward the desired position 337 where the touch has been made as a final desired position.

Figure 18:
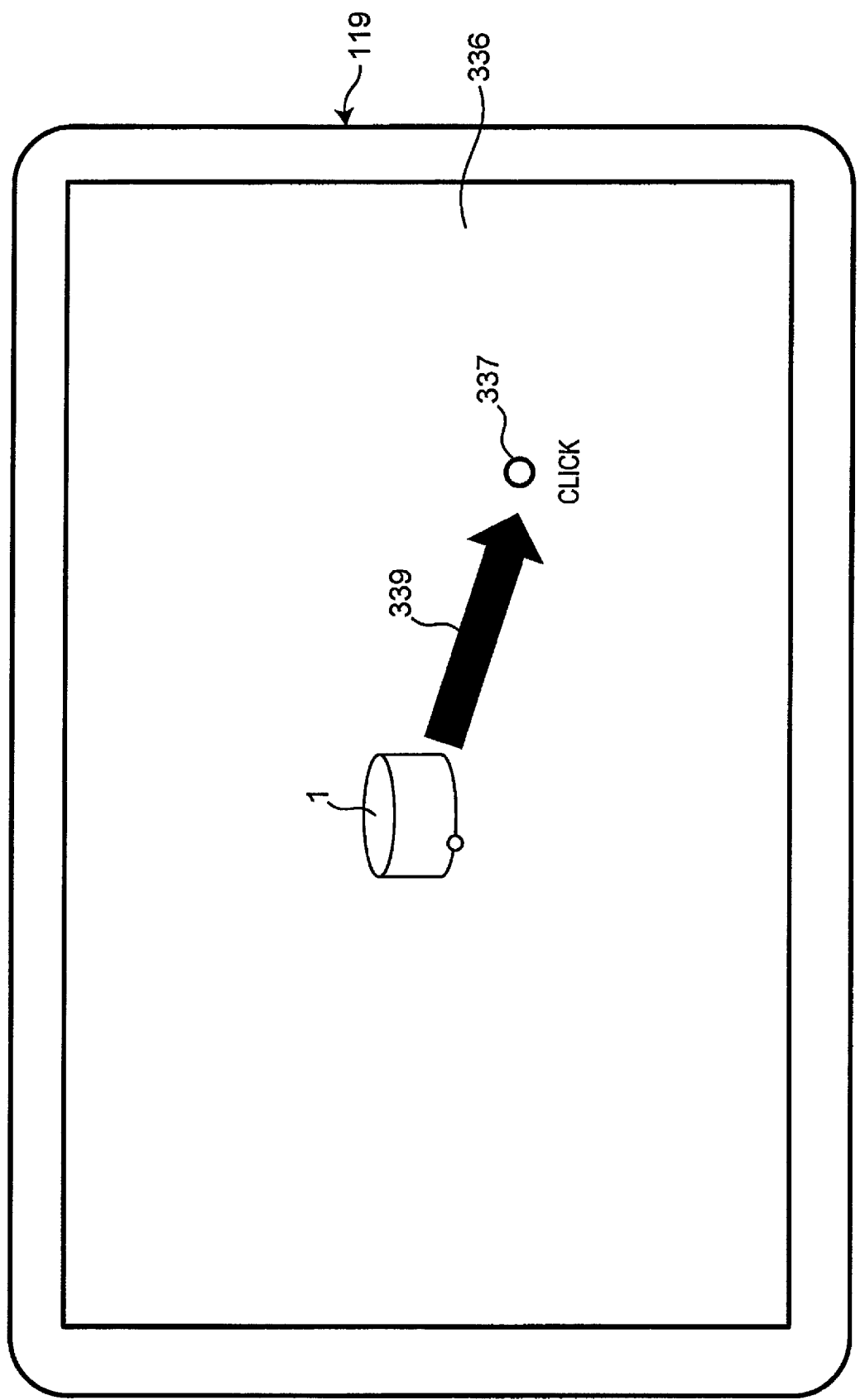
FIG. 18 is a diagram showing a case where a second planned route different from a first planned route initially displayed is automatically generated and displayed after FIG. 17.

That is, when the final desired position 337 is designated with the terminal apparatus 120, as shown in FIG. 18, the input determination unit 132 determines that the final desired position 337 deviates from a first planned route 338 initially displayed and automatically generates a second planned route 339 different from the first planned route 338 initially displayed. Here, "second planned route 339 different from the first planned route 338" means that the second planned route 339 and the first planned route 338 do not entirely agree with each other. In other words, the second planned route 339 and the first planned route 338 are not completely identical to each other.

Figure 19:
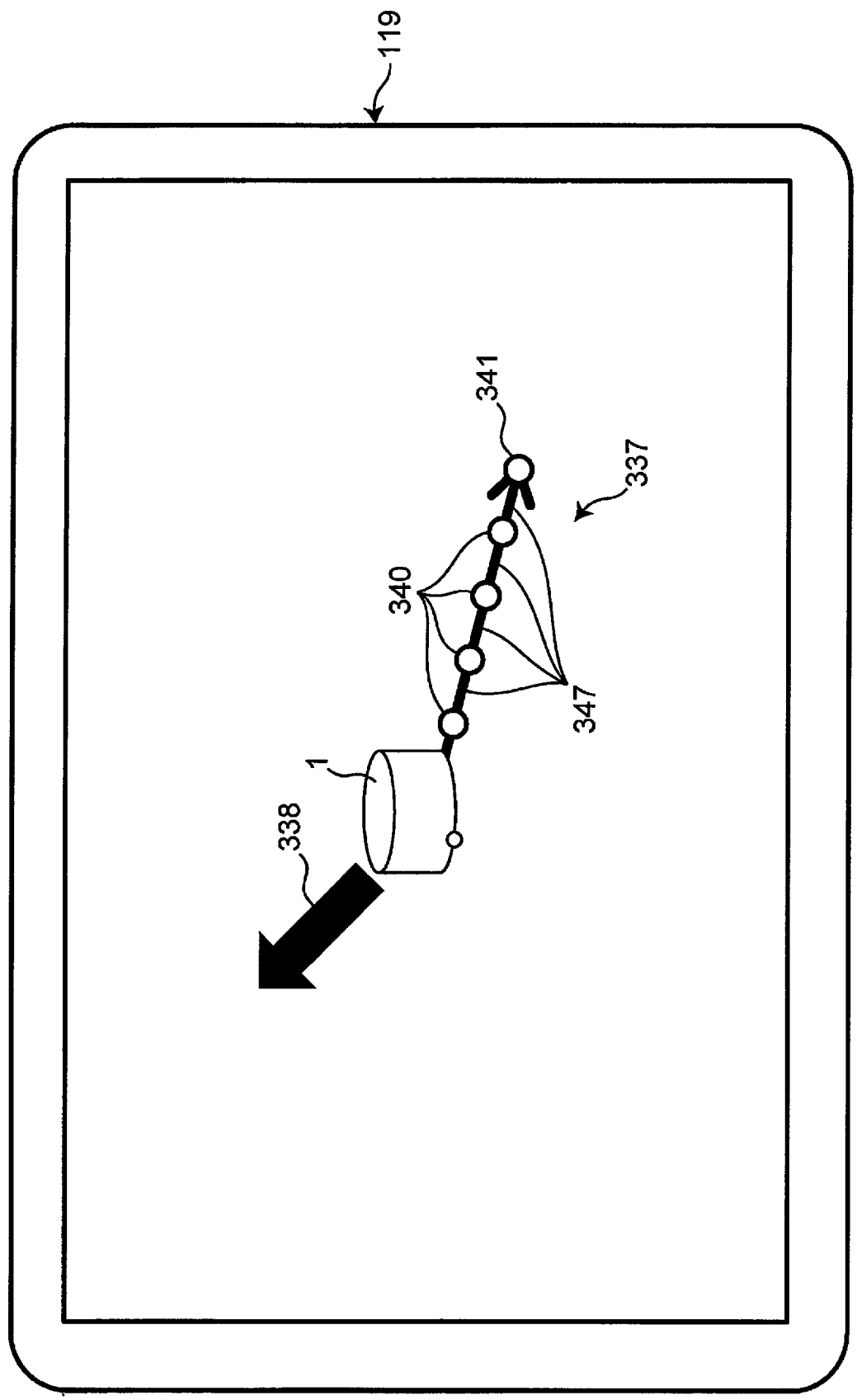
FIG. 19 is a diagram showing a case where the user makes a linear swipe to the desired position of the mobile robot on the map displayed on the display of the terminal apparatus.

Another example is shown in FIG. 19. In the example shown in FIG. 19, on the map 336 displayed on the display 119 of the terminal apparatus 120, the user performs a linear swipe motion to indicate the desired position 337 of the mobile robot 1. The linear swipe motion corresponds to contact with the mobile robot 1, a plurality of contact points 340, and a contact point 341 on the display 119 in this order. As a result, the plurality of contact points 340, 341 corresponding to the swipe motion are input by the input detector 119b. At this time, the input determination unit 132 determines that the input of the plurality of contact points 340, 341 made by the input detector 119b corresponds to an instruction for traveling from a first contact point 340 to a last contact point 341 among the plurality of contact points 340, 341.

Figure 21:
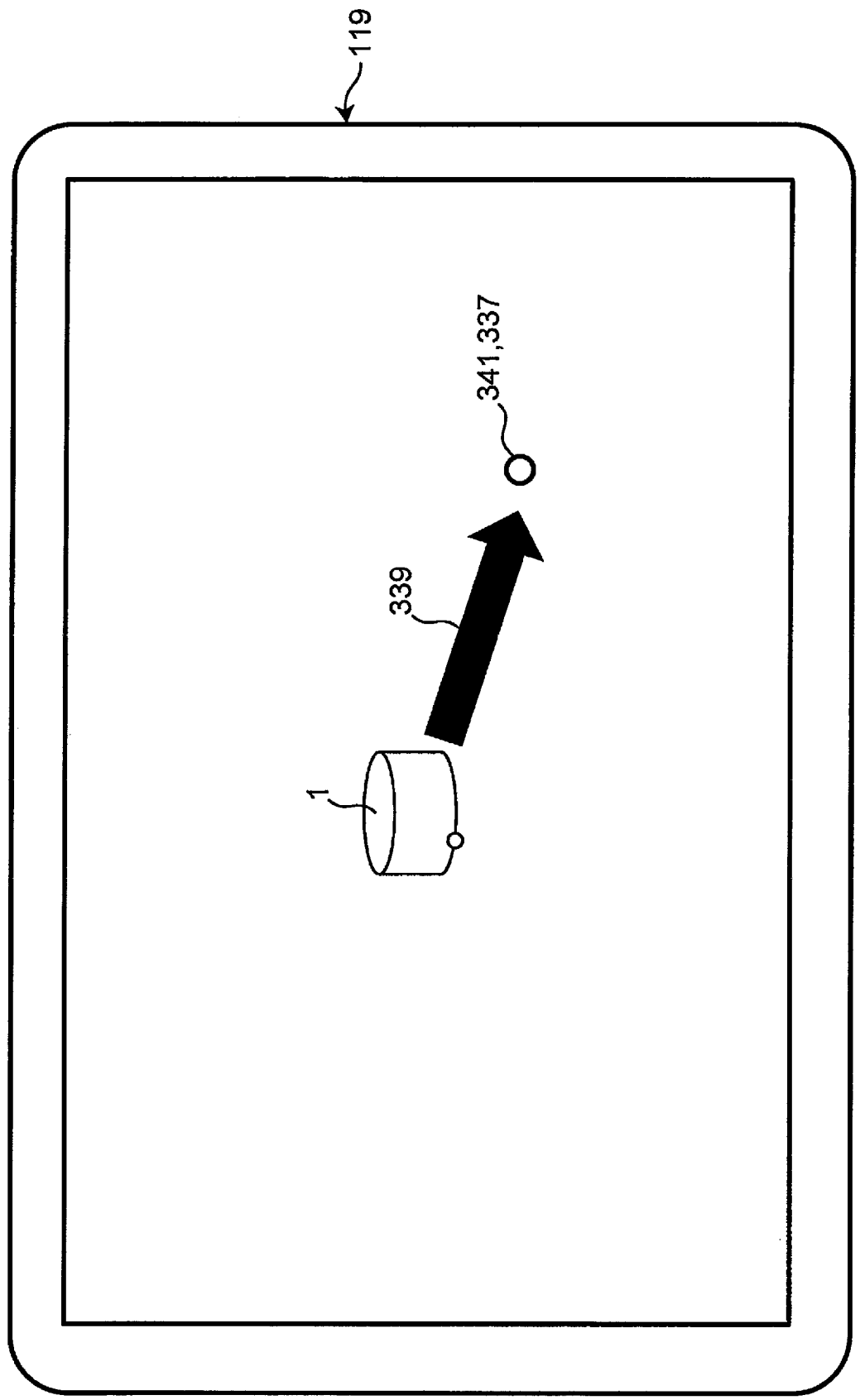
FIG. 21 is a diagram showing a case where the second planned route different from the first planned route initially displayed is automatically generated and displayed after FIG. 19.

Alternatively, the input determination unit 132 determines that the input corresponds to an instruction for traveling from the current position of the mobile robot 1 (that is, a position when the input through the swipe motion is detected) to the last contact point 341 among the plurality of contact points 340, 341. As a result, a change is made from the planned route 338 before the contact is made by the user shown in FIG. 19 to the planned route 339 after the contact is made by the user shown in FIG. 21. Specifically, in FIG. 21, the input determination unit 132 determines that a route according to the input is different from the planned route 338 before the contact is made by the user shown in FIG. 19 and automatically generates the second planned route 339 extending from the first contact point 340 or the current position of the mobile robot 1 (for example, the position when the input through the swipe motion is detected) to the last contact point 341. On the display 119, the planned route 339 thus generated is displayed.

For example, the input determination unit 132 may determine that the orientation of the mobile robot 1 is different based on a line segment 347 passing through each of the plurality of contact points 340 included in the swipe motion shown in FIG. 19 and automatically generate the second planned route 339 for changing the orientation of the mobile robot 1.

Figure 20:
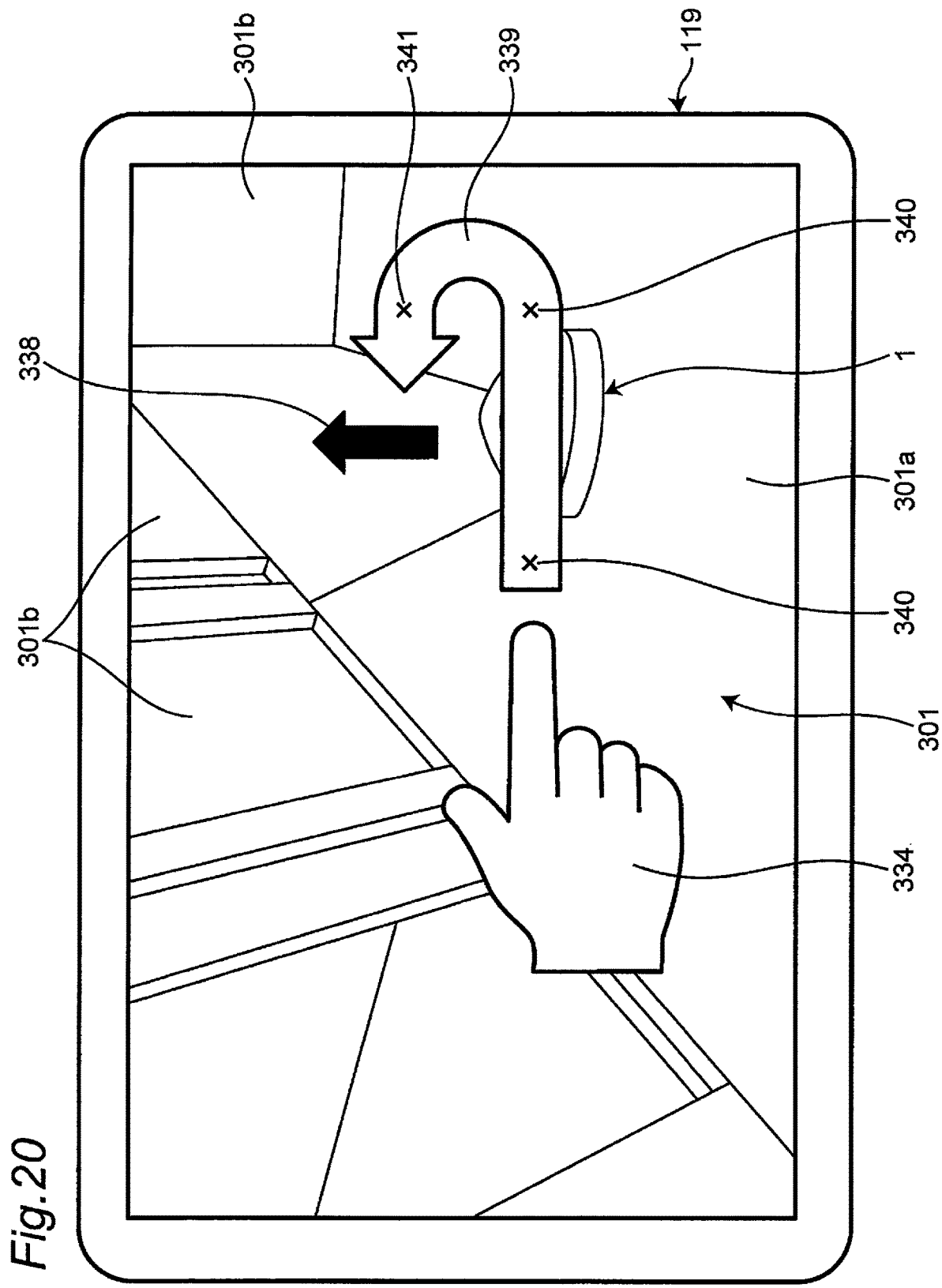
FIG. 20 is a diagram showing a specific example in which the user makes a swipe to the desired position of the mobile robot on the map displayed on the display of the terminal apparatus to change the first planned route to the second planned route.
Figure 28B:
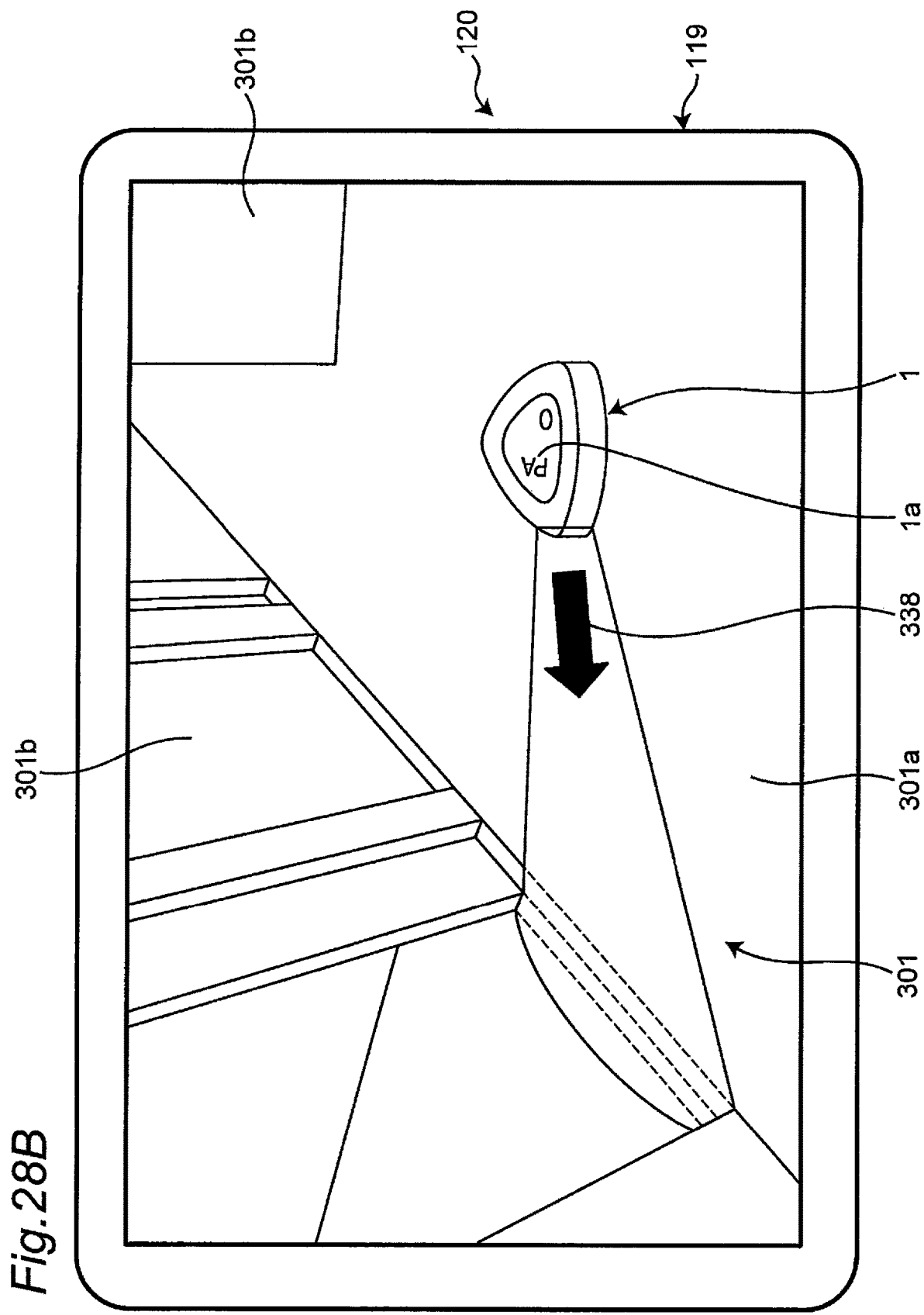
FIG. 28B is a diagram showing a case where the first planned route is superimposed on FIG. 28A and displayed on the display.

As shown in FIG. 20, also when a swipe motion having any shape such as U-shape is detected, the input determination unit 132 determines that, for example, a route according to the input is different from the first planned route 338 initially displayed shown in FIG. 28B as in the case of the linear swipe motion and automatically generates the second planned route 339 that is different from the first planned route 338 and extends from the first contact point 340 to the last contact point 341.

That is, when the swipe motion is a linear motion on the screen, the input determination unit 132 determines that a route according to the input is different from the first planned route 338 and automatically generates the second planned route 339 having a travel direction extending from the current position of the mobile robot 1 toward the last contact point 341 included in the swipe motion. Further, when the swipe motion is a curved motion on the screen, the input determination unit 132 determines that a route according to the input is different from the first planned route 338 and automatically generates, based on a line segment passing through each of the plurality of contact points 340 included in the swipe motion, the second planned route 339 for changing the orientation of the mobile robot 1.

Figure 22:
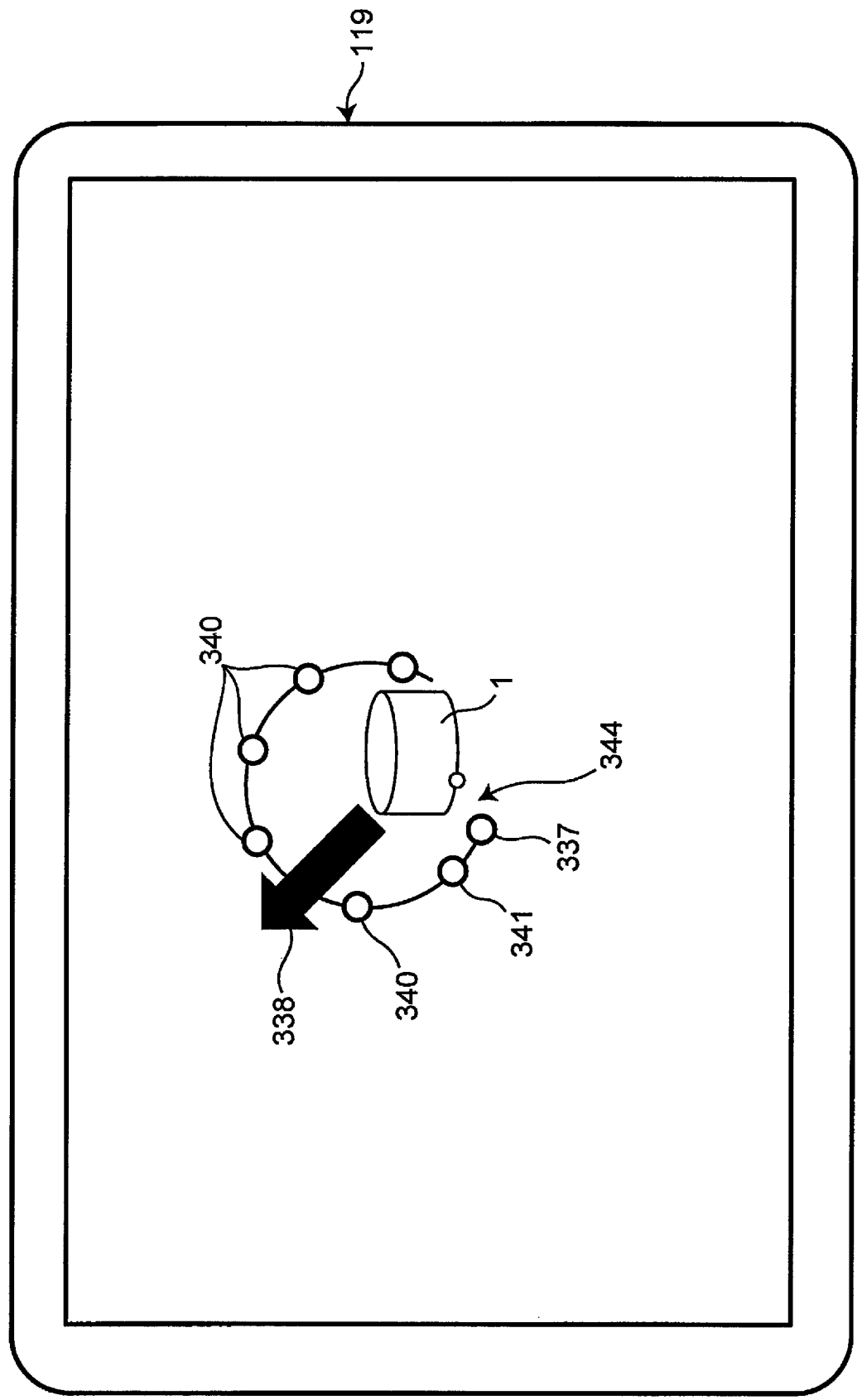
FIG. 22 is a diagram showing a case where the user makes a spiral swipe to the desired position of the mobile robot on the map displayed on the display of the terminal apparatus.
Figure 23:
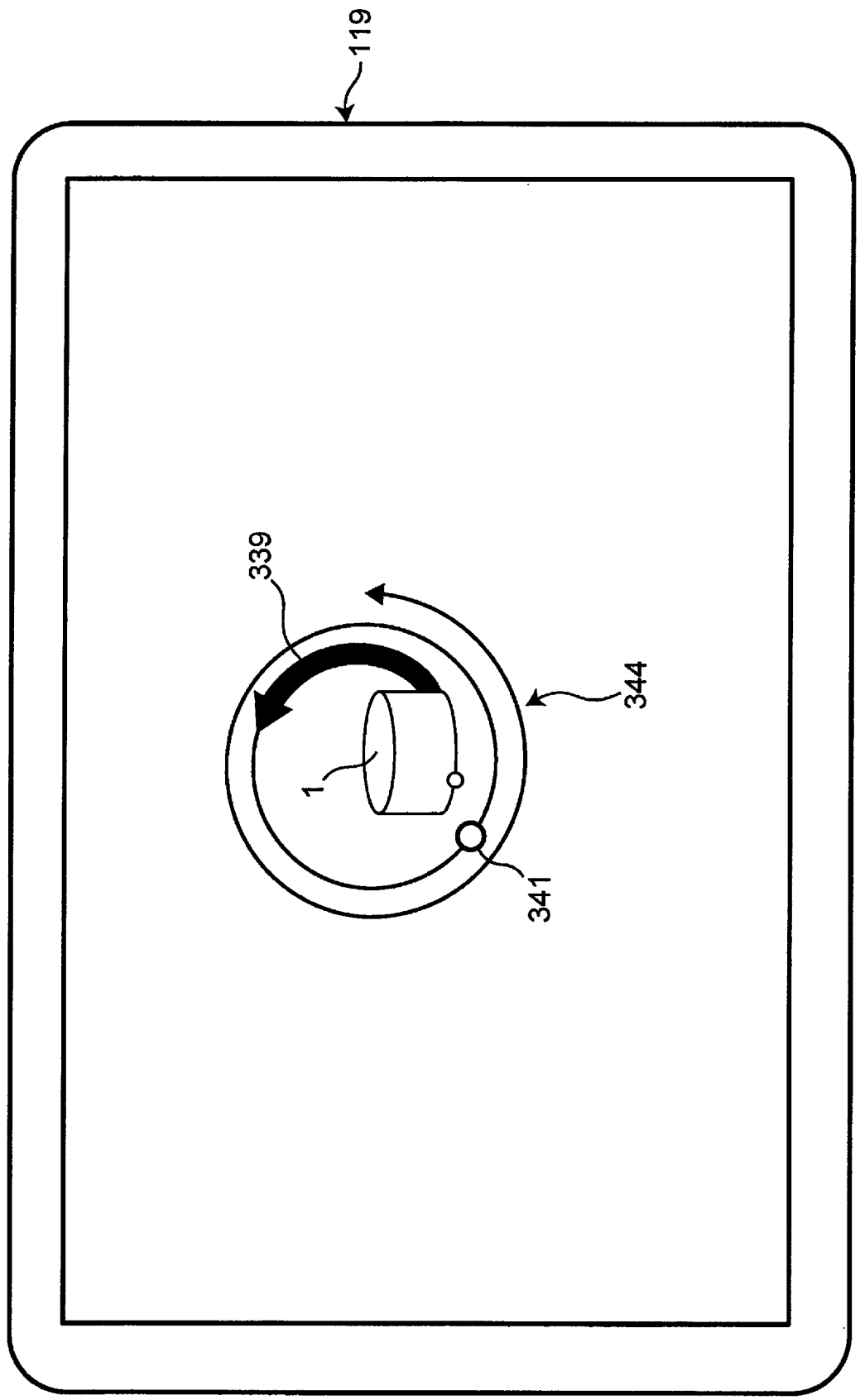
FIG. 23 is a diagram showing a case where the second planned route different from the first planned route initially displayed is automatically generated and displayed after FIG. 22.

Yet another example is shown in FIG. 22. As shown in FIG. 22, when detecting input of the desired position 337 of the mobile robot 1 made by the user through a curved swipe motion such as a spiral swipe motion on the map 336 displayed on the display 119 of the terminal apparatus 120, the input detector 119b detects the plurality of contact points 340, 341 corresponding to the swipe motion. At this time, the input determination unit 132 determines that the input corresponds to an instruction for traveling to the last contact point 341 among the plurality of contact points 340, 341 detected as the input. Therefore, as shown in FIG. 23, when determining that a route according to the input is different from the first planned route 338 initially displayed, the input determination unit 132 automatically generates the second planned route 339 having a spiral course that is different from the first planned route 338 and gradually expands outward from the current position through the plurality of contact points 340 and the last contact point 341 to finally reach a final desired position close to the wall that defines an area including the current position of the mobile robot 1.

Furthermore, when the swipe motion that continues for a time equal to or greater than a first threshold is detected and the input determination unit 132 determines that the second planned route 339 having a travel direction extending from the first contact point of the swipe motion toward the last contact point included in the swipe motion is different from the first planned route 338, the input determination unit 132 may automatically generate the second planned route 339. Here, the detection made only for the swipe motion that continues "for a time equal to or greater than a first threshold" is intended to exclude "contact during a time less than the first threshold". That is, it is intended to exclude a case where the user unintentionally makes contact with the screen.

When the plurality of contact points between the user and the screen included in the swipe motion form a curved line, the curved line is different from a straight line connecting the first contact point and the last contact point in the swipe motion. Therefore, when the plurality of contact points between the user and the screen included in the swipe motion form a curved line and the input determination unit 132 determines that the second planned route 339 having a travel direction extending from the contact point detected a predetermined time before the end of the swipe motion toward the last contact point included in the swipe motion is different from the first planned route 338, the input determination unit 132 may automatically generate and display the second planned route 339. An example of the contact point detected the predetermined time before is a contact point 0.1 seconds before the end of the swipe motion.

Further, the travel direction may be determined based on a result of calculating a differential value of each of the points in an order from the last point of the swipe motion to the first point of the swipe motion. Specifically, in the input determination unit 132, when a rate of change between a differential value of each of the points calculated in the order from the last point of the swipe motion to the first point of the swipe motion and a preceding differential value is equal to or greater than a predetermined value and the input determination unit 132 determines that the second planned route 339 having a travel direction extending from the point where the preceding differential value is calculated toward the last point of the swipe motion is different from the first planned route 338, the input determination unit 132 may generate and display the second planned route 339.

Here, as a method of generating a planned route (that is, the second planned route) having a travel direction extending from one point (for example, the first contact point or the position of the mobile robot) to another point (for example, the last contact point), a known method of generating a planned route by interpolating between coordinates of two points with a straight line is applicable.

When determining that the second planned route 339 having a travel direction extending from the contact point detected the predetermined time before the end of the swipe motion toward the last contact point included in the swipe motion is different from the first planned route 338, the input determination unit 132 may automatically generate and display the second planned route 339.

Note that, when generating the second planned route 339, the input determination unit 132 may generate the second planned route 339 that does not overlap the first planned route 338 on the screen 119a displayed when the input detector 119b detects the contact point.

Upon arriving at the final desired position 337, the mobile robot 1 stops under the control by the controller 9. The communication unit 19 of the mobile robot 1 transmits an arrival signal to the communication unit 128 of the terminal apparatus 120 after the mobile robot 1 stops.

Figure 24B:
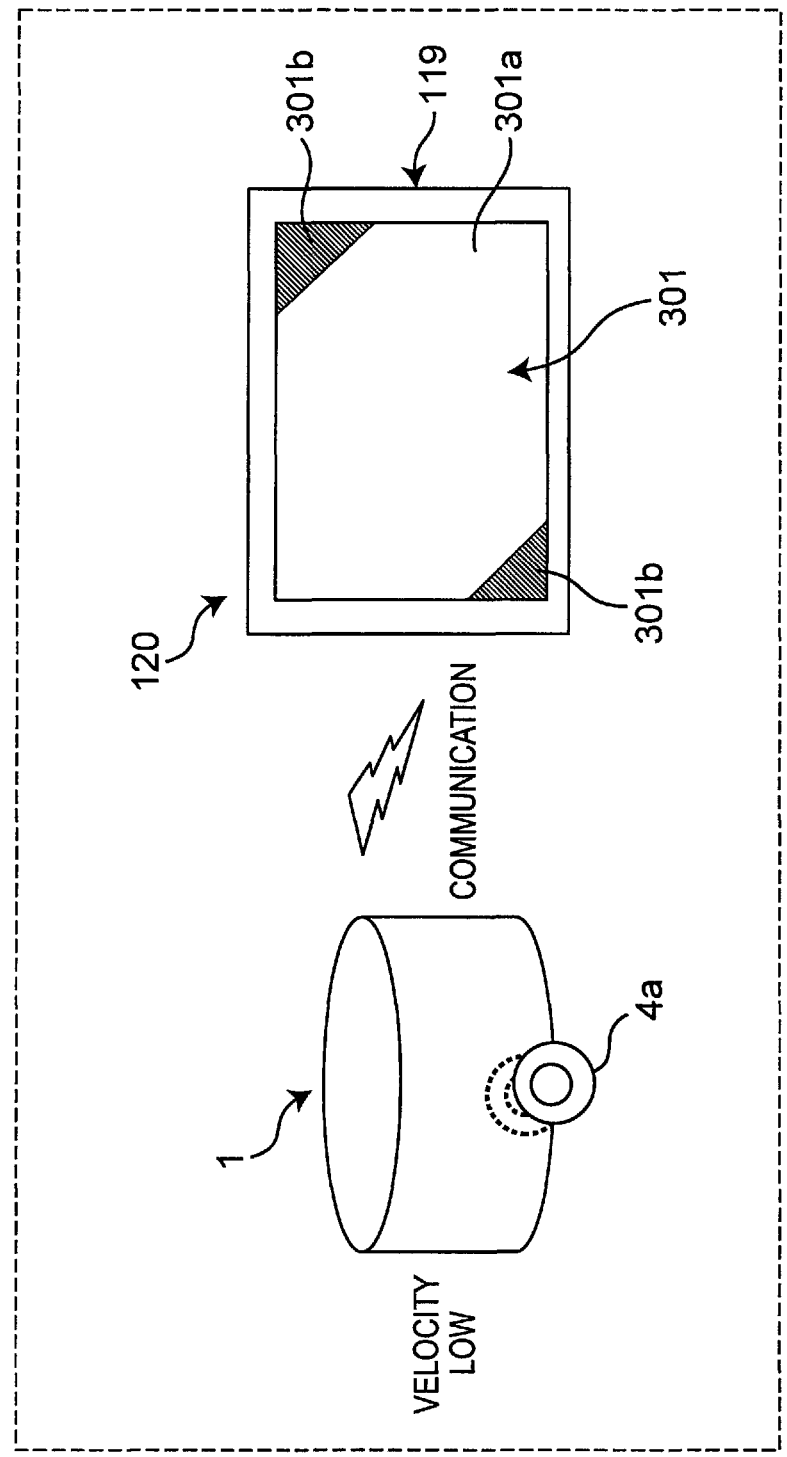
FIG. 24B is a diagram showing a case where the velocity of the mobile robot is set lower than the velocity for cleaning operation when the mobile robot is not shown on the display of the terminal apparatus.

Fourth Operation (4):

As shown in FIG. 24A and FIG. 24B, the velocity of the mobile robot 1 is changed in accordance with whether the mobile robot 1 is shown on the display 119 of the terminal apparatus 120.

Specifically, as shown in FIG. 24A, when the mobile robot 1 is shown on the display 119 of the terminal apparatus 120, the mobile robot 1 travels at a predetermined velocity (a first velocity). Here, the predetermined velocity is a velocity for cleaning operation when the mobile robot 1 is a robot cleaner. As shown in FIG. 24B, when mobile robot 1 is not shown on the display 119 of the terminal apparatus 120, the mobile robot 1 travels at a velocity (a second velocity) lower than the predetermined velocity.

Figure 26A:
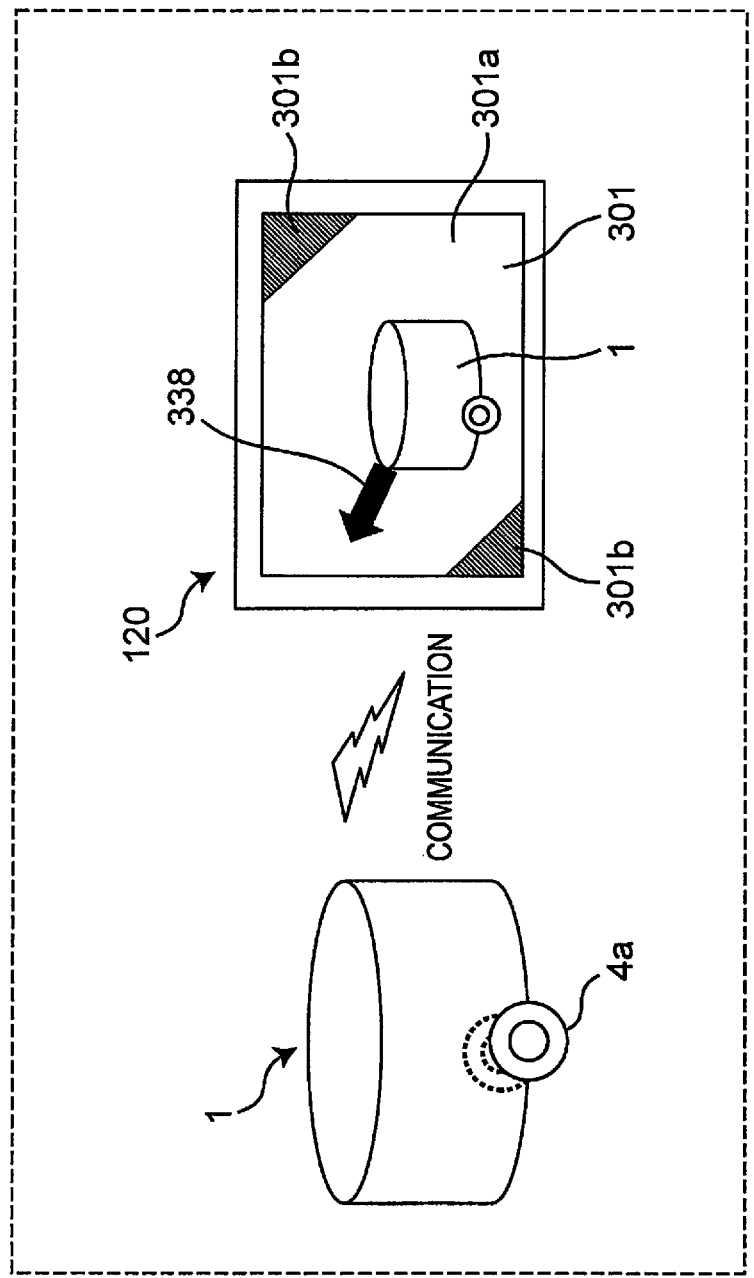
FIG. 26A is a diagram for describing a case where a cleaning plan of the planned route is displayed on the display in a state before cleaning.
Figure 26C:
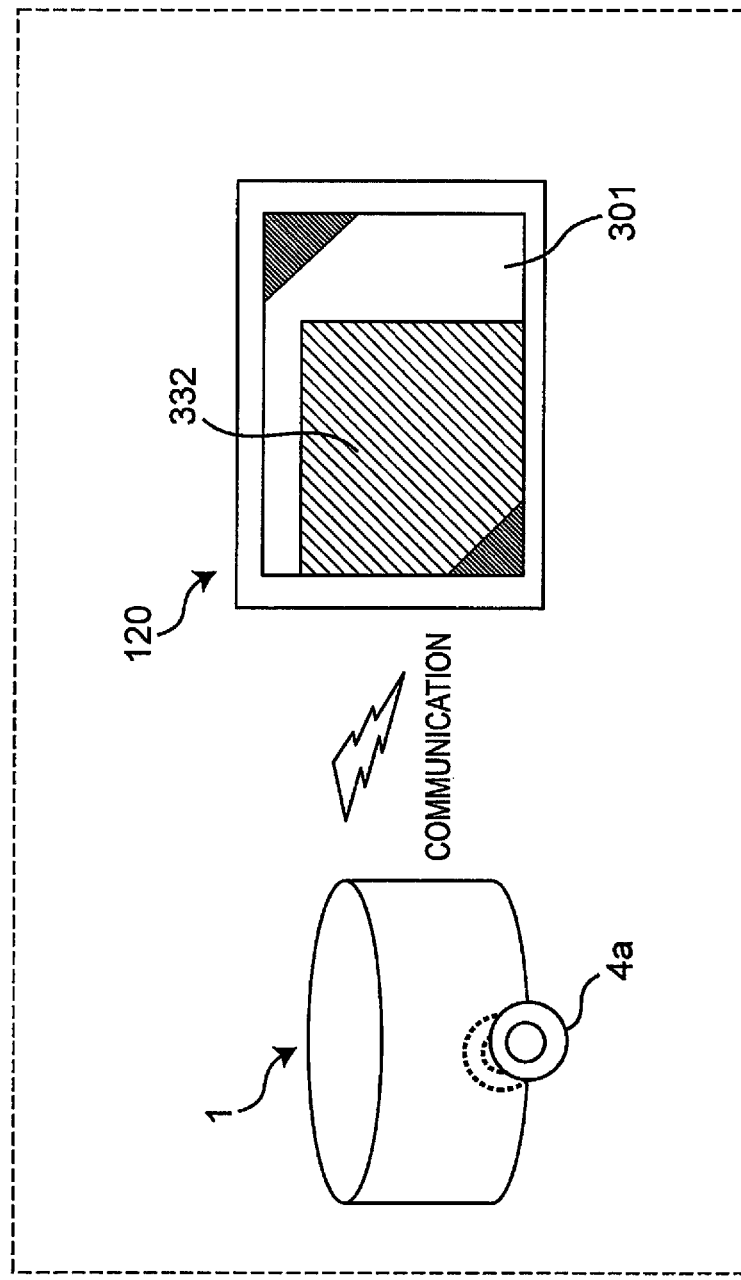
FIG. 26C is a diagram for describing a case where a cleaning result (for example, a cleaned place, a cleaning time) is displayed on the display in a state after cleaning.
Figure 27:
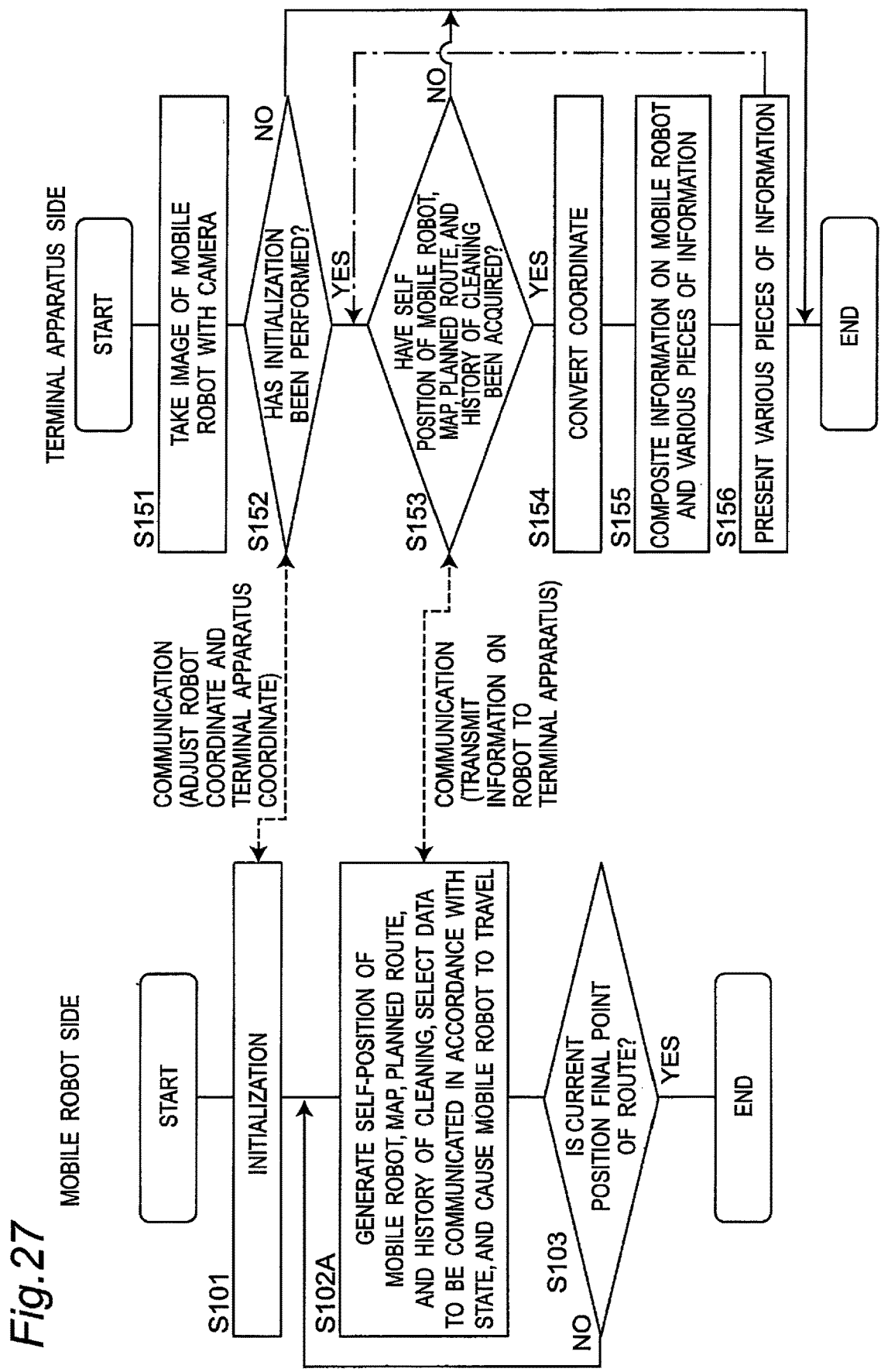
FIG. 27 is a flowchart of a fifth operation (5) to be performed in the control system of the mobile robot.

Fifth Operation (5):

As shown in FIG. 26A to FIG. 26C, information to be displayed on the display 119 of the terminal apparatus 120 is changed in accordance with a state of the mobile robot 1. As an example of the state of the mobile robot 1, when the mobile robot 1 is a cleaner, information to be displayed on the display 119 is changed in accordance with the following states.

In a state before cleaning, as shown in FIG. 26A, a cleaning plan of the planned route is displayed on the display 119.

In a state during cleaning, as shown in FIG. 26B, a value 342 detected by a dust detection sensor 76 (see FIG. 1) mounted on the cleaner (to be described later), an obstacle, and whether the cleaner has been stuck are displayed on the display 119.

In a state after cleaning, as shown in FIG. 26C, a cleaning result (for example, a cleaned place and a cleaning time) is displayed on the display 119.

(Flowchart)

In order to achieve the five operations including the first operation (1) to the fifth operation (5), the following control operation is performed.

(Control Operation of First Operation (1))

First, as the first operation (1), an operation of superimposing the map information 301 and the planned route information 302 on the camera image of the mobile robot 1 and displaying the resultant image will be described based on the respective flowcharts of the mobile robot 1 and the terminal apparatus 120 in FIG. 13.

Figure 13:
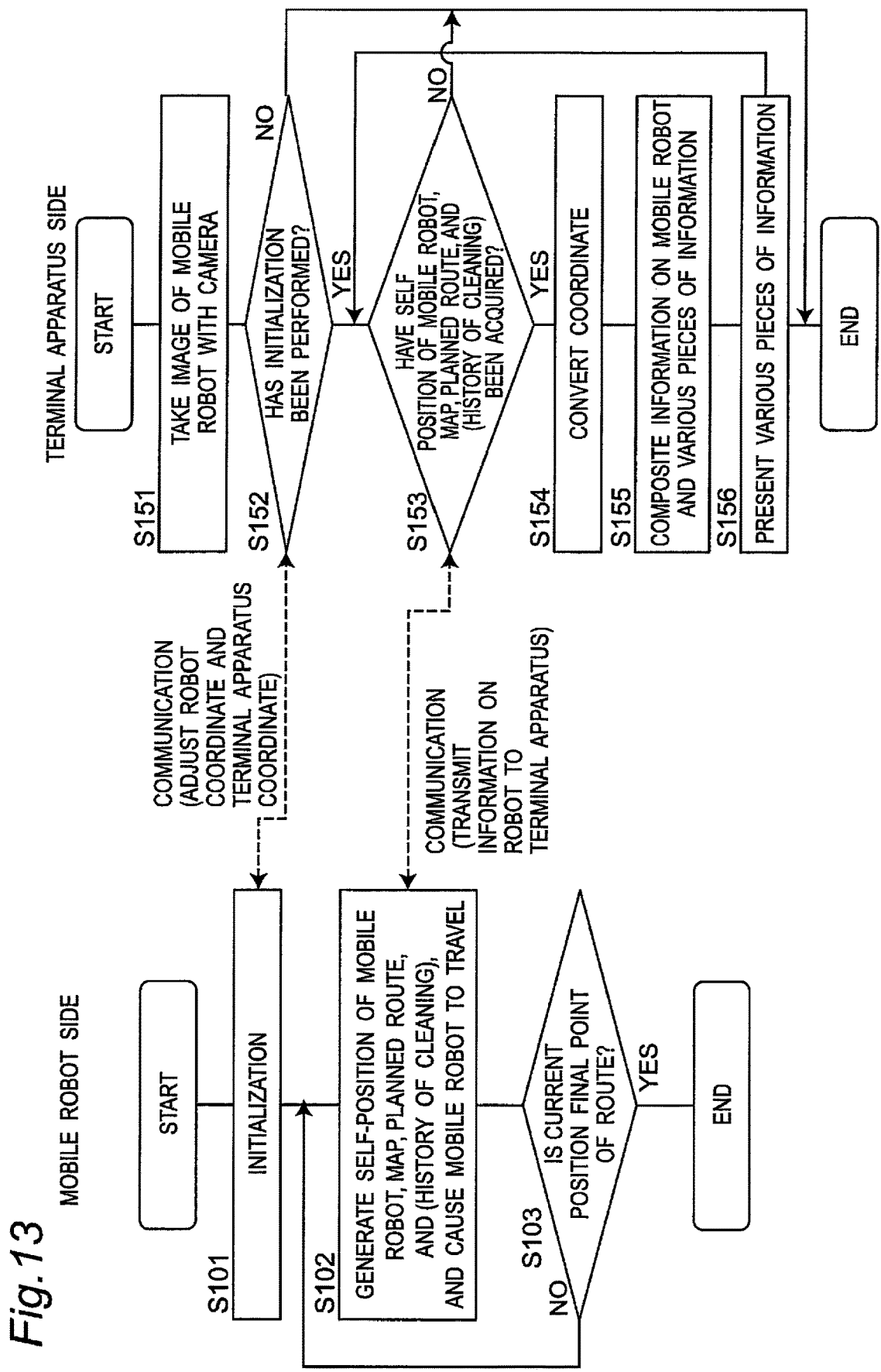
FIG. 13 is a flowchart of the first operation (1) and (2) to be performed in the control system of the mobile robot.

The operation of the mobile robot 1 shown on the left side of FIG. 13 is as follows.

(Step S101)

The initialization processor 9a of the controller 9 of the mobile robot 1 in FIG. 3A initializes coordinates of the mobile robot 1. In this initialization, the current position of the mobile robot 1 is taken as the origin of the coordinates of the mobile robot 1. In other words, the position of the mobile robot 1 at the start of control is the origin of the coordinates of the mobile robot 1. When initialization processing is performed by the initialization processor 9a, an initialization signal indicating the initialization of the mobile robot 1 is transmitted from the communication unit 19. The communication unit 128 of the terminal apparatus 120 is capable of receiving the initialization signal thus transmitted as described later.

(Step S102)

The controller 9 acquires information including the current position of the mobile robot 1, the map information, and the planned route information and causes the mobile robot 1 to start traveling based on the information thus acquired.

The current position acquiring unit 9b of the controller 9 acquires the current position of the mobile robot 1 based on the measured value of the distance sensor 11 of the mobile robot 1. Even while the mobile robot 1 is traveling, the current position acquiring unit 9b continues to acquire the current position of the mobile robot 1 based on the measured value of the distance sensor 11.

An example in which the mobile robot 1 acquires the current position of the mobile robot 1 when the mobile robot 1 travels in a room will be described. The mobile robot 1 is capable of detecting the position of an obstacle including a wall or a table in the room with the distance sensor 11 and acquiring the current position of the mobile robot 1 in the room based on the position of the obstacle. The current position acquiring unit 9b of the controller 9 refers to the time of the timer 8 and records the current time and the current position in the database 5 with the current time and the current position associated with each other. An example of the current position is xy coordinates of a two-dimensional space denoted by x, y. As the mobile robot 1 travels, the information on the current position is continuously updated and recorded in the database 5.

As another method of acquiring the current position, a known odometry method is applicable. For example, in a case of a room that the distance sensor 11 is unable to detect, the current position of the mobile robot 1 is acquired by wheel odometry of the mobile robot 1. The wheel odometry is a method of estimating the current position based on a rotation angle of each wheel.

The map information and the planned route information recorded in the database 5 are acquired by the input and output unit 6. An example of the map information is information on obstacles such as a floor and a wall of a room. An example of the planned route information is information indicating along which route the mobile robot 1 travels on floor 301a of the room, as shown in the form of the first planned route 338 indicated by an arrow 338 in FIG. 12, an arrow 338 in FIG. 30, or an arrow 338 in FIG. 31. Alternatively, the input and output unit 6 may acquire, as the planned route information, the position information at each time shown in FIG. 10B.

The current position acquiring unit 9b starts acquiring the current position of the mobile robot 1. Further, the map information and the planned route information recorded in the database 5 are acquired by the input and output unit 6. Thereafter, the drive controller 9c of the controller 9 transmits a control signal to the drive unit 3 for causing the mobile robot 1 to travel along the planned route to cause the drive unit 3 to start travel of the mobile robot 1. The controller 9 causes the current position acquiring unit 9b to acquire the current position of the mobile robot 1 based on the measured value of the distance sensor 11, causes the determination unit 9d to compare the current position of the mobile robot 1 acquired by the current position acquiring unit 9b and the planned route to determine whether the mobile robot 1 is traveling along the planned route, and causes drive controller 9c to control the drive unit 3. When the current position of the mobile robot 1 acquired by the determination unit 9d deviates from the planned route, the drive controller 9c controls the drive unit 3 to correct the travel direction of the mobile robot 1, so that the mobile robot 1 travels along the planned route.

The information on the current position of the mobile robot 1 acquired by the current position acquiring unit 9b, and the map information and the planned route information acquired by the input and output unit 6 are transmitted from the communication unit 19 of the mobile robot 1. The communication unit 128 of the terminal apparatus 120 is capable of receiving the information thus transmitted as described later.

(Step S103)

Following step S102, the determination unit 9d of the controller 9 determines whether the current position of the mobile robot 1 is the final desired position of the planned route. When the determination unit 9d determines that the current position of the mobile robot 1 is not the final desired position of the planned route, the process returns to step S102.

When the determination unit 9d determines that the current position of the mobile robot 1 is the final desired position of the planned route, the flow comes to an end.

The above is the operation flow of the mobile robot 1.

On the other hand, as shown on the right side of FIG. 13, the terminal apparatus 120 operates as follows while partly cooperating with the mobile robot 1.

(Step S151)

The camera 129 takes an image of the mobile robot 1 to acquire the camera image. FIG. 28A is an example of the camera image that results from taking an image of the travel space of the mobile robot 1 shown in FIG. 11 with the camera 129. At this time, the identification mark 1a on the upper surface of the mobile robot 1 and the obstacle of the wall around the mobile robot 1 are imaged at the same time. Based on the information on the camera image thus taken, the image processor 127a provided in the coordinate converter 127 recognizes each of the identification mark 1a and the obstacle. Based on the recognition result, the position computing unit 127b provided in the coordinate converter 127 computes each of the position of the mobile robot 1 and the position of the obstacle.

(Step S152)

When the initialization processing is performed by the initialization processor 9a of the controller 9 of the mobile robot 1 in step S101, the initialization signal indicating the initialization of the mobile robot 1 is transmitted from the communication unit 19. When communication unit 128 of the terminal apparatus 120 receives the initialization signal thus transmitted, the coordinate converter 127 of the controller 9 initializes the coordinate position of the mobile robot 1 recorded in the coordinate converter 127.

When the communication unit 128 fails to receive the initialization signal and the initialization has not been performed, the coordinate converter 127 waits until the communication unit 128 receives the initialization signal for a predetermined time. When the communication unit 128 has not received the initialization signal within the predetermined time, the flow sequence is terminated.

(Step S153)

After the initialization is performed in step S152, in step S153, the coordinate converter 127 acquires the self-position of the mobile robot 1, the map information, and the planned route information via the communication unit 128 thorough communication from the communication unit 19.

When the communication unit 128 fails to receive these pieces of information and the pieces of information have not been acquired, the coordinate converter 127 waits for a predetermined time until the communication unit 128 receives the pieces of information. When the communication unit 128 has not received the pieces of information within the predetermined time, the series of flows is terminated.

(Step S154)

After the coordinate converter 127 acquires, in step S153, the self-position of the mobile robot 1, the map information, and the planned route information, the conversion calculator 127c of the coordinate converter 127 performs, in step S154, coordinate conversion based on the information acquired in step S153.

That is, as shown in FIG. 29, the coordinate converter 27 converts coordinates in the robot coordinate system to coordinates in the terminal apparatus coordinate system. In FIG. 29, a left diagram (a) shows coordinates of the mobile robot 1 in the robot coordinate system viewed from directly above, and the position information (x, y, θ) on a point where the mobile robot 1 is positioned at the time of initialization is set to (0, 0, 0). A right diagram (b) shows, in the coordinate system of the terminal apparatus 120, the terminal apparatus 120 represented by a rectangle and a position 331 of the mobile robot 1 represented by a black circle.

In the initialization processing of step S101 described above, as shown in the (a) of FIG. 29, the origin of the robot coordinate system is set to the initial position of the mobile robot 1.

In the initialization processing of step S152, the terminal apparatus 120 takes an image of the mobile robot 1, estimates the position of the terminal apparatus 120, and sets the coordinates of the position as the origin of the terminal apparatus coordinate system. At this time, the position of the terminal apparatus 120 can be obtained by one of the following two methods, for example.

In a first method 1, the camera 129 takes an image of the identification mark 1a given to the mobile robot 1. The image processor 127a performs image processing on image information on the camera image thus taken. Thereafter, the identification mark 1a is recognized, and the size and inclination of the identification mark 1a are obtained. The coordinate system is calibrated based on the size and inclination of the obtained identification mark 1a, the position of an object that is the wall or the obstacle is extracted through image processing based on pattern matching, and then the position computing unit 127b of the terminal apparatus 120 computes a position of the terminal apparatus 120 where the terminal apparatus 120 takes an image in the terminal coordinate system of the terminal apparatus 120. This means that the coordinate conversion is performed in accordance with how the identification mark 1a is viewed in the image taken by the camera, and when the identification mark 1*a* is inclined, the coordinate system is also inclined at an angle of the inclination.

In a second method 2, the depth camera 131 measures a distance from the mobile robot 1 to the terminal apparatus 120, and the position of the terminal apparatus 120 is computed based on the distance thus measured.

A known method is applicable to the measurement of the distance from the mobile robot 1 to the terminal apparatus 120 with the depth camera 131. An example of the method of measuring the distance is a time of flight (TOF) method. "TOF" is an acronym for Time Of Flight, and is for measuring a distance based on a time it takes for an emitted laser to travel to and from a target.

Kinect (registered trademark) of Microsoft Corporation projects a single projection pattern (for example, a large quadrilateral pattern in which random dots are interspersed) onto a target surface at all times and obtains, through image processing, a travel amount of each place in the pattern from a taken image, thereby enabling three-dimensional measurement in all frames of a moving image taken by an infrared camera.

For example, when the mobile robot 1 travels after obtaining the position of the terminal apparatus 120, the self-position, that is, the current position of the mobile robot 1 that is traveling is communicated from the communication unit 19 to the communication unit 128. Then, the coordinate converter 127 coordinate-converts the current position of the mobile robot 1 from the robot coordinate system to the terminal apparatus coordinate system while taking the previous calibration into consideration, and the position 331 of the mobile robot in the coordinate system of the terminal apparatus 120 is moved to the current position of the mobile robot 1 thus coordinate-converted.

Further, in another example, when the information generator 7 of the mobile robot 1 generates the map information, the map information thus generated is transmitted from the communication unit 19 to the communication unit 128 via the input and output unit 6 and the controller 9. Since the map information received by the communication unit 128 is information in the robot coordinate system, the coordinate converter 127 coordinate-converts the map information from the robot coordinate system to the terminal apparatus coordinate system while taking the previous calibration into consideration. Thereafter, the composition controller 126 composites the map information thus coordinate-converted and information to be composited, and the resultant composite information is displayed on the display 119 via the presentation unit 125.

As still another example, when the input determination unit 132 determines that the desired position as a travel destination of the mobile robot 1 is input using the input detector 119*b* of the touch panel of the display 119 of the terminal apparatus 120, the coordinate converter 127 coordinate-converts a desired value in the terminal apparatus coordinate system to a desired value in the robot coordinate system while taking the previous calibration into consideration, and then the desired value in the robot coordinate system is transmitted from the communication unit 128 to the communication unit 19. The controller 9 controls drive of the drive unit 3 to cause the mobile robot 1 to travel toward the desired value in the robot coordinate system thus transmitted.

As described above, the coordinate converter 127 performs the coordinate conversion while taking the previous calibration into consideration, which allows information to be smoothly processed between the mobile robot 1 and the terminal apparatus 120.

(Step S155)

Next, the composition controller 126 composites the information on the mobile robot 1 such as the information on the current position of the mobile robot 1 and the various pieces of information including the map information and the planned route information.

(Step S156)

Figure 30:
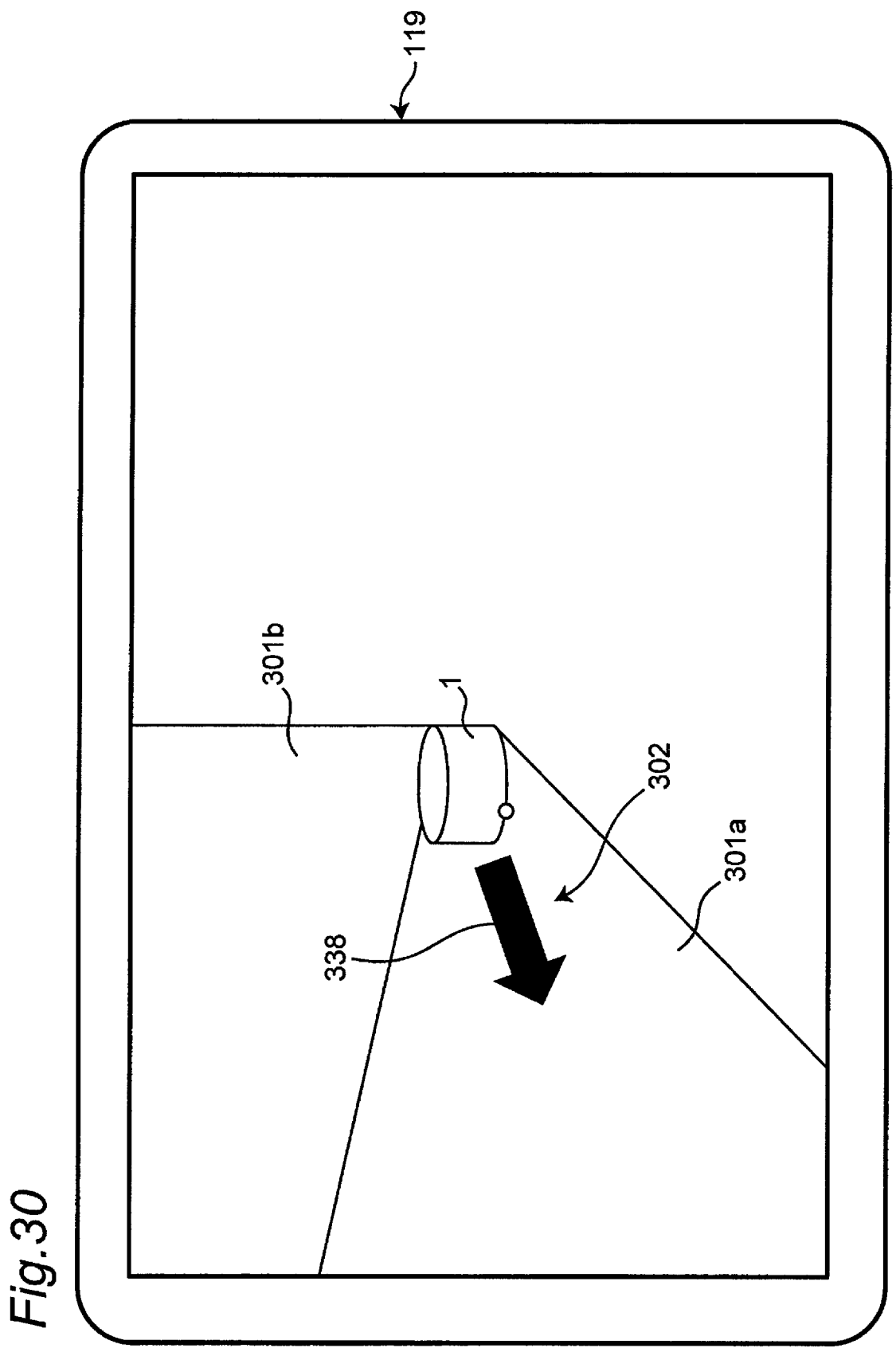
FIG. 30 is a diagram showing an image capturing the mobile robot and a floor taken by the camera of the terminal apparatus displayed on the display on which the map information recorded in the mobile robot is superimposed.
Figure 31:
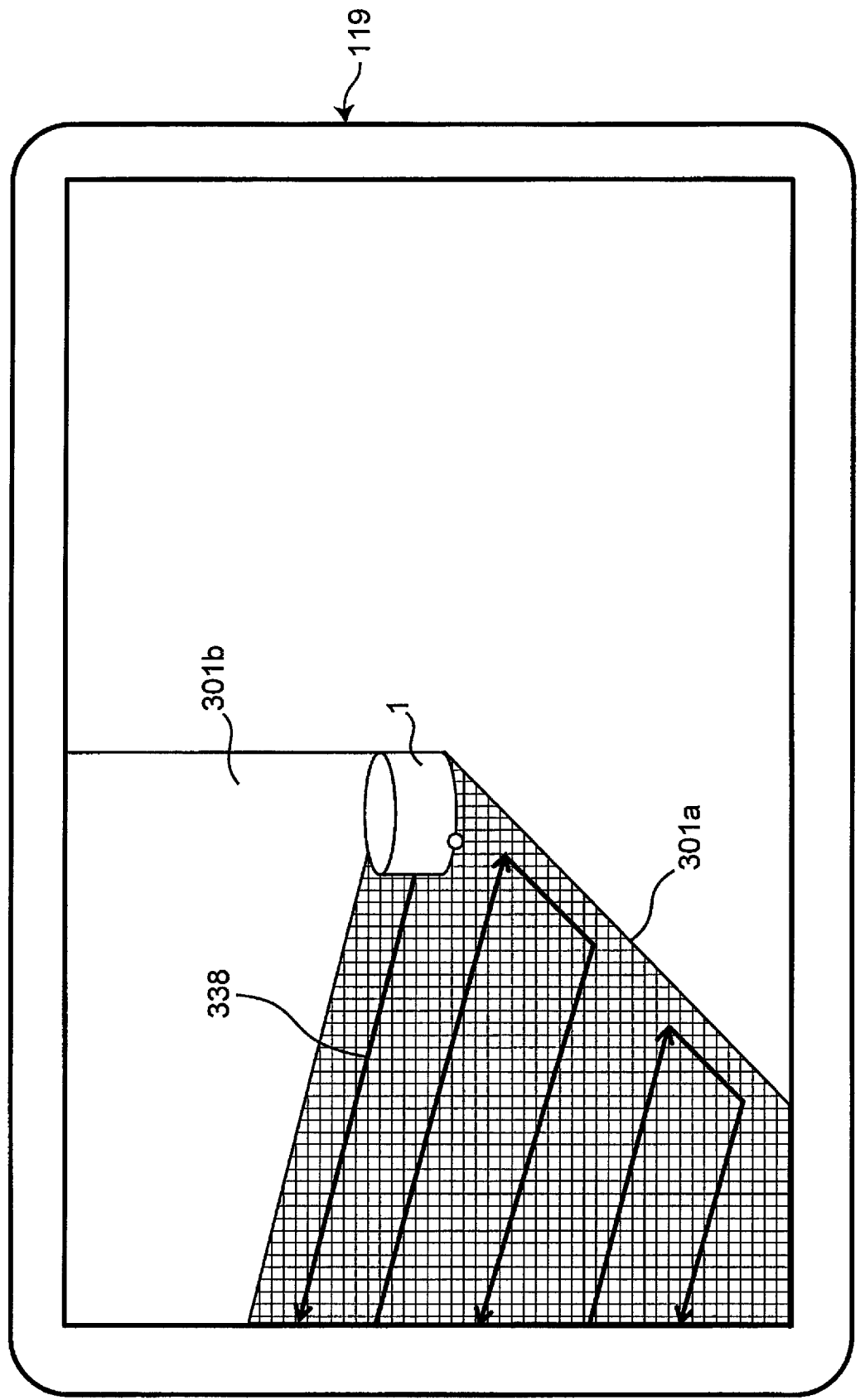
FIG. 31 is a diagram showing an image resulting from further adding the planned route information to FIG. 30.

The information composited by the composition controller 126 is displayed on the display 119 by the presentation unit 125. At this time, the image of the mobile robot 1 and the floor taken by the camera 129 of the terminal apparatus 120 is displayed on the display 119, and at the same time, the map information and the planned route information recorded in the mobile robot 1 are displayed with the map information and the planned route information superimposed on the image. FIG. 30 and FIG. 28B show display screens as examples of a second screen displayed on the display 119. Here, the first planned route of the mobile robot 1 is illustrated by a leftward arrow 338 extending from the floor 301*a* in the vicinity of the wall 301*b*. Further, FIG. 31 shows another example of the display screen displayed on the display 119. Here, the first planned route of the mobile robot 1 is illustrated by a zigzag arrow 338 extending from the floor 301*a* in the vicinity of the wall 301*b*.

Note that, in order to repeat the processing at constant intervals, the processing may return from step S156 to step S153 as indicated by a long dashed short dashed line.

As described above, it is possible to perform an operation of superimposing the map information 301 and the planned route information 302 on the camera image of the mobile robot 1 of the first operation (1) and displaying the resultant image.

(Control Operation of Second Operation (2))

Next, as the second operation (2), an operation of displaying the information on the already-cleaned area recorded in the mobile robot 1 on the map information of the terminal apparatus 120 as shown in FIG. 14 and FIG. 13 will be described. The second operation (2) is similar to the first operation (1); thus, different points will be mainly described. Note that, a description will be given on the assumption that the mobile robot 1 is a cleaner.

The operation of the mobile robot 1 is as follows.

(Step S102)

In step S102 of the second operation (2), the controller 9 acquires the current position of the mobile robot 1, the map information, and the planned route information, and acquires, when causing the mobile robot 1 to start traveling, information on a history of cleaning previously performed. The information on the history of cleaning is information on the already-traveled route along which the cleaner corresponding to the mobile robot 1 has autonomously traveled while cleaning. When the information on the history of cleaning is displayed as map information, an area corresponding to the already-traveled route along which the cleaner has traveled while cleaning is hatched or filled in with a color different from a color of an area where the cleaner is to travel and then displayed.

The operation of the terminal apparatus 120 is as follows.

(Step S152)

Further, when acquiring the self-position of the mobile robot 1, the map information, and the planned route information via the communication unit 128 through the communication from the communication unit 19 in step S153, the coordinate converter 127 also acquires the information on the history of cleaning.

(Step S154)

In step S153, the coordinate converter 127 acquires the self-position of the mobile robot 1, the map information, the planned route information, and the information on the history of cleaning. Thereafter, in step S154, based on the information acquired in step S153, the conversion calculator 127c of the coordinate converter 127 performs coordinate conversion.

(Step S155)

Next, the composition controller 126 composites the information on the mobile robot 1 such as the information on the current position of the mobile robot 1, and the various pieces of information including the map information, the planned route information, and the information on the history of cleaning.

(Step S156)

The presentation unit 125 displays the information that results from the composition performed by the composition controller 126, on the display 119. At this time, the image of the mobile robot 1 and the floor taken by the camera 129 is displayed on the display 119. Here, the presentation unit 125 superimposes the information including the map information, the planned route information, or the history of cleaning on the camera image. At this time, an area where the mobile robot 1 has traveled while cleaning and cleaning has been finished, that is, an already-cleaned area 332 is hatched or filled in with a color different from a color of the other area such as an area where the mobile robot 1 is to travel or the other area of the planned route to be distinguished from the other area and then displayed. FIG. 8 shows a display example of the already-cleaned area 332.

As described above, it is possible to display information on the already-cleaned area 332 recorded in the mobile robot 1 in the second operation (2) as the map information of the terminal apparatus 120.

(Control Operation of Third Operation (3))

Figure 16:
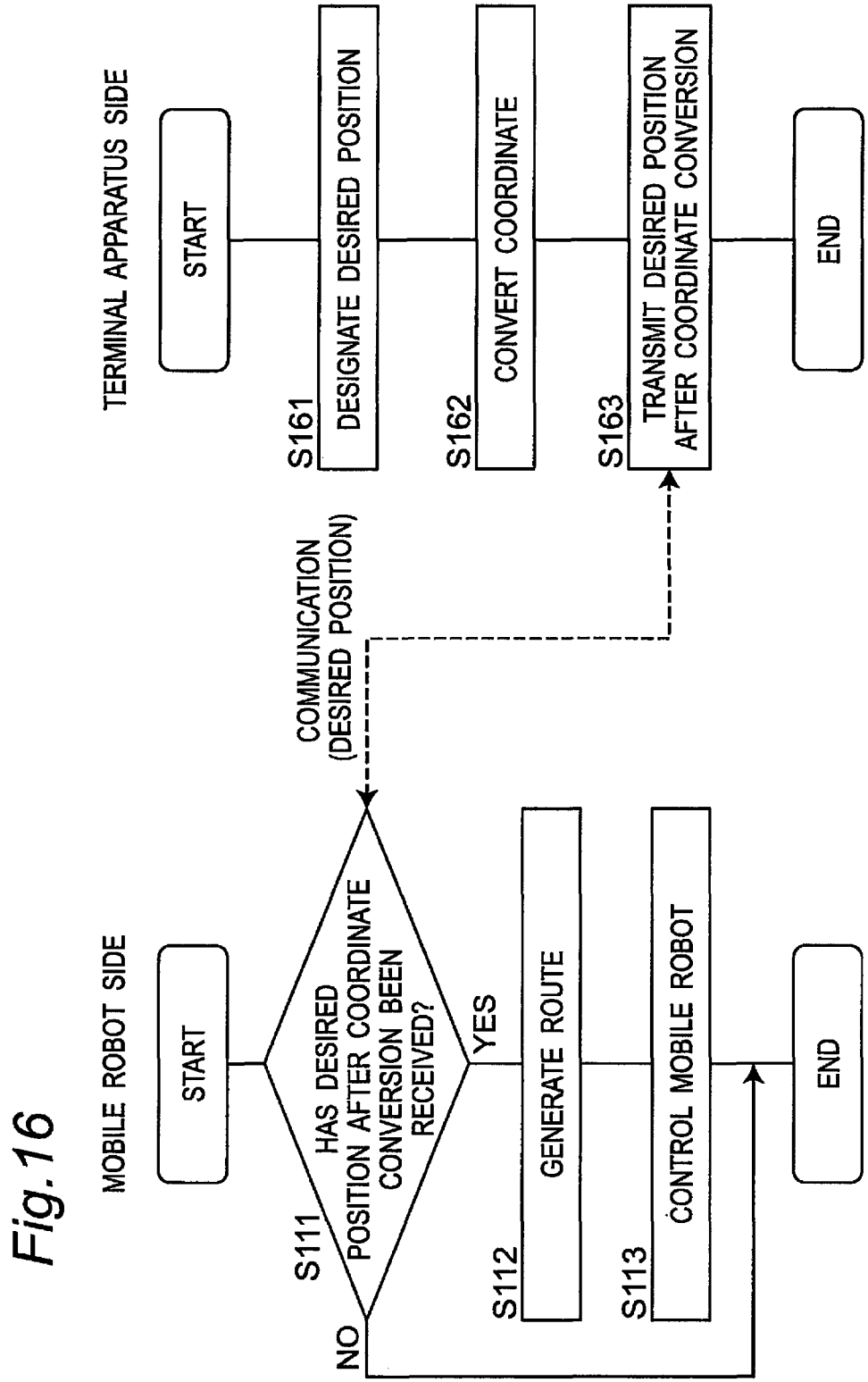
FIG. 16 is a flowchart of the third operation (3) to be performed in the control system of the mobile robot.

Next, as a third operation (3), as shown in FIG. 15 and FIG. 16, an operation of receiving an instruction from the user while displaying the mobile robot 1, the map information, and the planned route information on the display 119 of the terminal apparatus 120 will be described.

The operation of the terminal apparatus 120 is as follows.

(Step S161)

In step S161, while the mobile robot 1 is traveling or before the mobile robot 1 starts traveling, as shown in FIG. 15, the user brings a fingertip of his or her hand 334 into contact with the touch panel of the display 119 on which the map information and the planned route information are displayed together with the mobile robot 1 to input a desired position 333. The input of the desired position 333 is detected by the input detector 119b of the touch panel and is subjected to the input determination made by the input determination unit 132, and position coordinates of the desired position 333 in the terminal apparatus coordinate system are input to the coordinate converter 127.

(Step S162)

Next, in step S162, the coordinate converter 127 coordinate-converts the position coordinates of the desired position 333 in the terminal apparatus coordinate system to position coordinates of the desired position in the robot coordinate system, and then outputs the coordinate-converted information to the communication unit 128.

(Step S163)

Next, in step S163, the information on the desired position in the robot coordinate system input from the coordinate converter 127 is transmitted from the communication unit 128 to the communication unit 19 of the mobile robot 1.

On the other hand, the operation of the mobile robot 1 is as follows.

(Step S111)

In step S111, when the communication unit 19 receives the information on the desired position in the robot coordinate system from the communication unit 128, the process proceeds to the next step S112. When the communication unit 19 does not receive the information on the desired position in the robot coordinate system from the communication unit 128 within the predetermined time, the flow comes to an end.

(Step S112)

In step S112, based on the information on the desired position in the robot coordinate system received by the communication unit 19 and input to the information generator 7 via the controller 9, the information generator 7 generates a planned route as map information.

(Step S113)

Next, in step S113, based on the planned route generated in step S112, the controller 9 controls the drive of the drive unit 3 to cause the mobile robot 1 to travel along the planned route thus generated.

Note that, when this third operation (3) is performed in step S102 of the first operation (1), the operation of step S113 is performed. Thereafter, the planned route generated is transmitted to the terminal apparatus in step S102. Thereafter, step S153 to step S156 are performed, thereby allowing the planned route generated to be displayed on the display 119 as the second planned route.

As described above, it is possible to perform an operation of receiving the instruction from the user while the mobile robot 1, the map information, and the planned route information in the third operation (3) are displayed on the display 119 of the terminal apparatus 120.

(Control Operation of Fourth Operation (4))

Next, as a fourth operation (4), as shown in FIG. 24A, FIG. 24B, and FIG. 25, an operation of changing the velocity of the mobile robot 1 in accordance with whether the mobile robot 1 is shown on the display screen of the terminal apparatus 120 will be described.

The operation of the terminal apparatus 120 is as follows.

(Step S165)

In step S151, the image processor 127a of the coordinate converter 127 performs pattern matching on the camera image capturing the mobile robot 1 taken by the camera 129 to extract the identification mark 1a of the mobile robot 1. Next, based on the result of the extraction processing, the determination unit 136 determines whether the identification mark 1a is included in the camera image, that is, whether the mobile robot 1 is shown on the display 119 of the terminal apparatus 120. When the determination unit 136 determines that the mobile robot 1 is shown on the display 119 of the terminal apparatus 120, the flow comes to an end. Therefore, in this case, the travel velocity of the mobile robot 1 is not reduced and is a high velocity for cleaning operation. When the determination unit 136 determines that the mobile robot 1 is not shown on the display 119 of the terminal apparatus 120, the process proceeds to the next step S166.

(Step S166)

In step S166, in accordance with the determination made by the determination unit 136 that the mobile robot 1 is not shown in the camera image, the database 123 is accessed via the coordinate converter 127 and the input and output unit 124. Then, deceleration command information on the mobile robot 1 when the mobile robot 1 is not shown in the camera image is acquired. The deceleration command information thus acquired is transmitted, as a first instruction, from the communication unit 128 to the communication unit 19. As an example, the degree of deceleration of the mobile robot 1 indicated by the deceleration command information is preset to a velocity lower than the velocity for cleaning operation and recorded in the database 123.

The operation of the mobile robot 1 is as follows.
(Step S115)

In step S115, when the communication unit 19 receives the deceleration command information from the communication unit 128, the process proceeds to the next step S112. When the communication unit 19 does not receive the deceleration command information from the communication unit 128 within the predetermined time, the flow comes to an end. At this time, as shown in FIG. 24A, the velocity of the mobile robot 1 is not reduced and is a high velocity equal to the velocity for cleaning operation.
(Step S116)

Next, in step S116, the drive controller 9c of the controller 9 controls the mobile robot 1 for deceleration based on the deceleration command information received by the communication unit 19 to cause, as shown in FIG. 24B, the mobile robot 1 to travel at a velocity lower than the velocity for cleaning operation.

This makes it easier for the user to take an image capturing the mobile robot 1 with the camera 129 of the terminal apparatus 120.

As described above, as the fourth operation (4), it is possible to perform an operation of changing the velocity of the mobile robot 1 in accordance with whether the mobile robot 1 is shown on the display screen of the terminal apparatus 120.

Figure 24C:
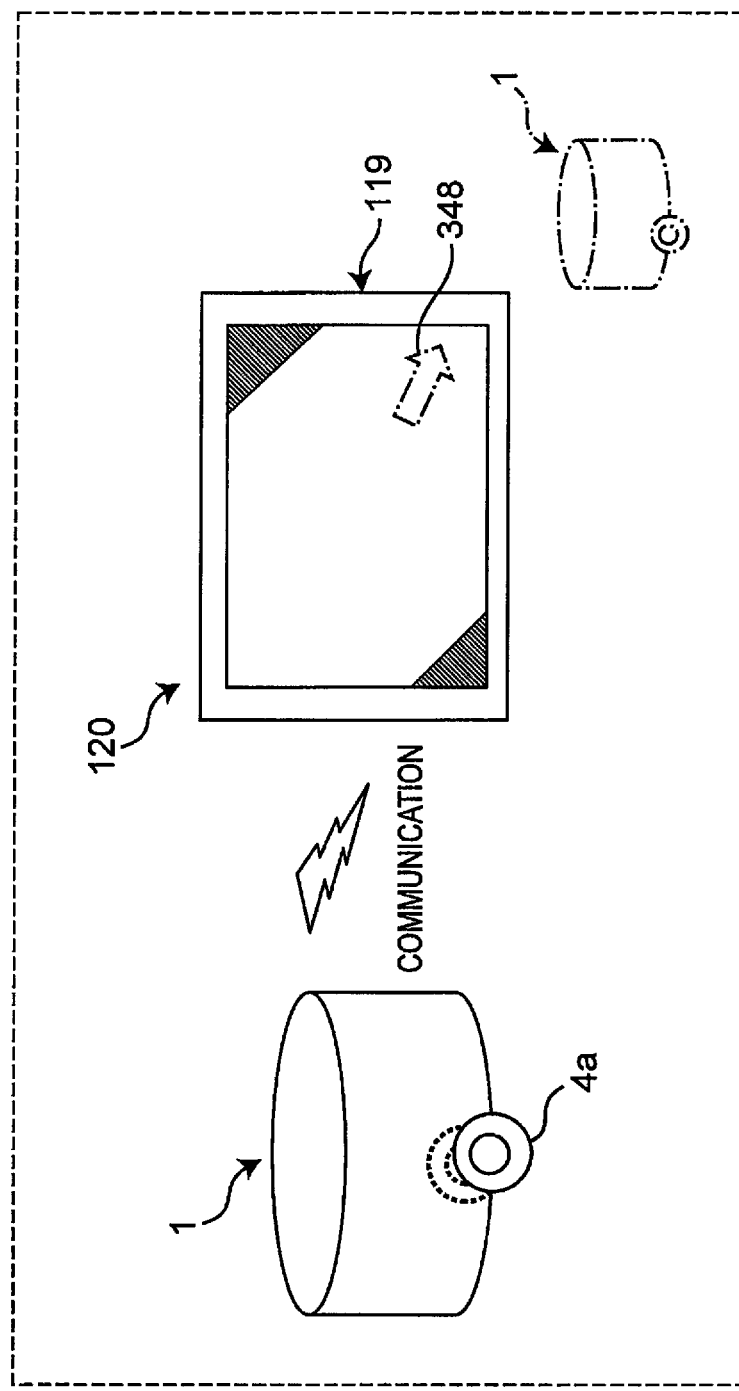
FIG. 24C is a diagram showing a case where a direction in which the mobile robot is present is displayed as an arrow on the display screen when the mobile robot is not shown on the display of the terminal apparatus.

As shown in FIG. 24C, when the mobile robot 1 is not included in the camera image, a direction in which the mobile robot 1 is present may be displayed by the presentation unit 125 with an arrow 348 on the display screen. For example, the following method may be used as a method of obtaining "a direction in which the mobile robot is present", the direction extending from a position included in the camera image of the terminal apparatus 120 toward a position where the mobile robot 1 is present. The position of the mobile robot 1 can be computed in the mobile robot using LiDAR or odometry. Transmission of the position thus computed from the mobile robot 1 to the terminal apparatus 120 allows the terminal apparatus to grasp the position of the mobile robot 1. The position is represented by (x, y, θ). The arrows may extend toward the mobile robot 1 on a straight line connecting the current position of the terminal apparatus 120 and the current position of the mobile robot 1. When the determination unit 136 determines that the mobile robot 1 is included in the camera image taken after the arrow 348 is displayed by the presentation unit 125, the presentation unit 125 removes the arrow 348 that has been superimposed on the camera image taken by the camera 129 and indicates the direction in which the mobile robot 1 is present. As a result, a state shown in FIG. 24A is obtained.

(Control Operation of Fifth Operation (5))

Next, as the fifth operation (5), an operation of changing information to be displayed on the terminal apparatus 120 in accordance with the state of the mobile robot 1 as shown in FIG. 26A to FIG. 26C and FIG. 27 will be described. The fifth operation (5) is similar to the first operation (1); thus, different points will be mainly described.

The operation of the mobile robot 1 is as follows.
(Step S102A)

In step S102A that is a substitute for step S102 described above, when acquiring the current position of the mobile robot 1, the map information, and the planned route information and causing the mobile robot 1 to start traveling, the controller 9 selects communication data in accordance with the state of the mobile robot 1 as well as acquiring the information on the history of cleaning previously performed.

Here, the state of the mobile robot 1 is, when the mobile robot 1 is a cleaner, one of the state before cleaning, the state during cleaning, and the state after cleaning.

The determination unit 9d can determine the state before cleaning in accordance with a fact that the current position of the mobile robot 1 indicates that the mobile robot 1 has not yet traveled along the planned route. In this state, as shown in FIG. 26A, the controller 9 performs control to cause information indicating the cleaning plan such as the planned travel route of the mobile robot 1 to be transmitted from the communication unit 19 to the communication unit 128.

The determination unit 9d determines the state during cleaning in accordance with a fact that the current position of the mobile robot 1 indicates that the mobile robot 1 is traveling along the planned route. In this state, as shown in FIG. 26B, the controller 9 performs control to cause the value 342 of the dust detection sensor 76, the obstacle, and the information indicating whether the mobile robot 1 has been stuck to be transmitted from the communication unit 19 to the communication unit 128. The display of the value of the dust detection sensor may be made in the form of a numerical value or may be made in the form of an area 342 where dust more than a certain amount is present. The display indicating that the mobile robot 1 has been stuck is made in the form of, for example, a place 335 where the mobile robot 1 has been stuck.

The determination unit 9d determines the state after cleaning in accordance with a fact that the current position of the mobile robot 1 indicates that the mobile robot 1 has reached the desired position of the planned route. In this state, as shown in FIG. 26C, the controller 9 performs control to cause the information on the cleaning result such as the information indicating the cleaned area and the cleaning time to be transmitted from the communication unit 19 to the communication unit 128.

The operation of the terminal apparatus 120 is as follows.
(Step S153)

In step S153, the coordinate converter 127 acquires the self-position of the mobile robot 1, the map information, and the planned route information in accordance with the state of the mobile robot 1 via the communication unit 128 through communication from the communication unit 19.

Thereafter, similarly to the first operation (1) or the second operation (2), step S154 to step S156 are performed. In step S156, an operation of changing information to be displayed on the terminal apparatus 120 in accordance with the state of the mobile robot 1 is performed. That is, in the state before cleaning, the planned route is displayed on the display 119 as an example of the cleaning plan. In state during cleaning, the value of the dust detection sensor, the obstacle, whether the mobile robot 1 has been stuck are displayed on the display 119. In the state after cleaning, the information on the cleaning result (the cleaned area and the cleaning time) is displayed on the display 119.

(Case where the Mobile Robot is a Cleaner)

Hereinafter, a case where the mobile robot 1 is a cleaner 10 and cleans while traveling along the planned route will be described based on a specific configuration of the cleaner 10.

(Overall Configuration)

Figure 32:
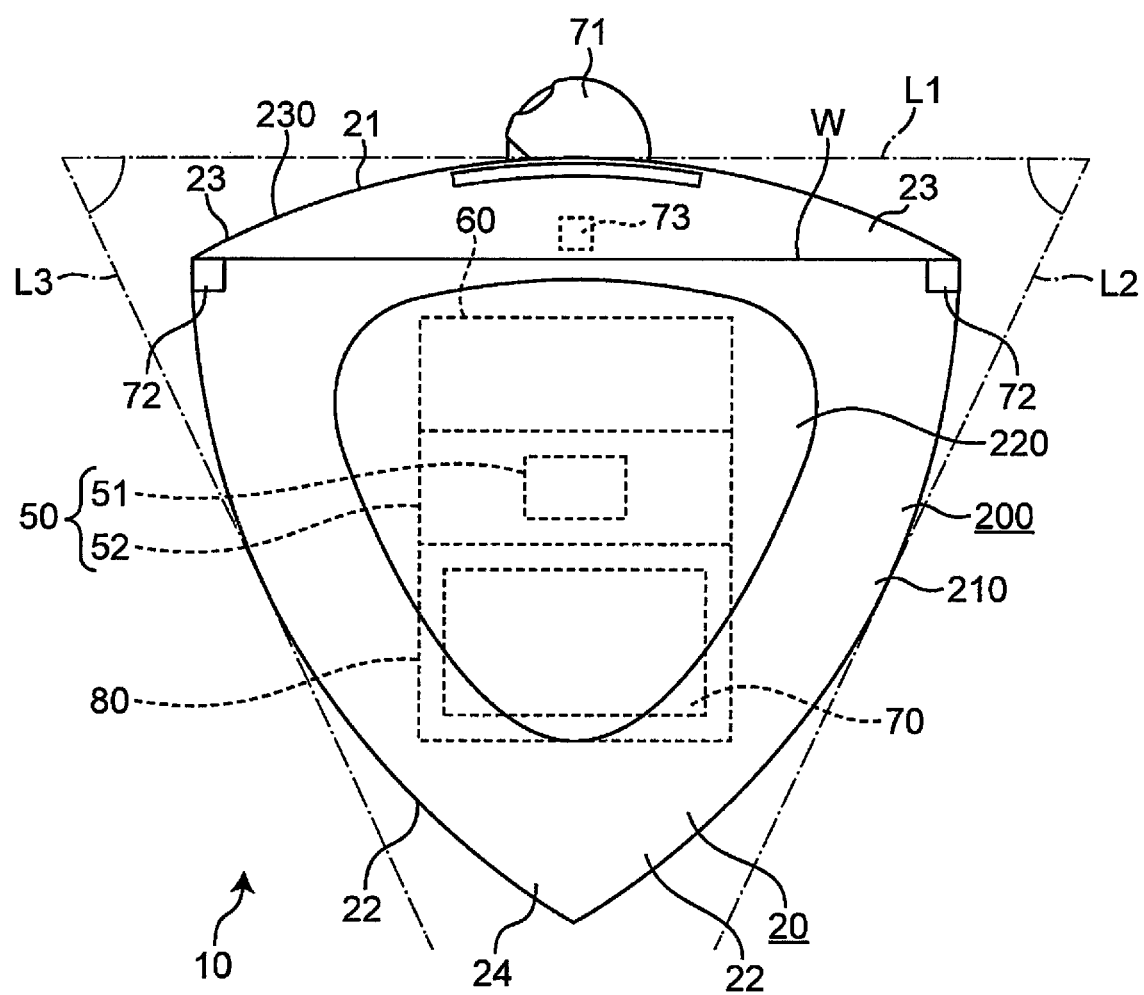
FIG. 32 is a plan view of the cleaner according to the first embodiment of the present disclosure.
Figure 33:
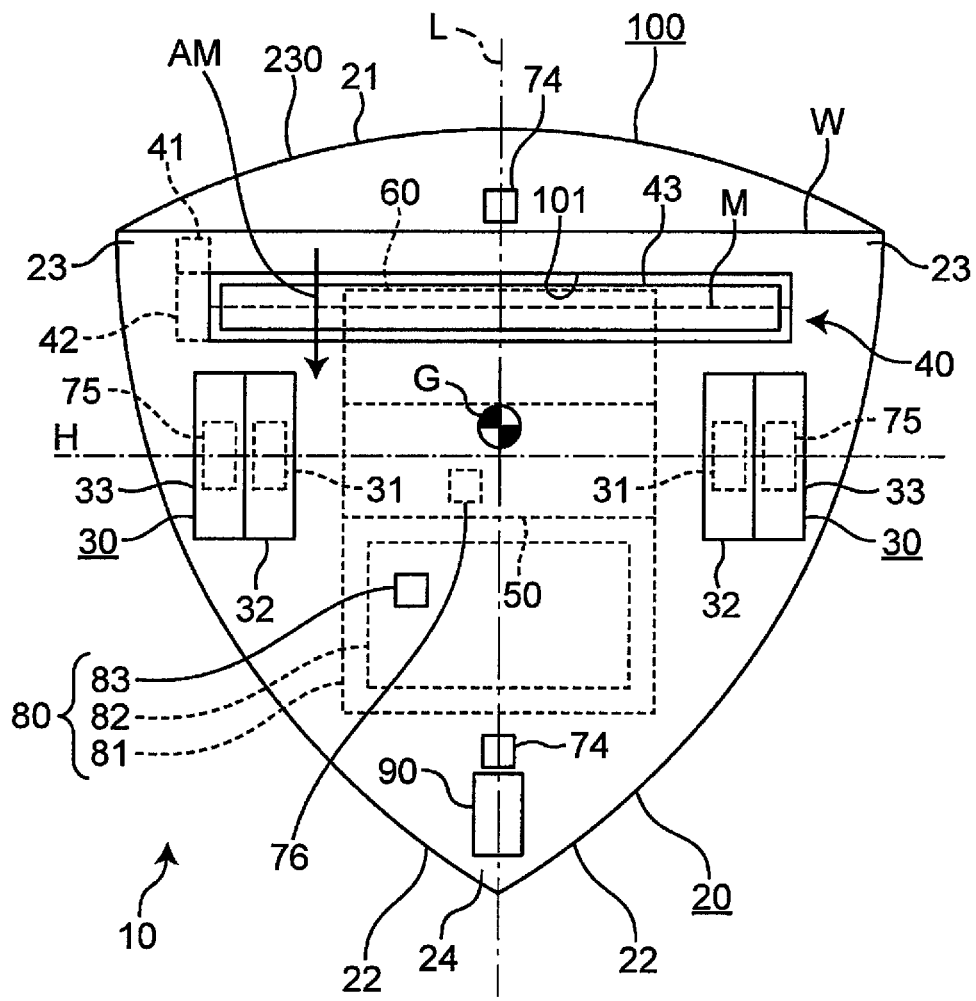
FIG. 33 is a bottom view of the cleaner of FIG. 32.
Figure 34:
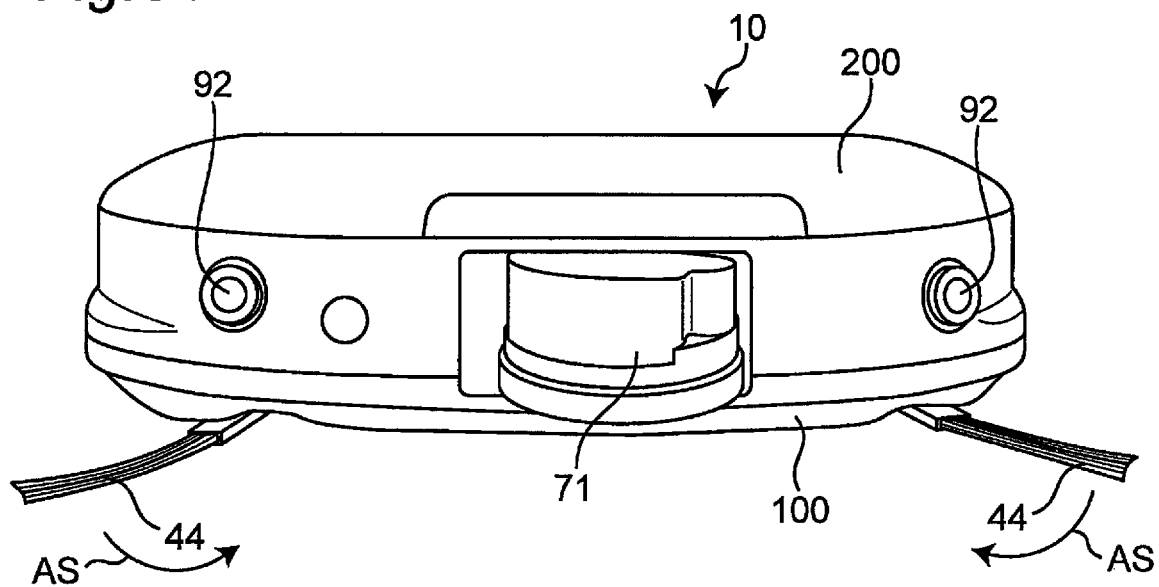
FIG. 34 is a front view of the cleaner of FIG. 32.
Figure 35:
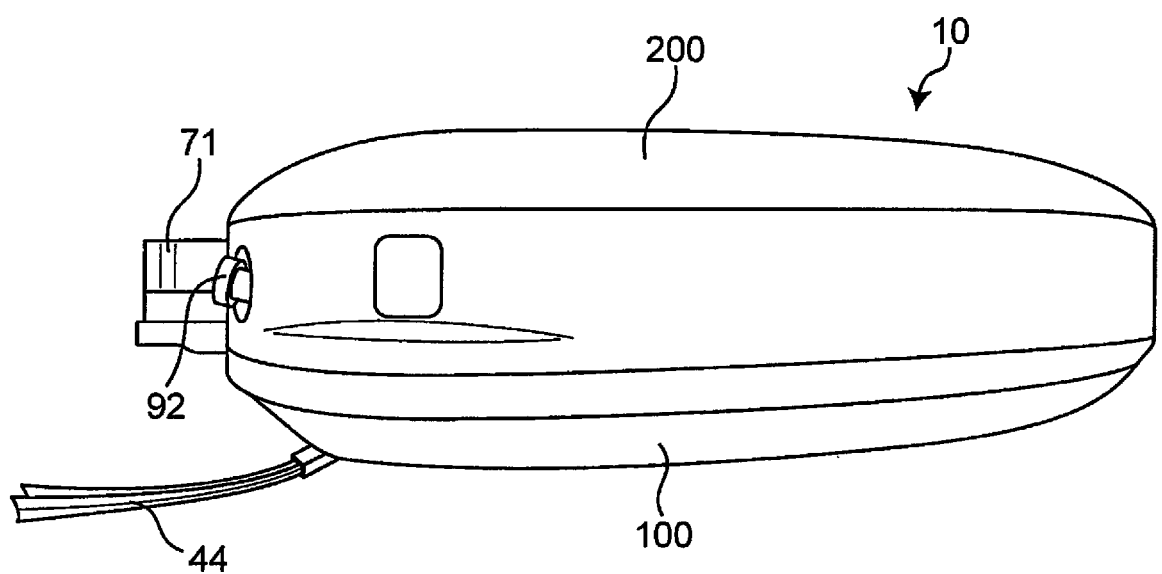
FIG. 35 is a side view of the cleaner of FIG. 32.

FIG. 32 is a plan view of the cleaner 10 of the first embodiment. FIG. 33 is a bottom view of the cleaner 10. FIG. 34 is a front view of the cleaner 10. FIG. 35 is a side view of the cleaner 10.

The cleaner 10 shown in FIG. 32 is an autonomous traveling robot cleaner configured to autonomously travel on a surface to be cleaned, that is a cleaning surface, in an area desired to be cleaned in a predetermined space (hereinafter, referred to as a "cleaning area" or simply a "target area") and suck dust present on the cleaning surface. The target area for cleaning is, for example, a room, and the cleaning surface is, for example, a floor of the room.

Figure 36:
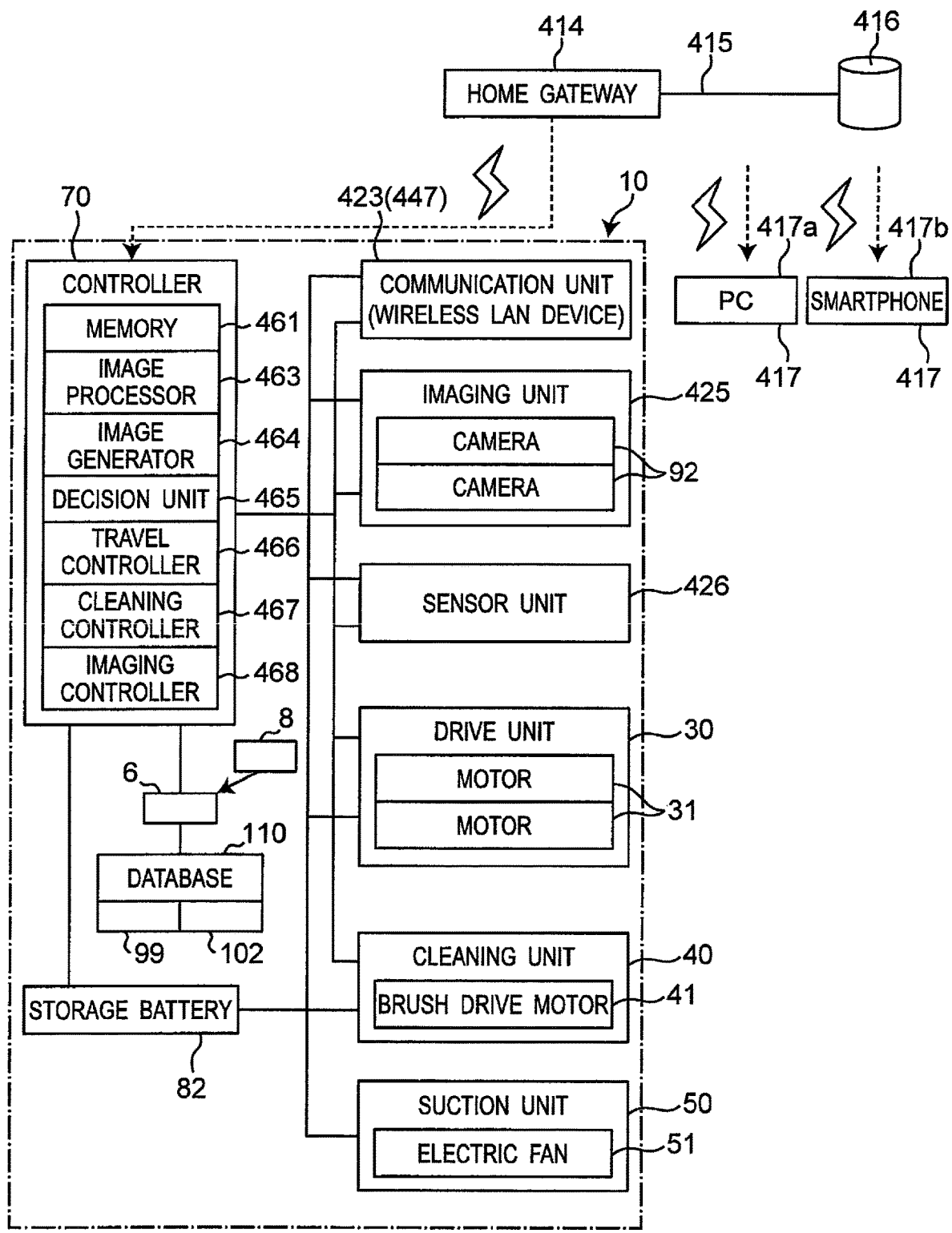
FIG. 36 is a functional block diagram of the cleaner of FIG. 32.
Figure 37:
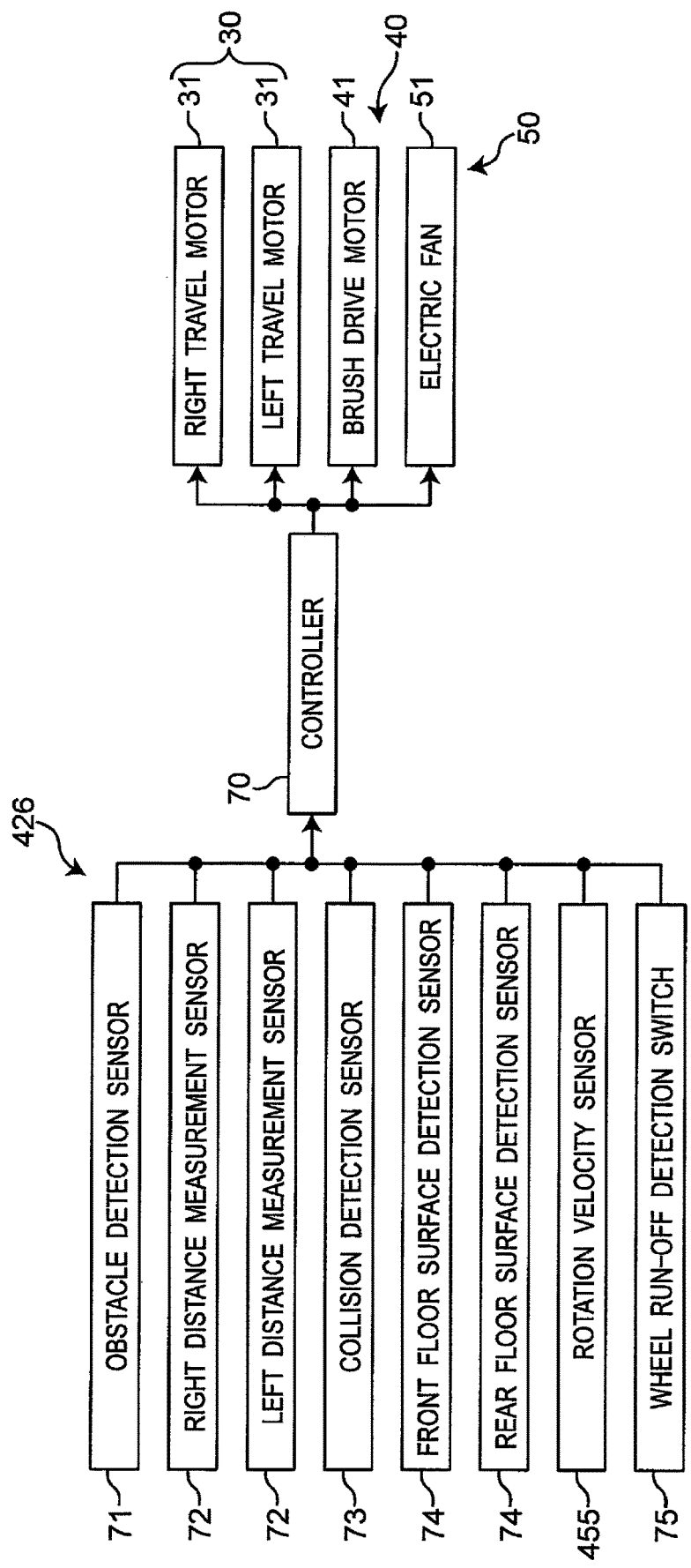
FIG. 37 is a block diagram of a sensor unit of the cleaner of FIG. 32.

FIG. 36 is a functional block diagram of the cleaner 10. FIG. 37 is a block diagram of sensors of a sensor unit of the cleaner 10. The cleaner 10 shown in FIG. 36 includes a cleaner main body 20 corresponding to the robot main body 12 of the mobile robot 1, a drive unit 30 corresponding to the drive unit 3 of the mobile robot 1, a cleaning unit 40, and a suction unit 50. Various components are mounted on the cleaner main body 20. The drive unit 30 drives the travel of the cleaner main body 20. The cleaning unit 40 collects dust present in a cleaning area CA of the predetermined space. The suction unit 50 sucks dust into the cleaner main body 20.

Here, the drive unit 3, the database 5, and the distance sensor 11 of the mobile robot 1 correspond to the drive unit 30, a database 110 or a server 416, and a part of a sensor unit 426 of the cleaner 10, respectively.

A controller 70 of the cleaner 10 basically corresponds to the controller 9 of the control circuit 2 of the mobile robot 1 and functions as an example of the second control circuit, but is partly different. For example, an image processor 463 of the controller 70 corresponds to the information generator 7. The communication unit 19 corresponds to a communication unit 423.

The terminal apparatus 120 corresponds to an external apparatus 417.

Note that the configuration example of the controller 70 or the sensor unit 426 that is a component of the cleaner 10 is an example, and as in the mobile robot 1, some of the components of the controller 70 or the sensor unit 426 may be disposed outside the controller 70 or the sensor unit 426.

The cleaner 10 further includes a dust box 60 and the controller 70. The dust box 60 accumulates the dust sucked by the suction unit 50. The controller 70 controls at least the drive unit 30 and the suction unit 50. The controller 70 is further capable of controlling the cleaning unit 40.

The cleaner 10 further includes a caster 90 corresponding to the wheels 4a, 4b of the mobile robot 1, and a power supply unit 80. The caster 90 rotates following rotation drive of the drive unit 30. The power supply unit 80 supplies power to the drive unit 30, the cleaning unit 40, the suction unit 50, and the like.

In FIG. 32 and FIG. 33, an upper side corresponds to a front side of the cleaner main body 20, and a lower side corresponds to a rear side of the cleaner main body 20. A width direction of the cleaner 10 is defined with reference to a forward direction (for example, the upper side in FIG. 32) of the cleaner 10. For example, in the first embodiment, a direction approximately orthogonal to the forward direction of the cleaner 10 (for example, a left-right direction in FIG. 32 and FIG. 33) is defined as the width direction of the cleaner 10.

In the first embodiment, a pair of the drive units 30 are provided, and one of the drive units 30 is disposed on the left side and the other drive unit 30 is disposed on the right side with respect to the center in the width direction of the cleaner main body 20 in plan view. Hereinafter, the drive unit 30 on the left side may be referred to as a first drive unit, and the drive unit 30 on the right side may be referred to as a second drive unit. Note that a number of the drive units 30 is not limited to two, and may be one or three or more. Details will be described later.

(Cleaner Main Body 20)

The cleaner main body 20 includes a lower casing 100 (see FIG. 33) that defines an outer shape of a lower surface side of the cleaner main body 20, and an upper casing 200 (see FIG. 32) that defines an outer shape of an upper surface side of the cleaner main body 20. The lower casing 100 and the upper casing 200 are combined together to form the cleaner main body 20. As shown in FIG. 32, the upper casing 200 includes a cover 210 that occupies most of the upper casing 200, a lid 220 openably and closably provided to the cover 210, and a bumper 230 displaceable with respect to the cover 210.

A planar shape of the cleaner main body 20 is preferably a Reuleaux triangle, a Reuleaux polygon roughly identical to the Reuleaux triangle, or a Reuleaux triangle or a Reuleaux polygon having R-shaped apices. Such a shape allow the cleaner main body 20 to have a property that is the same as or similar to a geometric property of the Reuleaux triangle. That is, since the Reuleaux triangle is a constant width figure, the Reuleaux triangle can rotate inscribed in a quadrilateral having a constant width (that is, the length of each side of an equilateral triangle inscribed in the Reuleaux triangle) in every direction. This allows the cleaner main body 20 to draw a quadrilateral locus (that is, an approximately square locus). In the first embodiment, as shown in FIG. 32, the cleaner main body 20 is approximately identical in planar shape to the Reuleaux triangle.

Further, the cleaner main body 20 has a plurality of outer peripheral surfaces and a plurality of apices. In the first embodiment, the plurality of outer peripheral surfaces include a front surface 21 located on a front side of the cleaner 10 (for example, the upper side in FIG. 32), a right side surface 22 located on the right rear side with respect to the front surface 21 and a left side surface 22 located on the left rear side with respect to the front surface 21 in the plan view of the cleaner main body 20. Further, in the first embodiment, the front surface 21 has a curved surface curved outward. The curved surface curved outward may be formed on the bumper 230. Each of the side surfaces 22 has, at least in part, a curved surface curved outward. In the first embodiment, the curved surface curved outward is formed on side portions of the bumper 230 and side portions of the cover 210.

In the first embodiment, the plurality of apices include a right front apex 23 defined by the front surface 21 and the right side surface 22 and a left front apex 23 defined by the front surface 21 and the left side surface 22. The plurality of apices may further include a rear apex 24 defined by the right side surface 22 and the left side surface 22. As shown in FIG. 32, angles formed by a tangent L1 to the front surface 21 and tangents L2, L3 to the two side surfaces 22 are both acute.

A maximum width of the cleaner main body 20 is defined by a distance between the plurality of apices of the cleaner main body 20. In the first embodiment, the maximum width of the cleaner main body 20 is defined by the right front apex 23 and the left front apex 23. According to the example shown in FIG. 32, the maximum width of the cleaner main body 20 is defined by a distance between a tip of the right front apex 23 and a tip of the left front apex 23, that is, a distance between two of the three apices of the Reuleaux triangle.

Note that, in the cleaner main body 20, a line W connecting the tip of the right front apex 23 and the tip of the left front apex 23 (hereinafter, referred to as a "maximum width line W of the cleaner main body 20") and its vicinity is referred to as "the portion having the maximum width of the cleaner main body 20" or "the maximum width portion of the cleaner main body 20". Phrases of "the vicinity of the maximum width line W of the cleaner main body 20" and "the portion close to the maximum width line W of the cleaner main body 20" indicate a portion close to the maximum width line W of the cleaner main body 20, that is, a portion between the maximum width line W of the cleaner main body 20 and a center of gravity G (see FIG. 33) of the cleaner 10 and a portion between the maximum width line W and the front surface 21 of the cleaner main body 20. More specifically, the phrases indicate a portion between the maximum width line W of the cleaner main body 20 and distal ends of the drive units 30 in the forward direction of the cleaner main body 20 and a portion between the maximum width line W and the front surface 21 of the cleaner main body 20.

Further, the maximum width portion of the cleaner main body 20 is preferably located close to the front surface 21 of the cleaner main body 20. Further, a direction in which the maximum width line W of the cleaner main body 20 extends is preferably set approximately orthogonal to the forward direction of the cleaner main body 20.

As shown in FIG. 33, the cleaner main body 20 further includes a suction port 101 for sucking dust into the cleaner main body 20. The suction port 101 is formed in a bottom surface of the lower casing 100 of the cleaner main body 20. The suction port 101 has a laterally long shape, preferably a quadrilateral shape or an approximately quadrilateral shape. The shape of the suction port 101 is not limited to the above-described shapes and may be an elliptical shape, a trapezoidal shape, or a shape curved along a contour of the cleaner main body 20. In the first embodiment, the suction port 101 has a rectangular shape. Further, in the first embodiment, the suction port 101 is disposed in the bottom surface of the lower casing 100 of the cleaner main body 20 such that a longitudinal direction of the suction port 101 is substantially the same as the width direction of the cleaner main body 20 and a short direction of the suction port 101 is substantially the same as the front-back direction of the cleaner main body 20.

Further, the suction port 101 is formed in the bottom surface of the lower casing 100 of the cleaner main body 20 at a portion close to a portion having the maximum width of the cleaner main body 20, more preferably at a portion close to the maximum width line W of the cleaner main body 20. This positional relationship is more specifically defined by the positional relationship of the suction port 101 with respect to other components and the like of the cleaner 10. For example, the positional relationship is defined by one or both of the following two positional relationships.

A first positional relationship indicates that the suction port 101 is positioned on the front side of the cleaner main body 20 with respect to the center of gravity G (see FIG. 33) of the cleaner 10. More specifically, a center line M of the suction port 101 extending in approximately the same direction as the longitudinal direction of the suction port 101 (hereinafter, referred to as "the center line in the longitudinal direction of the suction port 101") is positioned on the front side of the cleaner main body 20 with respect to the center of gravity G of the cleaner 10 (see FIG. 33), that is, at a front portion of the cleaner main body 20, that is, at the maximum width portion of the cleaner main body 20. Note that the center line in the longitudinal direction of the suction port 101 may be positioned closer to the front surface 21 than the maximum width line W of the cleaner main body 20.

A second positional relationship indicates that the suction port 101 is positioned closer to the maximum width line W of the cleaner main body 20 than the drive unit 30, preferably the suction port 101 is positioned on the maximum width line W of the cleaner main body 20 or in the vicinity of the maximum width line W, and, more preferably, the suction port 101 is positioned closer to the front surface 21 than the maximum width line W of the cleaner main body 20.

Further, in the first embodiment, the width in the longitudinal direction of the suction port 101 is set greater than a distance between the right drive unit 30 and the left drive unit 30. Such a configuration can be achieved, for example, by the above-described second positional relationship concerning the suction port 101. This configuration allows the suction port 101 having a larger width to be provided, which allows the suction port 101 to directly suck dust more reliably and allows the amount of dust sucked into the suction unit 50 to be increased.

(Drive Unit 30)

The drive units 30 are positioned in the cleaner main body 20.

As shown in FIG. 33, each of the drive units 30 is disposed on the bottom side of the lower casing 100 and includes a plurality of elements of wheels 33 that travel on the cleaning surface. According to the first embodiment, each of the drive units 30 includes, in addition to the wheel 33 that travels on the cleaning surface, travel motors 31 corresponding to the motors 141, 142 that applies torque to the wheels 33, and housings 32 that house the travel motors 31. The wheels 33 are each accommodated in a recess formed in the lower casing 100 and supported by the lower casing 100 to be rotatable with respect to the lower casing 100.

The wheels 33 are each disposed on a side in the width direction of the cleaner main body 20 outer than a corresponding travel motor 31 that applies torque to the wheel 33. Such a configuration allows a space between the right wheel 33 and the left wheel 33 to become wide compared with a configuration where the wheels 33 are each positioned on an inner side of the corresponding travel motor 31 in the width direction, thereby increasing stability while the cleaner main body 20 is traveling.

The drive system of the cleaner 10 of the first embodiment is of an opposed two-wheel type. That is, the right drive unit 30 and the left drive unit 30 are arranged to face each other in the width direction of the cleaner main body 20. Further, in the first embodiment, as shown in FIG. 33, a rotation axis H of the right wheel 33 and a rotation axis H of the left wheel 33 are substantially coaxial.

The distance between the rotation axis H and the center of gravity G of the cleaner 10 is set, for example, with an intention of giving a predetermined turning performance to the cleaner 10. The predetermined turning performance is a turning performance that allows the cleaner main body 20 to form a locus identical or similar to a quadrilateral locus formed by the above-described contour of the Reuleaux triangle. According to the first embodiment, the position of the rotation axis H is set on the rear side of the cleaner main body 20 with respect to the center of gravity G of the cleaner 10, and the distance between the rotation axis H and the center of gravity G is set to a predetermined distance. According to the cleaner 10 of the opposed two-wheel type, such a configuration allows the above-described locus to be formed through contact between the cleaner main body 20 and objects around the cleaner main body 20.

(Cleaning Unit 40)

As shown in FIG. 33, the cleaning unit 40 is disposed inside and outside the cleaner main body 20, and includes a plurality of elements of a brush drive motor 41. According to the first embodiment, the cleaning unit 40 includes, in addition to the brush drive motor 41 disposed inside the cleaner main body 20 (for example, the left side of the suction port 101), a gear box 42, and a main brush disposed in the suction port 101 of the cleaner main body 20.

The brush drive motor 41 and the gear box 42 are mounted on the lower casing 100. The gear box 42 is connected to an output shaft of the brush drive motor 41 and the main brush 43, and transmits torque of the brush drive motor 41 to the main brush 43.

The main brush 43 is approximately identical in length to the suction port 101 in the longitudinal direction and is supported by a bearing portion to be rotatable with respect to the lower casing 100. The bearing portion is formed on one or both of the gear box 42 and the lower casing 100, for example. According to the first embodiment, as indicated by an arrow AM in FIG. 33 showing the side view of the cleaner 10, a rotation direction of the main brush 43 is set to a direction in which a rotation trajectory of the main brush 43 on the cleaning surface side is drawn from the front toward the rear of the cleaner main body 20.

(Suction Unit 50)

As shown in FIG. 32, the suction unit 50 is disposed inside the cleaner main body 20 and includes a plurality of elements of a fan case 52. According to the first embodiment, the suction unit 50 is disposed on the rear side with respect to the dust box 60 and on the front side with respect to the power supply unit 80 (to be described later). The suction unit 50 includes the fan case 52 mounted on the lower casing 100 (see FIG. 33) and an electric fan 51 disposed inside the fan case 52.

The electric fan 51 sucks air in the dust box 60 and discharges the air to the outside of the electric fan 51. The air discharged by the electric fan 51 passes through a space inside the fan case 52 and a space around the fan case 52 inside the cleaner main body 20, and is exhausted to the outside of the cleaner main body 20.

(Dust Box 60)

As shown in FIG. 33, the dust box 60 is disposed on the rear side with respect to the main brush 43 and on the front side with respect to the suction unit 50 inside the cleaner main body 20, and is disposed between the drive units 30. The cleaner main body 20 and the dust box 60 have a detachable structure that allows the user to optionally select either a state where the dust box 60 is attached to the cleaner main body 20 or a state where the dust box 60 is detached from the cleaner main body 20.

(Sensor Unit 426)

As shown in FIG. 32, FIG. 33, FIG. 36, and FIG. 37, the cleaner 10 further includes the sensor unit 426 including a plurality of sensors including the distance sensor 11.

The sensor unit 426 includes an obstacle detection sensor 71, a plurality of distance measurement sensors 72, a collision detection sensor 73, and a plurality of floor surface detection sensors 74. The distance sensor 11 corresponds to the obstacle detection sensor 71 or the plurality of distance measurement sensors 72.

Here, examples of the distance measurement sensors 72 include an infrared sensor and a laser range finder (LiDAR).

Examples of the obstacle detection sensor 71 include an infrared sensor, a laser range finder (LiDAR), and an ultrasonic sensor.

The laser range finder can be also referred to as a light detection and ranging (LiDAR). The LiDAR includes an output unit that outputs a laser and a light receiving unit. The output unit emits a pulsed laser, and the light receiving unit receives scattered light of the laser, and a distance to a target object is detected based on a measured value thus received.

It is sufficient that at least one of the obstacle detection sensor 71 and the distance measurement sensor 72 is provided as the distance sensor 11. Alternatively, both of the obstacle detection sensor 71 and the distance measurement sensor 72 may be provided as the distance sensor 11. Although a description will be given of the obstacle detection sensor 71 on the assumption that the measured value is used for obstacle detection, the measured value may also be used for distance measurement. Further, although a description will be given of the distance measurement sensor 72 on the assumption that the measured value is used for distance measurement, the measured value may also be used for obstacle detection.

The cleaner 10 of the first embodiment further includes the dust detection sensor 76 that is an example of a dust sensor that detects information on dust included in the air flowing through a duct extending from the suction unit 50 to the dust box. As shown in FIG. 33, the dust detection sensor 76 is disposed in the duct. As the dust detection sensor 76, for example, an infrared sensor is used. The dust detection sensor 76 includes a light emitting unit and a light receiving unit. A detection signal of the dust detection sensor 76 is input to the controller 70.

The obstacle detection sensor 71 detects an obstacle present in front of the cleaner main body 20 (see FIG. 32). For example, the obstacle detection sensor 71 is capable of detecting the presence or absence of an object, the shape of the object, and the distance to the object.

The plurality of distance measurement sensors 72 detect the distance between the cleaner main body 20 and an object present around the cleaner main body 20 (see FIG. 32).

The collision detection sensor 73 detects that the cleaner main body 20 has collided with an object around the cleaner main body 20 (see FIG. 32).

The plurality of floor surface detection sensors 74 detect the cleaning surface present below the bottom surface of the cleaner main body 20 (see FIG. 33).

The obstacle detection sensor 71, the distance measurement sensor 72, the collision detection sensor 73, and the floor surface detection sensor 74 each input a detection signal to the controller 70.

As the obstacle detection sensor 71, for example, a laser range finder that emits a laser within a range of 180 degrees every predetermined time (for example, one second) to measure a distance is used. The obstacle detection sensor 71 is capable of detecting whether a target object such as a carpet or a rug is present on the floor, in addition to an object such as a desk or a chair, based on the distance between the object or the target object and the cleaner main body 20. When the target object is present, the obstacle detection sensor 71 can detect the shape of the object or the target object and the distance to the object or the target object.

As the distance measurement sensor 72 and the floor surface detection sensor 74, for example, an infrared sensor is used. The distance measurement sensor 72 and the floor surface detection sensor 74 each include a light emitting unit and a light receiving unit. As the collision detection sensor 73, for example, a contact displacement sensor is used. For example, the collision detection sensor 73 includes a switch that is closed as the bumper 230 is pushed into the cover 210.

As shown in FIG. 32, in the first embodiment, the distance measurement sensors 72 are arranged on the right side and the left side of the cleaner main body 20 with respect to the center in the width direction in plan view. The distance measurement sensor 72 on the right side is disposed at the right front apex 23 and outputs light diagonally right forward from the cleaner main body 20. The distance measurement sensor 72 on the left side is disposed at the left front apex 23 and outputs light diagonally left forward from the cleaner main body 20. Such a configuration allows, when the cleaner 10 turns, the distance between the cleaner main body 20 and an object around the cleaner main body 20 that is closest to the contour of the cleaner main body 20 to be detected.

As shown in FIG. 33, for example, the plurality of floor surface detection sensors 74 are arranged on the front side and the rear side of the cleaner main body 20 with respect to the drive unit 30, detect distances from the floor surface at the front side and the rear side of the cleaner main body 20, and outputs an abnormal signal when the distance from the floor surface exceeds a threshold, thereby preventing the cleaner main body 20 from falling off the floor surface at a staircase.

The sensor unit 426 further includes, for example, a rotation velocity (rotation number) sensor 455 of an optical encoder that detects a rotation velocity of each of the wheels 33 (each of the travel motors 31). This rotation velocity sensor 455 corresponds to the encoders 143, 144, and detects a turning angle, a travel distance, or a travel amount of the cleaner 10 (the cleaner main body 20) from a measured rotation velocity of each of the wheels (each of the travel motors 31) and inputs the turning angle, the travel distance, or the travel amount to the controller 70. Therefore, the rotation velocity sensor 455 corresponds to a position detection sensor that detects a relative position of the cleaner 10 (the cleaner main body 20) from a reference position, for example, a charging apparatus.

From the position of the cleaner 10 detected by the rotation velocity sensor 455, the positional relationship between the cleaning area CA in the predetermined space where the cleaner 10 is disposed and the object positioned in the cleaning area CA is calculated, and the map information 301 (FIG. 7) is generated.

Note that the relative position can also be handled as "the current position" of the cleaner 10 (to be described later).

(Controller 70)

In the example of FIG. 32, the controller 70 is disposed on the rear side with respect to the suction unit inside the cleaner main body 20. Specifically, the controller 70 may be implemented by a control circuit.

An example of specific hardware of the controller 70 is a microcomputer that includes a CPU, a ROM corresponding to a storage unit that holds fixed data of a program that is read by the CPU, and a RAM corresponding to an area storage unit that dynamically forms various memory areas of work areas each serving as a task area where data processing is performed by the program. The controller 70 further includes a memory 461, the image processor 463, an image generator 464, and an decision unit 465.

The memory 461 functions as, for example, a storage section (a storage) that stores data of an image taken by the pair of cameras 92, and the presence or absence of an object, the shape of the object, and the distance to the object acquired by the obstacle detection sensor 71.

The image processor 463 functions as a map generation section (a map generator) that generates the map information 301 on the cleaning area CA based on the data of the image taken by the pair of cameras 92, and the presence or absence of the object, the shape of the object, and the distance to the object acquired by the obstacle detection sensor 71.

The image generator 464 functions as an image generation section (an image generator) that generates a distance image based on data of the image taken by the pair of cameras 92, and the presence or absence of the object, the shape of the object, and the distance to the object, acquired by the obstacle detection sensor 71.

The decision unit 465 functions as an obstacle decision section (an obstacle decision unit) that decides an obstacle based on the data of the image taken by the pair of cameras 92, and the presence or absence of the object, the shape of the object, and the distance to the object acquired by the obstacle detection sensor 71.

The controller 70 further includes a travel controller 466, a cleaning controller 467, and an imaging controller 468.

The travel controller 466 controls operations of the left and right travel motors 31 (the pair of wheels 33) of the drive unit 30.

The cleaning controller 467 controls an operation of the brush drive motor 41 of the cleaning unit 40 and an operation of the electric fan 51 of the suction unit 50.

The imaging controller 468 controls the pair of cameras 92 of an imaging unit 425.

The controller 70 has, for example, a travel mode in which the pair of wheels 33 (the pair of motors 31) are driven to cause the cleaner 10 (the cleaner main body 20) to autonomously travel, a charging mode in which a storage battery 82 (to be described later) is charged by the charging apparatus, and a standby mode in which the cleaner 10 is on standby for operation, and these modes are stored in the memory 461.

The travel mode includes, at least, (i) a first travel mode in which after cleaning the cleaning area CA in the space excluding the target object, the cleaner 10 travels over the target object, and (ii) a second travel mode in which after traveling over the target object, the cleaner 10 cleans the cleaning area CA in the space excluding the target object. Here, traveling over means, for example, getting on the target object, cleaning the upper surface of the target object, and then getting off the target object. Note that a position where the cleaner 10 gets on the target object and a position where the cleaner 10 gets off the target object may be different from each other or identical to each other. Further, after getting on the target object, the cleaner 10 may clean while traveling on the upper surface of the target object in various directions, or after getting on the target object, the cleaner 10 may clean while traveling straight and then gets off the target object.

Various specific map generation processing methods are known for the image processor 463 that functions as a map generation section (a map generator) that generates the map information 301 of the cleaning area CA. For example, a technique, called simultaneous localization and mapping (SLAM), can be used as a generation method in a case where the map information 301 is generated by the cleaner 10 and a method of estimating the self-position of the cleaner 10. The SLAM is a technique for simultaneously estimating the self-position of the cleaner 10 and creating an environmental map based on the information on the distance to the object detected by the sensor unit 426.

A description will be given of a concept of SLAM. (1) Estimate the position of an observation point on the map based on the position of the cleaner 10. (2) Estimate the position of the cleaner 10 one after another by using the odometry method of obtaining the travel amount from the rotation velocity of the wheels 33 of the cleaner 10. (3) Observe the point already registered in the map information 301 again and correct the position of the cleaner 10.

A simultaneous equation is created by combining respective equations for obtaining these (1) to (3). Solving the simultaneous equation by the least squares method allows the position of the cleaner 10 and the map information 301 to be estimated and reduces a cumulative error.

For details, refer to Non-Patent Document 1 (Masahiro Tomono, "Mobile Robot Perception: Mapping and Localization", "System/Control/Information" Journal of the Institute of Systems, Control and Information Engineers, vol. 60, No. 12, pp. 509-514, 2016.

The map information 301 thus generated is stored in a map database 99, and the self-position of the cleaner 10 thus estimated is stored in the memory 461.

The memory 461 is a nonvolatile memory, for example, a flash memory that holds various pieces of data stored regardless of whether the power supply to the cleaner 10 is on or off.

The image processor 463 generates the map information 301 (FIG. 7) by calculating the distance between the object around the cleaner 10 (the cleaner main body 20) and the cleaner 10 (the cleaner main body 20) from the data of the image taken by the pair of cameras 92, and the presence or absence of the object, the shape of the object, and the distance to the object acquired by the obstacle detection sensor 71, and calculating the positional relationship between the cleaning area CA where the cleaner 10 (the cleaner main body 20) is disposed and the object positioned in the cleaning area CA from the distance and the position of the cleaner 10 (the cleaner main body 20) detected by rotation velocity sensor 455 of the sensor unit 426.

The image generator 464 generates a distance image indicating the data of the image taken by the pair of cameras 92, and the presence or absence of the object, the shape of the object, and the distance to the object acquired by the obstacle detection sensor 71. The image generator 464 generates the distance image by converting, for each predetermined dot corresponding to one dot of the image, a level of lightness or color tone of the data of the image taken by the pair of cameras 92, and the shape of the object and distance to the object acquired by the obstacle detection sensor 71 to a level that allows visual recognition and displaying the resultant data, shape, and distance. In the first embodiment, the image generator 464 generates the distance image as a monochrome image where the larger the distance is, the lower the lightness becomes, that is, a gray-scale image where the larger an ahead distance from the cleaner 10 (the cleaner main body 20) is, the darker the image becomes, and the smaller the ahead distance is, the lighter the image becomes, for example, a 256-level (8 bits=$2^8$) gray-scale image. Therefore, this distance image is, so to speak, an image resulting from visualizing a collection of pieces of distance data of an object positioned within a range imaged by the pair of cameras 92 disposed at the front side of the cleaner 10 in the travel direction of the cleaner 10 (the cleaner main body 20).

The decision unit 465 decides whether the object is an obstacle based on the data of the image taken by the pair of cameras 92, and the presence or absence of the object, the shape of the object, and the distance to the object acquired by the obstacle detection sensor 71. In other words, the decision unit 465 extracts, from the data of the image taken by the pair of cameras 92, and the presence or absence of the object, the shape of the object, and the distance to the object acquired by the obstacle detection sensor 71, a predetermined range, for example, a portion in a predetermined image range of a quadrilateral shape in the distance image, and compares the distance to the object in the image range to a set distance that is a predetermined threshold or a variable threshold to decide the object positioned at a distance equal to or less than the set distance (in other words, at a distance from the cleaner 10 (the cleaner main body 20)) as an obstacle. The image range is set in accordance with the size of the cleaner 10 (the cleaner main body 20) in the vertical and horizontal directions. In other words, a top, bottom, left, and right of the image range is set in a range where the cleaner 10 (the cleaner main body 20) makes contact when traveling straight.

The travel controller 466 controls the amount and direction of the current flowing through the pair of motors 31, thereby causing the pair of motors 31 to rotate normally or reversely, to control the drive of the pair of motors 31, and controls the drive of the pair of wheels 33 through the control of the drive of the pair of motors 31.

The cleaning controller 467 separately controls conduction angles of the electric fan 51 and the brush drive motor 41 to control the drive of the electric fan 51 and the drive of the brush drive motor 41. Note that the electric fan 51 and the brush drive motor 41 may be individually provided with a controller.

The imaging controller 468 includes a control circuit that controls operations of shutters of the pair of cameras 92. The imaging controller 468 causes the shutters to operate at predetermined time intervals so that images are taken by the pair of cameras 92 at the predetermined time intervals.

(Power Supply Unit 80)

The power supply unit 80 is positioned in the cleaner main body 20 and supplies power to the communication unit 423, the imaging unit 425, the drive unit 30, the cleaning unit 40, the suction unit 50, and the sensor unit 426. The power supply unit 80 is disposed on the rear side of the cleaner main body 20 with respect to the center of gravity G of the cleaner 10 and the suction unit 50, and includes a plurality of elements of a power supply case 81. According to the first embodiment, the power supply unit 80 includes, as specific hardware, the power supply case 81 attached to the lower casing 100, the storage battery 82 housed in the power supply case 81, and a main switch 83 that switches supply and stop of power from the power supply unit 80 to each of the components.

For the storage battery 82, for example, a secondary battery is used. The storage battery 82 is housed in the cleaner main body 20 and is electrically connected to, for example, a charging terminal (not shown) as a connection part exposed on both sides of the rear side of the lower surface of the cleaner main body 20, and, with the charging terminals electrically and mechanically connected to the charging apparatus, is charged via the charging apparatus.

(Camera 92)

The cleaner 10 further includes the pair of cameras 92 that acquire a camera image including information on the surroundings of the cleaner main body 20 under imaging control by the imaging controller 468.

The pair of cameras 92 constitute the imaging unit 425 that takes an image and are arranged on both the left and right sides with respect to the obstacle detection sensor 71 on the front surface 21 of the cleaner main body 20. That is, in the first embodiment, the pair of cameras 92 are arranged, on the front surface 21 of the cleaner main body 20, at positions that have approximately the same predetermined angle (acute angle) in the left-right direction with respect to a center line L in the width direction of the cleaner 10 (the cleaner main body 20). In other words, the pair of cameras 92 are arranged approximately symmetrical in the width direction of the cleaner main body 20, and a center position between the pair of cameras 92 is approximately identical to a center position in the width direction that intersect (is orthogonal to) the front-back direction corresponding to the travel direction of the cleaner 10 (the main body 20). Furthermore, the pair of cameras 92 are arranged at approximately the same position in the vertical direction, that is, at approximately the same height position. Therefore, in a state where the cleaner 10 is placed on the floor surface, the heights of the pair of cameras 92 from the floor surface are set approximately equal to each other. Therefore, the pair of cameras 92 are arranged at positions that are different from each other (shifted in the left-right direction) and spaced apart from each other. Further, the pair of cameras 92 are digital cameras that take digital images capturing the front view in the travel direction of the cleaner main body 20 at a predetermined horizontal angle of view (for example, 105°) at predetermined time intervals, for example, at minute time intervals of several tens of milliseconds or at intervals of several seconds. Furthermore, the pair of cameras 92 have their fields of view overlapping each other; thus, a pair of images taken by the pair of cameras 92 have overlapping portions in the left-right direction in an area including a front position on an extended center line L in the width direction of the cleaner 10 (the cleaner main body 20). In the first embodiment, it is assumed that the pair of cameras 92 take an image in the visible light region, for example. Note that the image taken by the pair of cameras 92 can be compressed to a predetermined data format by an image processing circuit (not shown), for example.

The image taken by the pair of cameras 92 is input to the image processor 463 of the controller 70, and the controller 70 acquires information on the object including the target object, for example, the presence or absence of the object and the shape of the object.

For example, in the image processor 463, when an image is input to a learner that has learned in advance in the image processor 463 with the camera 92, object information including the presence or absence of the object, the shape of the object, and the name information on the object is acquired from the camera image. Alternatively, the image processor 463 is capable of acquiring the object information including the presence or absence of the object, the shape of the object, and the name information on the object by matching a pattern (image) held in advance in the image processor 463 with the camera image.

As described above, when acquiring the object information from the camera image, a position that faces the cleaner 10 (or the camera 92) and is away from the self-position of the cleaner 10 at image-taking by a predetermined distance (that is, a distance between the object and the cleaner 10) is acquired as "the position of the object".

(Database 110)

The database 110 is connected to the communication unit 423, the controller 70, the imaging unit 425, and the sensor unit 426 and includes the map database 99 and a route database 102.

The map database 99 stores the map information on the cleaning area CA. The map information on the cleaning area CA may stores map information on the cleaning area CA created in advance or map information on the cleaning area CA created by the cleaner 10.

The route database 102 stores a planned route P of the cleaner 10 in the map information on the cleaning area CA and also stores information on a route generation rule (to be described later). As will be described later, a plurality of the planned routes P generated based on the route generation rule are stored in advance in the route database 102 so that the user can select at least one planned route P from among the plurality of planned routes P (Other Configuration)

Further, the cleaner 10 further includes the communication unit 423 that communicates with the external apparatus 417 including an external terminal apparatus of a smartphone as an apparatus corresponding to the terminal apparatus 120.

The communication unit 423 may include a wireless LAN section (a wireless communication unit) for performing wireless communication with the external apparatus 417 via a home gateway 414 and the network 415, a wireless LAN device 447 as a cleaner signal reception section (a cleaner signal receiver), a transmission section (a transmitter) (not shown) such as an infrared ray emitting element that transmits a radio signal (an infrared signal) to the charging apparatus, and a reception section (a receiver) (not shown) such as a phototransistor that receives a radio signal (an infrared signal) from the charging apparatus (not shown) or a remote controller (not shown).

The wireless LAN device 447 transmits and receives various pieces of information from the cleaner 10 over the network 415 via the home gateway 414, and is built in, for example, the cleaner main body 20.

The home gateway 414, which is also called an access point, is installed in a building and connected to the network 415, for example, through wire.

The server 416 is a computer (a cloud server) connected to the network 415 and is capable of storing various pieces of data.

The external apparatus 417 is a general-purpose device such as a PC (a tablet terminal apparatus (a tablet PC apparatus) 417a or a smartphone (mobile phone) 417b that is capable of communicating, inside the building, through wire or by radio over the network 415 via the home gateway 414, for example, and is capable of communicating, outside the building, through wire or by radio over the network 415.

The external apparatus 417 includes displays 417c, 417d that correspond to the display 119 and have at least a display function of displaying an image.

(Modification)

Figure 38A:
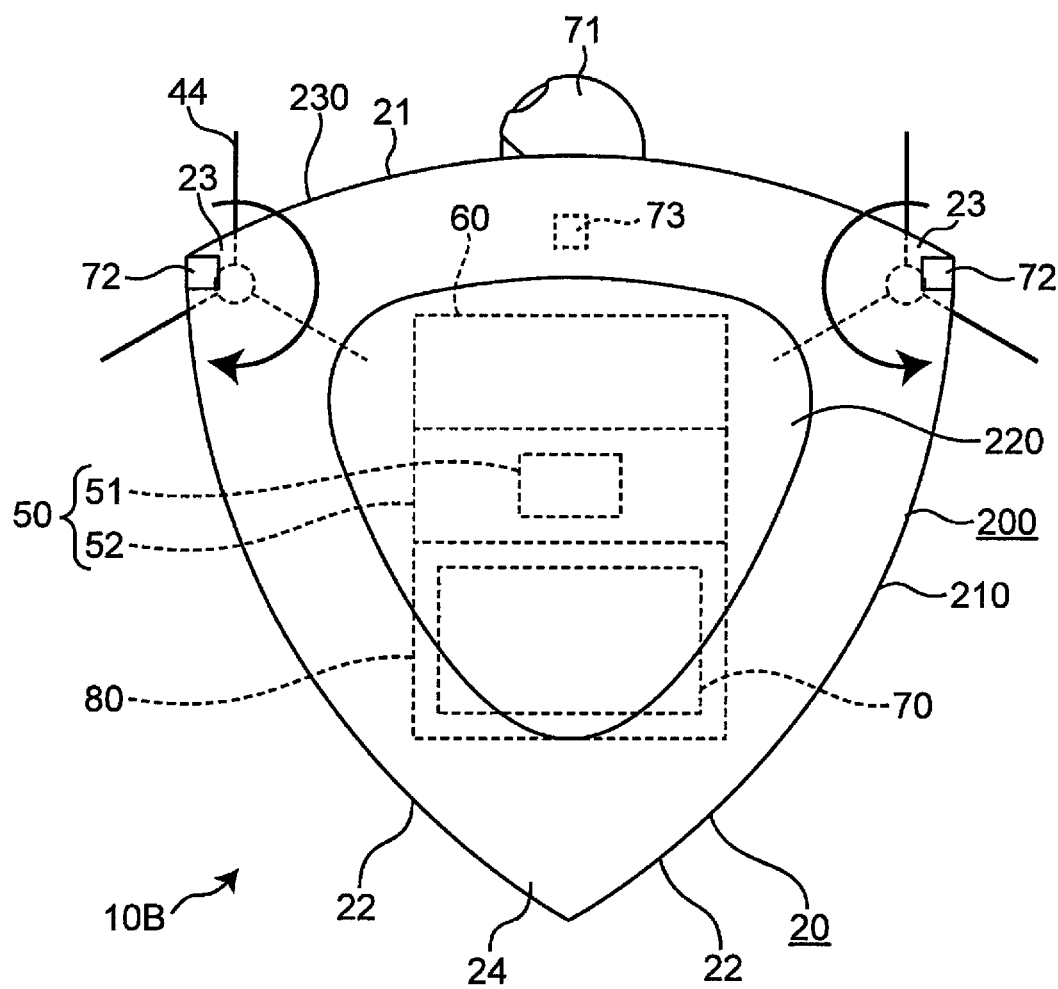
FIG. 38A is a plan view of a cleaner according to the modification of the first embodiment of the present disclosure.
Figure 38B:
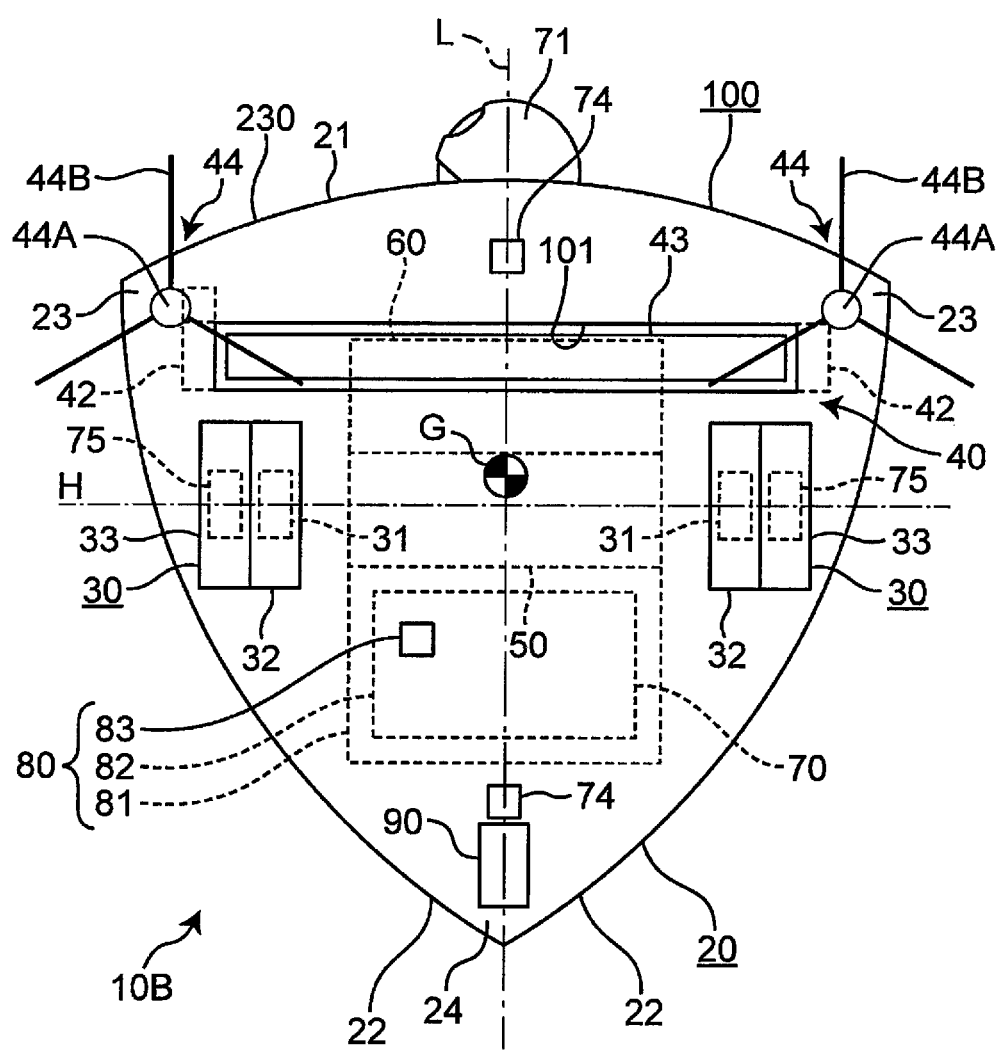
FIG. 38B is a bottom view of the cleaner according to the modification.

Although the cleaner 10 of the first embodiment does not include such components, as shown in FIG. 38A and FIG. 38B, in a cleaner 10B according to a modification of the first embodiment, the cleaning unit 40 may further include a side brush 44 disposed on the bottom surface side of the lower casing 100 of the cleaner main body 20 and gear boxes 42 disposed on the left and right sides of the suction port 101. The side brush 44 is provided on each of the left and right sides on the bottom surface side of the lower casing 100 of the cleaner main body 20.

One of the gear boxes 42 (for example, a gear box 42 on the right side of the cleaner main body 20 in plan view) is connected to an output shaft of the brush drive motor 41, the main brush 43, and one of the side brushes 44 and transmits torque of the brush drive motor 41 to the main brush 43 and the one of the side brushes 44. The other gear box 42 (for example, the gear box 42 on the left side of the cleaner main body 20 in plan view) is connected to the main brush 43 and the other side brush 44 and transmits torque of the main brush 43 to the other side brush 44.

In the modification of the first embodiment, each of the pair of side brushes 44 includes a brush shaft 44A attached to each of the two front apices 23 of the cleaner main body 20, and a plurality of bristle bundles 44B attached to the brush shaft 44A. For a position of the side brush 44 with respect to the cleaner main body 20, part of a rotation locus of the side brush 44 capable of collecting dust into the suction port 101 (a circular locus drawn by one rotation of the side brush 44. The same applies hereinafter) is positioned at the maximum width portion of the cleaner main body 20. According to the modification of the first embodiment, a number of the bristle bundles 44B attached to each brush shaft 44A is three, and each bristle bundle 44B is attached to the brush shaft 44A at fixed angular intervals.

Each brush shaft 44A includes a rotation axis that extends in the same direction or roughly in the same direction as the height direction of the cleaner main body 20, is supported by the cleaner main body 20 to be rotatable with respect to the cleaner main body 20, and is disposed on the front side of the cleaner main body 20 with respect to a center line of the suction port 101 in the longitudinal direction.

The bristle bundle 44B is composed of a plurality of bristles and is fixed to each brush shaft 44A to extend in the same direction or roughly in the same direction as the radial direction of the brush shaft 44A. According to the modification of the first embodiment, a length of each bristle bundle 44B is set to a length that causes a distal end of each bristle bundle 44B to protrude outward beyond the contour of the cleaner main body 20.

As indicated by an arrow AS in FIG. 34, the rotation direction of each side brush 44 is set to a direction in which the rotation locus of the side brush 44 is drawn from the front to the rear of the cleaner main body 20 on the center side in the width direction of the cleaner main body 20. That is, the side brushes 44 rotate in opposite directions. In the modification of the first embodiment, each side brush 44 rotates from the front to the rear of the cleaner main body 20 at a portion of the rotation locus that is close to the rotation locus of the other side brush 44.

(Control Method of Cleaner 10)

Next, a control method of the cleaner 10 by the controller 70 will be described.

FIG. 37 is a block diagram showing a function of an electric system of the cleaner 10.

The controller 70 is disposed on the power supply unit 80 (see FIG. 32 and FIG. 33) inside the cleaner main body 20, and is electrically connected to the power supply unit 80. The controller 70 is further electrically connected to the communication unit 423, the imaging unit 425, the sensor unit 426, the pair of travel motors 31, the brush drive motor 41, and the electric fan 51.

The controller 70 causes, based on the detection signal input from the obstacle detection sensor 71 of the sensor unit 426 and including the presence or absence of the object, the shape of the object, and the distance to the object, the decision unit 465 to decide whether the object that may hinder the travel of the cleaner 10 is present within a predetermined range in the front of the cleaner main body 20. The controller 70 calculates, based on the respective detection signals input from the left and right distance measurement sensors 72, the distance between an object present around each of the left and right front apices 23 of the cleaner main body 20 and the contour of the cleaner main body 20.

The controller 70 decides, based on the detection signal input from the collision detection sensor 73, whether the cleaner main body 20 has collided with the object around the cleaner main body 20. The controller 70 decides, based on the detection signal input from the floor surface detection sensor 74, whether the cleaning surface of the cleaning area CA is present below the cleaner main body 20.

The controller 70 controls, with reference to one or more of the results of the above-described decision and calculation, the travel motors 31, the brush drive motor 41, and the electric fan 51 to cause the cleaner 10 to clean the cleaning surface of the cleaning area CA.

According to the first embodiment, displaying, on the display 119 of the terminal apparatus 120, as to where the mobile robot 1 is about to go allows the user to intuitively, that is, very easily, grasp the planned route 338 of the mobile robot 1 on the display 119 of the terminal apparatus 120 in his or her hand and further allows the user to change the planned route with simple input of a contact point through the touch motion on the display 119, which makes it possible to increase convenience.

Furthermore, when the mobile robot 1 is the cleaner 10, the information recorded in the mobile robot 1, for example, information on a planned cleaning route or an already-cleaned route can be superimposed on the map information 308 and displayed on the display 119 of the terminal apparatus 120. This allows the user to select whether to clean along the planned cleaning route or to clean after correcting the travel direction.

Note that the present disclosure is not limited to the above-described embodiments, and can be implemented in various other modes. For example, instead of displaying the travel instruction on the screen with the arrow, a voice may be output. This configuration only requires for a table where an instruction content and a voice are associated with each other to be recorded in the database.

Note that suitably combining any of the various embodiments or any of the various modifications makes it possible to achieve effects possessed by each of the embodiments or the modifications. Further, combinations of the embodiments, combinations of the modifications, or combinations of the embodiments and the modifications are possible, and combinations of features in different embodiments or modifications are also possible.

Note that, although the present disclosure has been described based on the embodiments and the modifications, it is a matter of course that the present disclosure is not limited to the embodiments and the modifications. The following cases are also within the scope of the present disclosure.

Specifically, all or a part of each of the controllers or circuits is a computer system including a microprocessor, a ROM, a RAM, a hard disk unit, a display unit, a keyboard, and a mouse. A computer program is stored in the RAM or the hard disk unit. The microprocessor operates in accordance with the computer program to enable each unit or circuit to achieve a corresponding function. Here, in order to achieve a predetermined function, the computer program includes combinations of a plurality of instruction codes indicating instructions to the computer.

For example, each component may be implemented through reading and execution, by a program execution unit such as a CPU, of a software program recorded in a recording medium such as a hard disk or a semiconductor memory.

Further, the program may be downloaded from a server for execution, or the program recorded in a predetermined recording medium (for example, an optical disc of a CD-ROM, a magnetic disk, or a semiconductor memory) may be read for execution.

Further, the computer that executes the program may be a single computer or a plurality of computers. That is, central processing or distributed processing may be performed.

The mobile robot and the control method of the mobile robot according to the present disclosure allows the user to easily grasp the planned travel route of the mobile robot with the terminal apparatus in his or her hand and further allows the user to easily change the planned travel route, which increases the convenience, and are suitable for various kinds of mobile robots including a robot cleaner, a transfer robot, and the like.

The entire disclosure of Japanese Patent Application No. 2018-015677 filed on Jan. 31, 2018, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control method of a mobile cleaner using a terminal apparatus, the terminal apparatus including a camera, a display that displays a display screen including the mobile cleaner that autonomously travels, and a first control circuit, the mobile cleaner including a second control circuit, the control method comprising performing control to:
cause the first control circuit to
acquire a first planned route of the mobile cleaner,
display, on the display, a first screen having the first planned route superimposed on a camera image taken by the camera, and
detect a single contact point entered on the display on which the first screen is displayed and transmit a position of the single contact point to the second control circuit;
cause the second control circuit, in response to the detected single contact point, to
generate a second planned route of the mobile cleaner that is different from the first planned route and that travels through the single contact point received from the first control circuit, and
transmit the second planned route generated to the first control circuit; and,
cause the first control circuit to
transmit, when the first control circuit determines that the camera image does not include the cleaner, a first command to the second control circuit for setting a velocity of the cleaner to a second velocity lower than a first velocity, wherein the first velocity is for performing cleaning operations,
wherein the cleaner includes a cleaner main body having a suction port on a bottom surface, a suction unit disposed in the cleaner main body, a drive unit that is disposed in the cleaner main body and drives travel of the cleaner, and the second control circuit,
the control method further comprising performing control to:
cause the second control circuit to control the suction unit and the drive unit to perform cleaning while traveling and transmit information on an area where cleaning is completed by the cleaner to the first control circuit; and
cause the first control circuit to further superimpose, after the first control circuit receives the information on the area where the cleaning is completed from the second control circuit, the area where the cleaning is completed by the cleaner on the first screen.

2. The control method of a mobile cleaner according to claim 1, further comprising performing control to cause the first control circuit to superimpose a figure indicating a travel direction of the mobile cleaner and a planned travel area of the mobile cleaner on the first screen as the first or second planned route.

3. The control method of a mobile cleaner according to claim 1, further comprising performing control to:
cause the first control circuit to
detect a swipe motion including a plurality of contact points on the first screen, and transmit positions of the plurality of contact points to the second control circuit; and
cause the second control circuit to
generate, when generating the second planned route of the mobile cleaner that travels through the plurality of contact points received from the first control circuit, the second planned route having a travel direction extending from a first contact point toward a last contact point of the plurality of contact points included in the swipe motion.

4. The control method of a mobile cleaner according to claim 3, further comprising performing control to:
cause the first control circuit to
detect, the swipe motion that continues for a time equal to or greater than a first threshold, and transmit the positions of the plurality of contact points to the second control circuit; and
cause the second control circuit to
generate, when generating the second planned route of the mobile cleaner that travels through the plurality of contact points received from the first control circuit, the second planned route having a travel direction extending from a contact point detected a predetermined time before an end of the swipe motion toward the last contact point of the plurality of contact points included in the swipe motion.

5. The control method of a mobile cleaner according to claim 1, further comprising performing control to:
cause the first control circuit to
detect a swipe motion including a plurality of contact points on the first screen, and transmit positions of the plurality of contact points to the second control circuit; and
cause the second control circuit to
generate, when generating the second planned route of the mobile cleaner that travels through the plurality of contact points received from the first control circuit, the second planned route having a travel direction extending from a position of the mobile cleaner toward a last contact point of the plurality of contact points included in the swipe motion.

6. The control method of a mobile cleaner according to claim 1, further comprising performing control to cause, when the first control circuit detects a swipe motion including a plurality of contact points on the first screen, the second control circuit to generate the second planned route for changing an orientation of the mobile cleaner based on a line segment passing through each of the plurality of contact points included in the swipe motion.

7. The control method of a mobile cleaner according to claim 1, further comprising performing control to cause, when the first control circuit detects a swipe motion including a plurality of contact points on the first screen, the second control circuit to
- generate, when the swipe motion is a straight motion on the screen, the second planned route having a travel direction extending from a position of the mobile cleaner toward a last contact point of the plurality of contact points included in the swipe motion, and
- generate, when the swipe motion is a curved motion on the screen, the second planned route curved to change an orientation of the mobile cleaner based on a line segment passing through each of the plurality of contact points included in the swipe motion.

8. The control method of a mobile cleaner according to claim 1, further comprising performing control to cause the second control circuit to generate the second planned route that does not overlap the first planned route on the first screen at a time when the first control circuit detects the contact point.

9. The control method of a mobile cleaner according to claim 1, further comprising performing control to cause the first control circuit to transmit, when the first control circuit determines that the camera image taken by the camera includes the mobile cleaner, a second command for cancellation of the first command to the second control circuit to return the velocity of the cleaner to the first velocity for performing the cleaning operations.

10. The control method of a mobile cleaner according to claim 1, wherein the mobile cleaner further includes a first sensor that acquires a position of the mobile cleaner, the control method further comprising performing control to cause:
- the first control circuit to acquire, when the first control circuit determines that the camera image does not include the cleaner, a position of the cleaner main body detected by the first sensor from the second control circuit; and
- the first control circuit to display, on the display, a second screen having a direction in which the cleaner main body is present superimposed on the camera image.

11. The control method of a mobile cleaner according to claim 10, further comprising performing control to cause the first control circuit to remove, when the first control circuit determines that the camera image includes the cleaner, display of the direction in which the cleaner main body is present, the direction being superimposed on the camera image.

12. A control system of a mobile cleaner using a terminal apparatus, the terminal apparatus including a camera, a display that displays a display screen including the mobile cleaner that autonomously travels, and a first control circuit, the mobile cleaner including a second control circuit, the control method comprising performing control to:
- cause the first control circuit to
  - acquire a first planned route of the mobile cleaner,
  - display, on the display, a first screen having the first planned route superimposed on a camera image taken by the camera, and
  - detect a single contact point entered on the display on which the first screen is displayed and transmit a position of the single contact point to the second control circuit;
- cause the second control circuit, in response to the detected single contact point, to
  - generate a second planned route of the mobile cleaner that is different from the first planned route and that travels through the single contact point received from the first control circuit, and
  - transmit the second planned route generated to the first control circuit; and, change a velocity of the cleaner from a first velocity to a second velocity in accordance with whether the cleaner is included in the camera image, wherein the first velocity is for performing cleaning operations,
- wherein the cleaner includes a cleaner main body having a suction port on a bottom surface, a suction unit disposed in the cleaner main body, a drive unit that is disposed in the cleaner main body and drives travel of the cleaner, and the second control circuit,
- the control method further comprising performing control to:
- cause the second control circuit to control the suction unit and the drive unit to perform cleaning while traveling and transmit information on an area where cleaning is completed by the cleaner to the first control circuit; and
- cause the first control circuit to further superimpose, after the first control circuit receives the information on the area where the cleaning is completed from the second control circuit, the area where the cleaning is completed by the cleaner on the first screen.

\* \* \* \* \*